US007978698B2

(12) United States Patent
Yamaguchi et al.

(10) Patent No.: US 7,978,698 B2
(45) Date of Patent: Jul. 12, 2011

(54) TERMINAL FOR PERFORMING MULTIPLE ACCESS TRANSMISSION SUITABLE TO A TRANSMISSION PATH HAVING VARIED CHARACTERISTICS

(75) Inventors: Tsuyoshi Yamaguchi, Fukuoka (JP); Yuji Igata, Fukuoka (JP); Yasushi Yokomitsu, Fukuoka (JP); Toru Yasukawa, Wakayama (JP); Shinichiro Ohmi, Osaka (JP); Koji Ikeda, Fukuoka (JP); Masanori Kataoka, Fukuoka (JP); Junji Yano, Osaka (JP); Go Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 12/282,947

(22) PCT Filed: Mar. 16, 2007

(86) PCT No.: PCT/JP2007/055425
§ 371 (c)(1),
(2), (4) Date: Dec. 9, 2008

(87) PCT Pub. No.: WO2007/119403
PCT Pub. Date: Oct. 25, 2007

(65) Prior Publication Data
US 2009/0257432 A1    Oct. 15, 2009

(30) Foreign Application Priority Data

Mar. 16, 2006  (JP) .................................. 2006-073365

(51) Int. Cl.
*H04L 12/28* (2006.01)
*H04L 12/56* (2006.01)
(52) U.S. Cl. ...................................................... 370/390

(58) Field of Classification Search .......... 370/351–360, 370/389–394, 395.5, 400, 401, 479, 480, 370/532–545
See application file for complete search history.

(56) References Cited

U.S. PATENT DOCUMENTS 7,339,903 B2 *   3/2008   O'Neill .......................... 370/313
2002/0194361 A1   12/2002   Itoh et al.

FOREIGN PATENT DOCUMENTS

| JP | 10-299613 | 11/1998 |
| JP | 11-225163 | 8/1999 |
| JP | 2000-134208 | 5/2000 |

(Continued)

OTHER PUBLICATIONS

International Search Report mailed Apr. 17, 2007 for International Application No. PCT/JP2007/055425.
Extended European Search Report issued Mar. 15, 2011 in European Patent Application No. 07 73 8870, which is a foreign counterpart of the present application.

(Continued)

*Primary Examiner* — Ayaz R Sheikh
*Assistant Examiner* — Blanche Wong
(74) *Attorney, Agent, or Firm* — Wenderoth, Lind & Ponack, L.L.P.

(57) ABSTRACT

A terminal for performing multiple access transmission suitable to a transmission path having varied characteristics includes a transmission/reception section, a control unit, a transfer management section, and an external interface section. Specifically, the terminal refers to an IGMP (MLD) message received by the transmission/reception section to classify a transmitter host and a relay device of the message based on a characteristic of the transmission path, and performs a multiple access transmission of a multicast packet in a form suitable to the characteristic of the transmission path.

21 Claims, 37 Drawing Sheets

FOREIGN PATENT DOCUMENTS

| | | |
|---|---|---|
| JP | 2001-111518 | 4/2001 |
| JP | 2003-101504 | 4/2003 |
| JP | 2003-169036 | 6/2003 |
| JP | 2003-174478 | 6/2003 |
| WO | 02/25878 | 3/2002 |

OTHER PUBLICATIONS

Jia et al., "Integrated fault-tolerant multicast and anycast routing algorithms", IEE Proc.-Comput. Digit.Tech., vol. 147, No. 4, Jul. 2000, pp. 266-274.

\* cited by examiner

FIG. 2
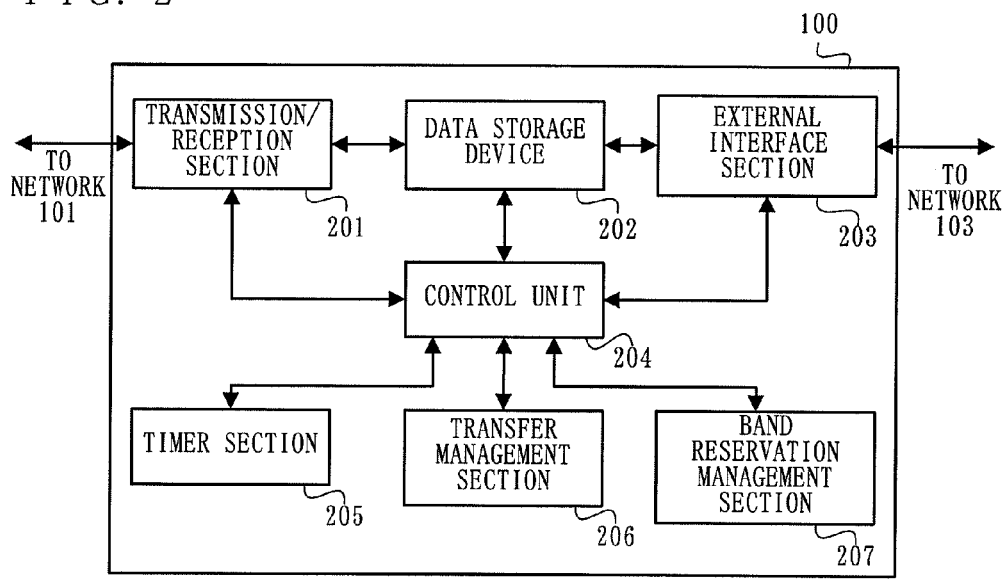
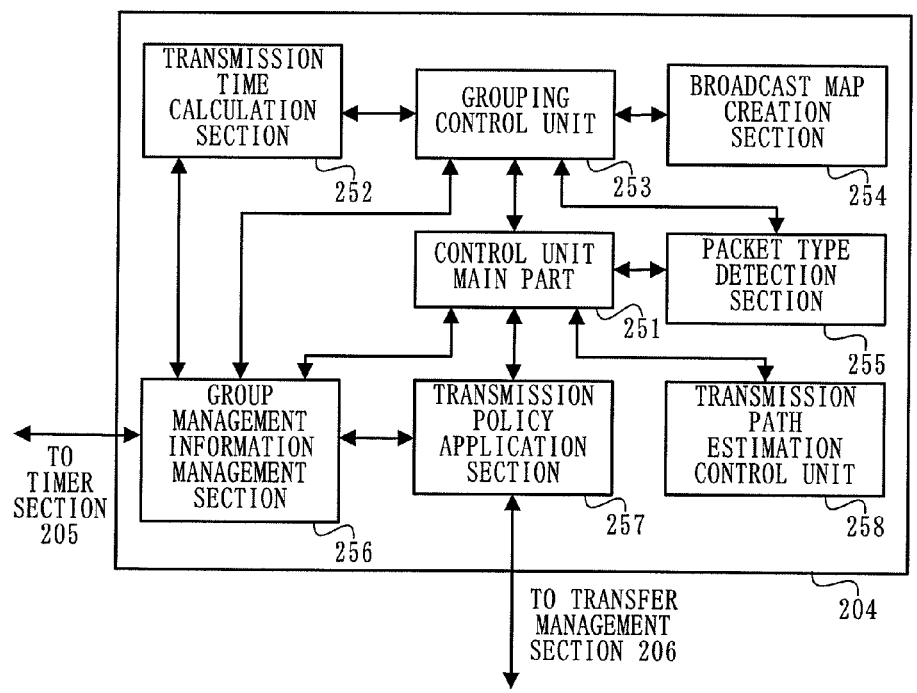

FIG. 3
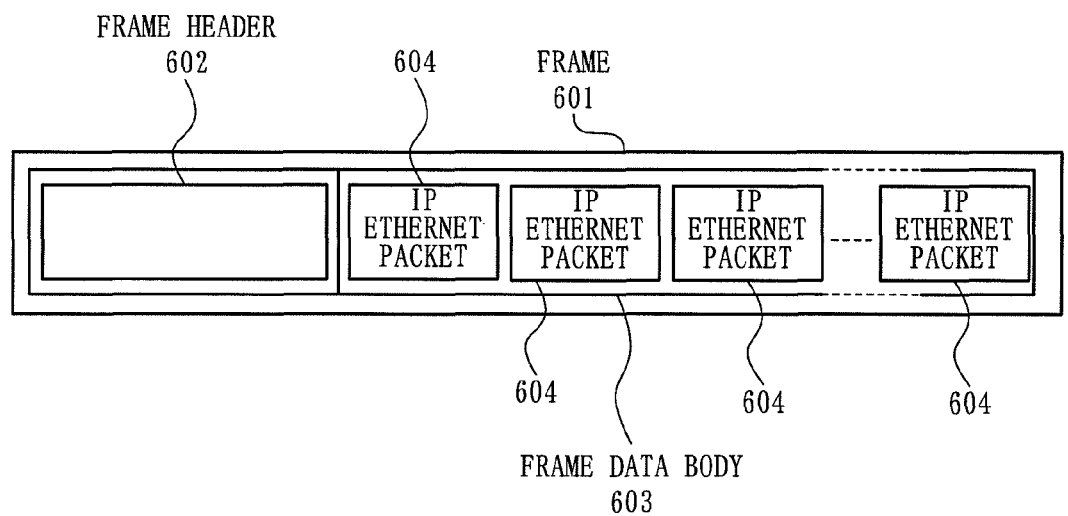
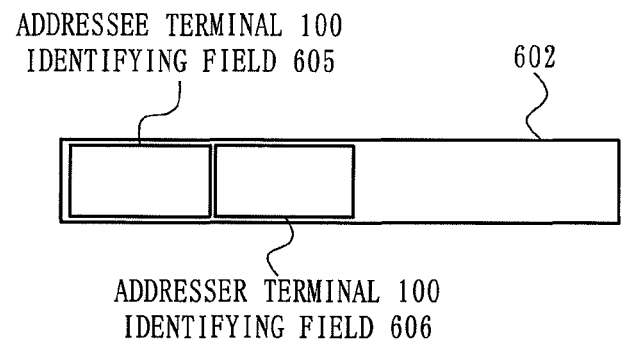

FIG. 4
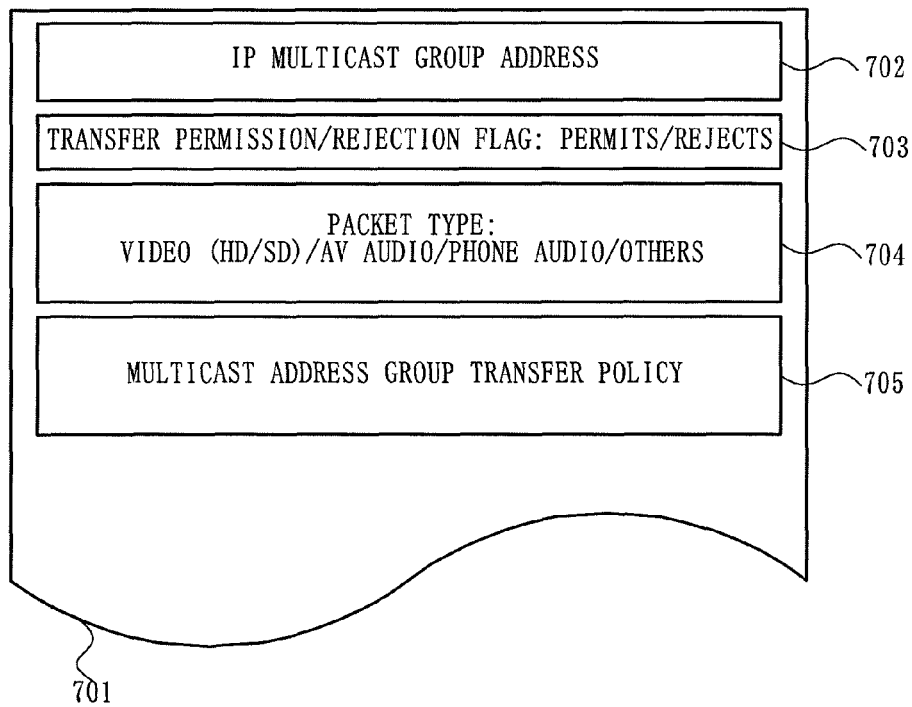
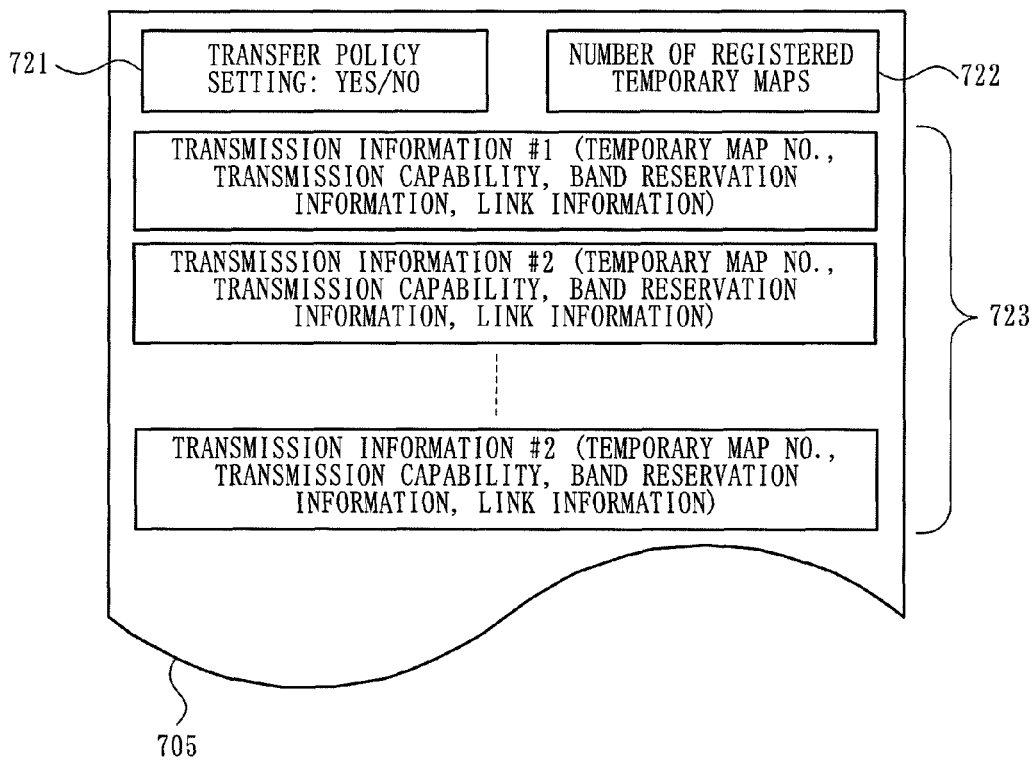

FIG. 6

| IDENTIFIER | TYPE | MINIMUM RATE [Mbps] | MAXIMUM RATE [Mbps] | TOLERABLE DELAY [msec] | LOSS RECOVERY |
|---|---|---|---|---|---|
| 0 | GENERAL DATA | NOT SPECIFIED | | | |
| 1 | Reserved | Reserved | | | |
| 2 | | | | | |
| 3 | PHONE AUDIO | 0.1 | 1.2 | 5 | LEVEL 1 |
| 4 | AV AUDIO | 0.1 | 1.2 | 20 | LEVEL 1 |
| 5 | VIDEO (SD) | 6 | 10 | 300 | LEVEL 3 |
| 6 | VIDEO (HD) | 18 | 26 | 300 | LEVEL 6 |
| 7 | CONTROL | TRANSMISSION QUALITY NOT SPECIFIED; UNICAST TO ALL THE TERMINALS | | | LEVEL 7 |

F I G. 7

| LOSS RECOVERY LEVEL | SUMMARY |
|---|---|
| 0 | AMOUNT OF DESCRIBABLE INFORMATION FOR EACH SUB CARRIER IS INCREASED. |
| 1 | NO ERROR CORRECTION; ACK IS NOT REQUIRED. |
| 2 | NO ERROR CORRECTION; ACK IS REQUIRED. |
| 3 | ERROR CORRECTION STRENGTH = VITERBI: 0.1; RS:239/255; ACK IS REQUIRED. |
| 4 | ERROR CORRECTION STRENGTH = VITERBI: 0.2; RS:239/255; ACK IS REQUIRED. |
| 5 | ERROR CORRECTION STRENGTH = VITERBI: 0.3; RS:239/255; ACK IS REQUIRED. |
| 6 | ERROR CORRECTION STRENGTH = VITERBI: 0.4; RS:239/255; ACK IS REQUIRED. TRANSMITTED TWICE IN REPETITION. |
| 7 | ERROR CORRECTION STRENGTH = VITERBI: 0.5; RS:239/255; AMOUNT OF DESCRIBABLE INFORMATION FOR EACH SUB CARRIER IS DECREASED. ACK IS REQUIRED. TRANSMITTED TWICE IN REPETITION. |

FIG. 12
GROUP MANAGEMENT INFORMATION
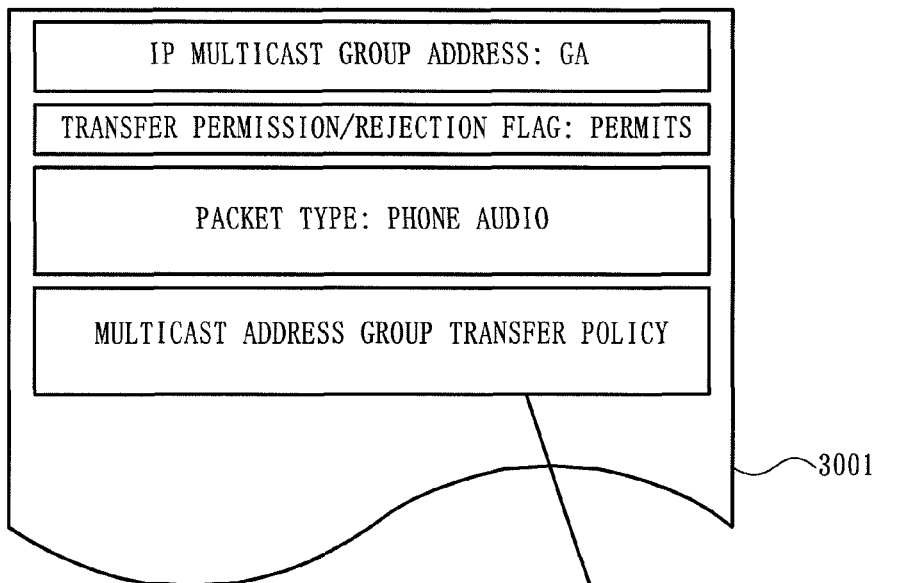
~3001
MULTICAST ADDRESS GROUP TRANSFER POLICY
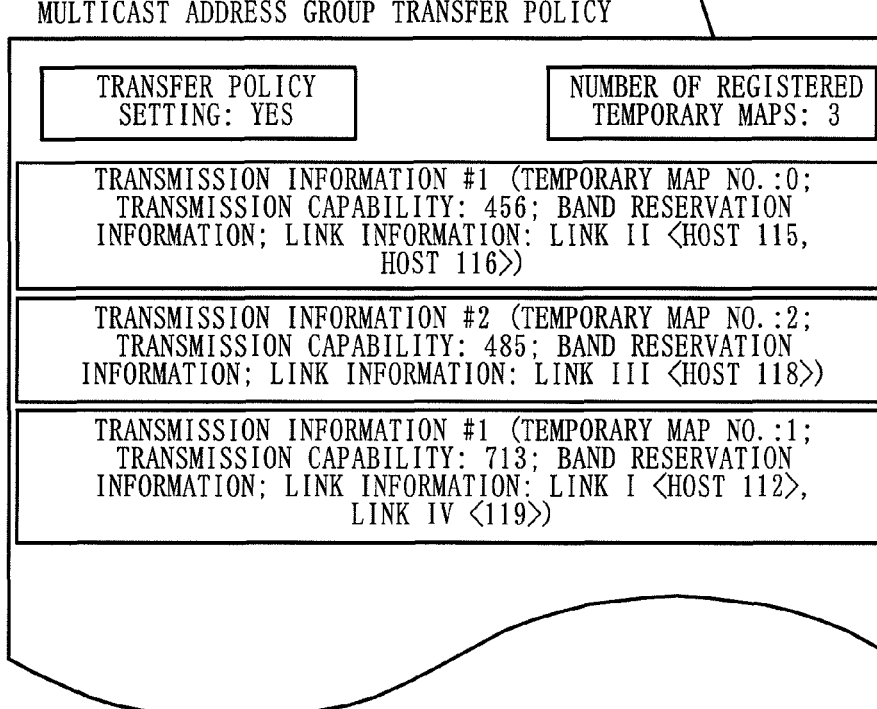
~3002

F I G. 2 3
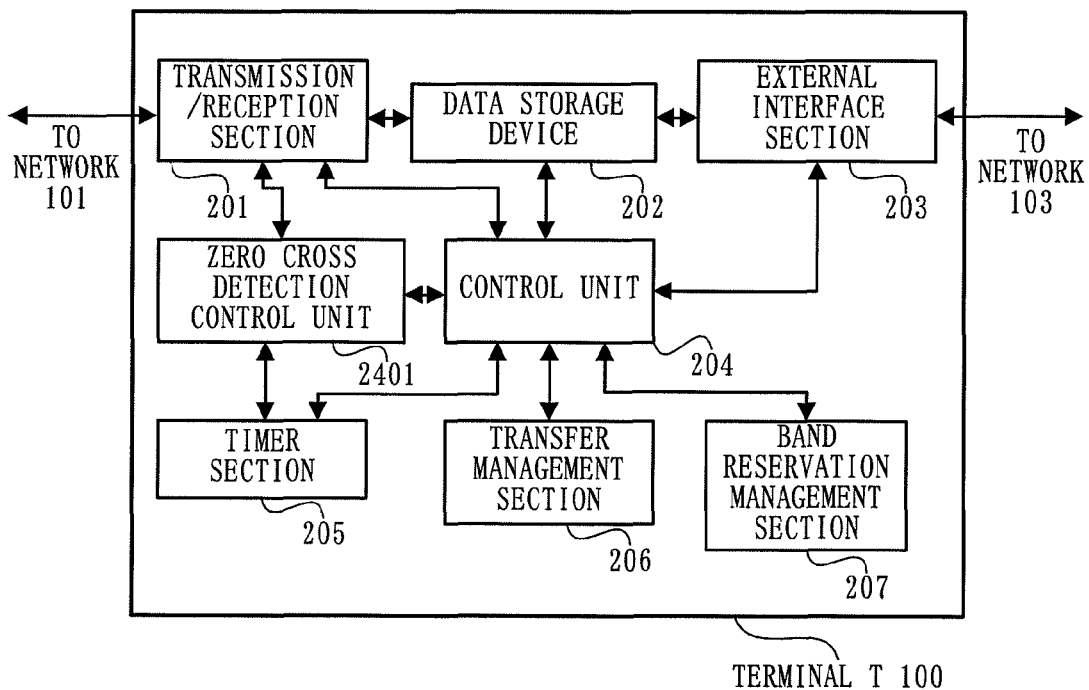

TERMINAL FOR PERFORMING MULTIPLE ACCESS TRANSMISSION SUITABLE TO A TRANSMISSION PATH HAVING VARIED CHARACTERISTICS

TECHNICAL FIELD

The present invention relates to a terminal, and more specifically, a terminal for performing media access control in communication control.

BACKGROUND ART

Currently, proper broadband access lines have been provided based on XDSL or FTTH technologies and access lines having a high transmission capability are spreading for household use.

Therefore, high quality access lines can now be commonly used at home. However, there is no established technology for home network, which is at one end of the access lines.

General users can construct a fast and high quality network in a household by installing a high frequency dedicated communication line such as Ethernet (registered trademark) or the like. However, it is difficult and costly for general users to newly install an Ethernet cable in an existing house.

Obviously, it will be highly advantageous for these users to construct a fast digital network at low cost without installing a physical cable, if possible.

On the other hand, home network appliances that general users can easily use without any specific expertise have been actively developed. It is now urged to provide proper digital network infrastructure in households using such home network appliances.

As a solution enabling the general users to construct a fast digital network at low cost without newly installing a dedicated communication cable physically, a method of using wired cables such as existing electric light wires, telephone lines, TV antenna lines or the like and a method of using wireless networks have been proposed.

However, these communication media are not intended for fast digital communication, and so have disadvantages that, for example, sufficient bands are not guaranteed or communication lines are not reliable.

Uses of the network in households include stream distribution which needs to be fast and does not permit data loss, such as high definition (HD transmission) quality AV video; digital phone or the like which requires strict restriction against delay, and web browsing or the like for which quality guarantee restriction is loose.

Accordingly, it is expected that for the network used in households, various levels of capability or quality are desired.

In addition, considering that networks are used in the households in order to receive the video distribution service using the IP protocol such as IP-TV system which has recently become common, the IP multicast packets need to be transferred stably and at high speed.

The following technique is one technique to realize a fast and high quality transmission system using a medium which is not intended for high frequency digital communication.

First, a terminal divides the frequency band used for the communication to define sub carriers, and issues a training packet to evaluate the communication quality of the transmission path corresponding to the frequency band of each sub carrier. Next, the terminal determines the number of bits per predetermined time which are to be described for each sub carrier. Information on the number of bits to be described for each sub carrier is referred to as a "transmission map".

Here, a form by which one terminal and another terminal are connected one to one is referred to as a "1:1 link". A form by which one terminal is connected to n number of terminals is referred to as a "1:n link".

The terminal determines the communication speed of the 1:1 link based on the number of bits described in the transmission map using a sub carrier in a frequency band having a high communication quality of the transmission path. By this, the signal-to-noise property can be improved to perform an optimum fast transfer.

However, the technique of increasing the speed by optimizing the modulation/demodulation format in the 1:1 link is not suitable to the transfer in the n:1 link. The reason is that because different transmission paths have different characteristics, a transmission map optimum for the transfer in one 1:1 link is not necessarily optimum for the transfer in another 1:1 link.

As a technology for increasing the speed of the inter-link transfer in the 1:n link in response to an IP multicast or IP broadcast transfer request, the following technology has been published.

A 1:n link includes a plurality of 1:1 links. First, the number of bits which can be described in each of the sub carriers in each 1:1 link included in the 1:n link is measured, and the transfer map of each link is estimated.

Then, a logical product is calculated for the sub carrier of each transmission map, and the sub carriers which can be used commonly among the links are determined. A common number of bits which can be assigned to each of the sub carriers is determined, and the determined common number of bits is used for the multiple access communication in the 1:n link (for example, Patent Document 1).

Patent document 1: Japanese Laid-Open Patent Publication No. 2001-111518

DISCLOSURE OF THE INVENTION

Problems to be Solved by the Invention

An actual measurement of the frequency characteristic of transmission paths of media such as electric light wires or wireless communication paths in an arbitrary environment provides the following: the frequency characteristic of each transmission path changes very dynamically along time, and the characteristics of sub carriers of the transmission path are significantly varied.

By the method of determining a number of bits which can be commonly assigned for the sub carriers as in the conventional art, it occurs often that only a few common number of bits can be assigned for the sub carriers for multiple access transmission. Accordingly, the conventional art often cannot provide a sufficiently high transfer speed.

For this reason, in a video distribution system or audio broadcast system using IP multicast, it is conventionally difficult to transfer a necessary size of data within the time required by the data stream.

Thus, the present invention has an object of providing a terminal capable of transmitting data stably even in transmission paths having significantly varied characteristics.

Solution to the Problems

In order to achieve the above-described object, the present invention has the following features.

A first aspect of the present invention is directed to a terminal communicable with at least one relay device via a communication medium. The terminal comprises a transmission parameter setting section for evaluating characteristics of a transmission path up to the relay device and setting a transmission parameter on at least one of a transmittable information amount per a predetermined time length and an error correction strength; a transfer management section for classifying transmission paths into one or more groups based on similarity of the set transmission parameter, the transmission paths being used for connecting a plurality of relay devices to the communication medium and for transmitting a multicast packet; a packet replication section for replicating the received packet by a number equal to the number of the groups; and a transmission section for sending each of the plurality of replicated packets on a unit of a group, based on the transmission parameter set for each group.

In a second aspect of the present invention based on the first aspect, it is preferable that the terminal further comprises a transmission time calculation section for calculating a transmission time required for transmitting data to the relay device based on the transmission parameter set for each group; and the transfer management section classifies the transmission paths into one or more groups again based on the calculated transmission time.

In a third aspect of the present invention based on the first aspect, it is preferable that the packet replication section creates a unicast packet when the number of the transmission paths classified into the one or more groups is 1, and creates a multicast packet when the number of the transmission paths classified into the one or more groups is 2 or greater.

In a fourth aspect of the present invention based on the first aspect, it is preferable that the terminal is connected to a first network which is connected to a first communication terminal for transmitting a packet including a multicast address and is also connected to a second network, via the relay device, which is connected to a second communication terminal for receiving the packet transmitted from the first communication terminal; and the transfer management section creates group management information for each multicast address, the group management information including at least one unit of transmission information in which the group, the transmission path classified into the group, the transmission parameter for each group and information specifying the second communication terminal are associated with one another.

In a fifth aspect of the present invention based on the fourth aspect, it is preferable that the terminal further comprises a detection section for detecting a group managing message which is included in the received packet based on a group managing protocol defined by layer 3 and defined by the group managing protocol; and when the detection section detects a join message representing a message for notification on joining a group defined by the group managing protocol or a report message representing a message for notification on belonging to a group defined by the group managing protocol, the transfer management section adds, to the group management information, at least one of an identifier specifying the second communication terminal which transmitted the received packet and an identifier specifying the relay device which transferred the received packet.

In a sixth aspect of the present invention based on the fifth aspect, it is preferable that when the detection section detects a leave message representing a message for notification on leaving a group defined by the group managing protocol, the transfer management section deletes, from the group management information, at least one of the identifier specifying the second communication terminal which transmitted the received packet and the identifier specifying the relay device which transferred the received packet.

In a seventh aspect of the present invention based on the first aspect, it is preferable that the terminal further comprises an UPnP message detection section for detecting a packet including an UPnP message representing a message conformed to an UPnP protocol; and when the UPnP message detection section detects that the received packet includes the UPnP message, the transmission section transfers the received packet to all the relay devices connected to the second network.

In an eighth aspect of the present invention based on the fifth aspect, it is preferable that when the group management information corresponding to the multicast address detected by the detection section has already been created, the packet replication section replicates the unicast packets by a number equal to the number of the groups included in the group management information; and the transmission section sends each of the replicated packets to the second network.

In a ninth aspect of the present invention based on the first aspect, it is preferable that when the multicast address included in the packet received from the first communication device does not match any of predetermined at least one multicast address, the transfer management section discards the received packet.

In a tenth aspect of the present invention based on the first aspect, it is preferable that the terminal further comprises a monitoring section for monitoring the number of received multicast packets, the number of transmitted multicast packets, and a transmission data size.

In an eleventh aspect of the present invention based on the eighth aspect, it is preferable that the terminal comprises a band management section for, when the monitoring section detects a packet including a predetermined multicast address for the first time, assigning a part of resource of the transmission path to the multicast address.

In a twelfth aspect of the present invention based on the eleventh aspect, it is preferable that the band management section adjusts the assignment of the part of the resource of the transmission path to the multicast address based on at least one of the number of received packets, the number of transmitted multicast packets and the transmission data size within a predetermined time length detected by the monitoring section.

In a thirteenth aspect of the present invention based on the eleventh aspect, it is preferable that when the monitoring section determines that the multicast packet has not been sent to a transmission path, the band management section releases a part of the resource assigned to the multicast address.

In a fourteenth aspect of the present invention based on the eleventh aspect, it is preferable that in the case where a part of resource of a certain transmission path is assigned to a certain multicast address, when the detection section detects the join message or the report message including a new multicast address different from the certain multicast address from the packet received from the second network, the band management section releases a part of resource already assigned and saves again a part of the resource of the transmission path for the new multicast address.

In a fifteenth aspect of the present invention based on the fifth aspect, it is preferable that when the detection section receives a packet including a message different from a non-predetermined message from the second network, the transfer management section discards the received packet.

In a sixteenth aspect of the present invention based on the fifth aspect, it is preferable that when the detection section receives a packet including a message different from a predetermined message from the second network, the transfer management section revises the received packet.

In a seventeenth aspect of the present invention based on the third aspect, it is preferable that the terminal further comprises a timer section for, when the detection section detects a message included in a packet received from a certain transmission path, counting time on the certain transmission path; and when the timer counts up to a predetermined time, the transfer management section releases the certain transmission path from management.

In an eighteen aspect of the present invention based on the third aspect, it is preferable that the transmission section determines the order of transmission of generated packets based on the transmission time calculated by the transmission time calculation section.

In a nineteenth aspect of the present invention based on the first aspect, it is preferable that the terminal communicates with at least one relay device using a multiple carrier transmission format; each of the transmission paths is formed of at least one sub carrier of the multiple carrier transmission format; the transfer management section classifies at least two sub carriers into at least one sub carrier in advance for each transmission path; the transmission parameter setting section evaluates a characteristic of each of the transmission paths, and sets the transmission parameter of each of the at least one sub carrier included in each of the transmission paths as a sub carrier group transmission parameter; and the transfer management section classifies each of the transmission paths into one or more groups based on similarity of the sub carrier group transmission parameter.

A twentieth aspect of the present invention is directed to a program for communication with at least one relay device via a communication medium. The program can cause a computer to realize a transmission parameter setting function for evaluating characteristics of a transmission path up to the relay device and setting a transmission parameter on at least one of a transmittable information amount per a predetermined time length and an error correction strength; a transfer management function for classifying transmission paths into one or more groups based on similarity of the set transmission parameter, the transmission paths being used for connecting a plurality of relay devices to the communication medium, and when a multicast packet is received, for sending the received packet; a packet replication function for replicating the number of packets which is equal to the number of the groups from the received packet; and a transmission function for sending each of the plurality of replicated packets on a unit of a group, based on the transmission parameter set for each group.

According to a twenty-first aspect of the present invention is directed to an integrated circuit communicable with at least one relay device via a communication medium. The integrated circuit acts as a transmission parameter setting function for evaluating characteristics of a transmission path up to the relay device and setting a transmission parameter on at least one of a transmittable information amount per a predetermined time length and an error correction strength; a transfer management function for classifying transmission paths into one or more groups based on similarity of the set transmission parameter, the transmission paths being used for connecting a plurality of relay devices to the communication medium, and when a multicast packet is received, for sending the received packet; a packet replication function for replicating the number of packets which is equal to the number of the groups from the received packet; and a transmission function for sending each of the plurality of replicated packets on a unit of a group, based on the transmission parameter set for each group.

Effect of the Invention

According to a control method and a terminal of the present invention, the speed of multiple access transmission by a high-frequency digital transmission can be optimally increased using a communication medium which is not intended for high frequency digital communication, such as an electric light wire, a wireless medium, a coaxial cable, a speaker line, an avionics line or the like.

By the conventional art, it was difficult to realize a system for distributing video, which is transmitted at a high communication speed and does not permit data loss, or audio, for which delay is strictly restricted, based on the IP multicast protocol or the IP broadcast protocol, using a communication medium not intended for high frequency digital communication.

According to the technology disclosed by the present application, multiple access transfer of the 1:n link with high transmission quality, high speed and high stability is realized even with a medium not intended for high frequency digital communication.

Accordingly, using the technology disclosed by the present application, a system for distributing video or audio using the IP multicast protocol or the IP broadcast protocol by a medium not intended for high frequency digital communication.

BRIEF DESCRIPTION OF THE DRAWINGS

FIG. 2 is a block diagram showing a structure of a relay terminal 100.

FIG. 3 shows a frame format defined in a network 101.

FIG. 4 shows group management information managed by the terminal 100 according to the first embodiment.

FIG. 6 shows a band reservation information table.

FIG. 7 shows loss recovery definitions.

FIG. 12 shows group management information managed by the terminal 100 according to the first embodiment.

FIG. 23 is a block diagram showing a structure of a terminal T100.

DESCRIPTION OF THE REFERENCE CHARACTERS

Figure 1:
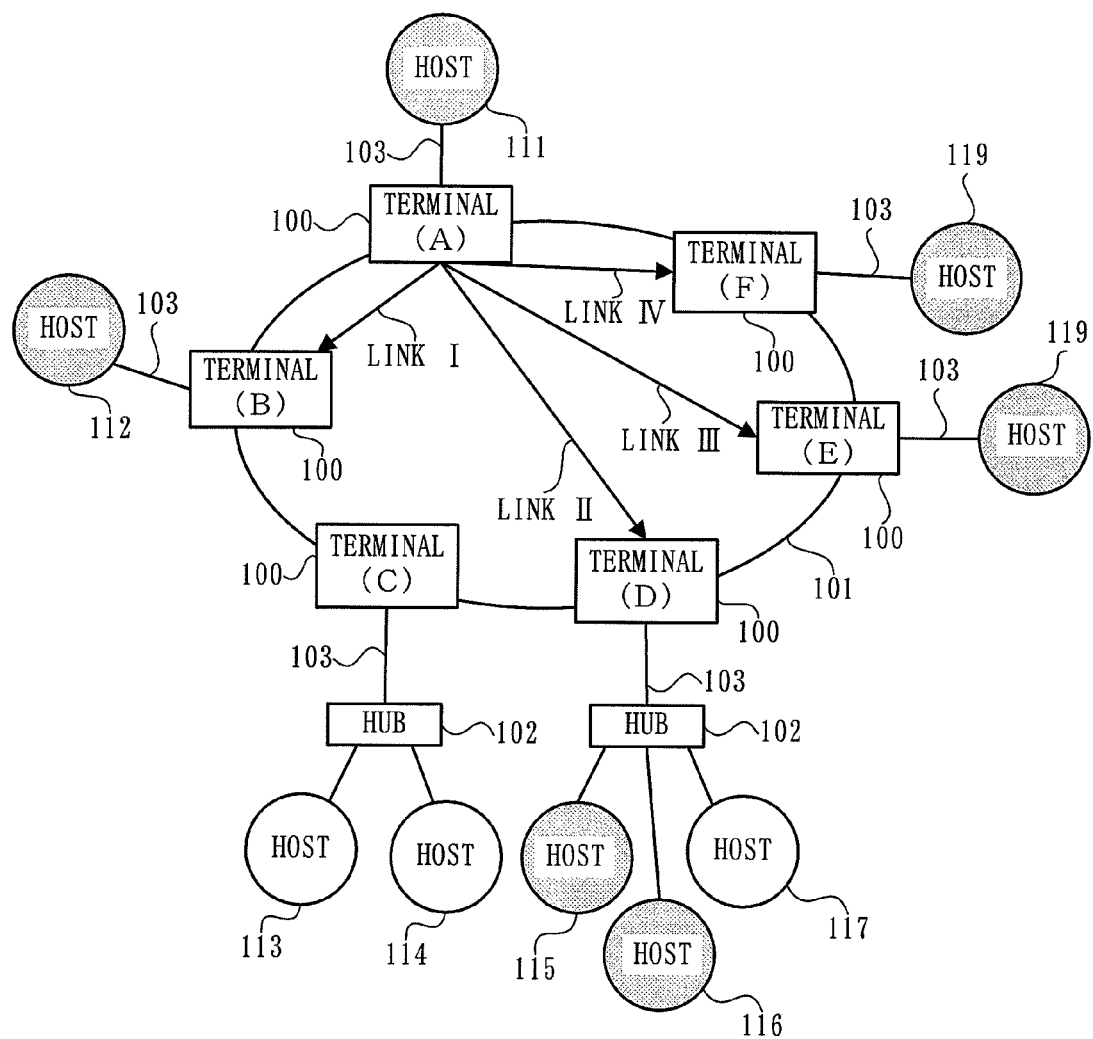
FIG. 1 is a block diagram showing a structure of a system according to a first embodiment of the present invention.

100 Relay terminal
1000 Communication terminal disclosed by the present invention
101 Sub network constructed by the terminals 100
102 Hub
103 Ethernet (registered trademark)
111-109 IP host
201 Transmission/reception section
202 Data storage section
203 External interface section
204 Control unit
205 Timer section
206 Transfer management section
207 Band reservation management section
301 Transmission map of link I
302 Transmission map of link II
303 Transmission map of link III
304 Transmission map of link IV
305 Sub carrier
601 Frame in the network 101
602 Frame header
603 Frame data body
604 IP Ethernet packet mounting area
605 Addressee terminal 100 identifying field
701 Group management information
702 IP multicast group address description section
703 Transfer permission/rejection flag description section
704 Packet type
705 Multicast address group transfer policy description section
721 Transfer policy setting section
722 Number of registered temporary maps
723 Transmission information description section
1101 Common information description section
1102 Multiple access map of link I and link IV
1301 Multicast router
1701 Group management information
1702 IP multicast group address description section
1703 Transmission map No. description section
1704 Transmission capability description section
1705 Number of registered links description section
1706 Link information description section
1801 Group management information
1802 IP multicast group address description section
1803 Transmission map No. description section
1804 Transmission capability description section
1805 Number of registered links description section
1806 Link information description section
2001 Transmission/reception section
2002 Data storage device
2003 External interface section
2004 Control unit
2005 Timer section
2006 Transfer management section
2007 Band reservation management section
2008 IPL3 layer processing section
2009 Application processing section
2401 Zero cross detection control unit
2501 Supply voltage zero crossing point
2502 Electric light wire supply voltage
2503 Power source synchronization period 1
2504 Power source synchronization period 2
2505 Power source synchronization period 3
2506 Power source synchronization period 4
100a Outlet
100b Plug
2a Commercial power source circuit
2b Ammeter breaker
3b Electric light wire

BEST MODE FOR CARRYING OUT THE INVENTION

First Embodiment

In this embodiment, the present invention is applied to, for example, a network system constructed as a transmission/reception system usable for video distribution, audio distribution, web browsing, file transfer or the like in households, small offices or the like; a video or audio distribution system usable in large scale building structures; or an avionics system in transportation facilities or areas where a large number of people gather.

FIG. 1 shows an exemplary entire structure of a system using communication devices according to a first embodiment of the present invention. The communication system shown in FIG. 1 includes electric light wire communication terminals 100 (terminals (A) through (F)), an electric light wire sub network 101, layer 2 level hubs 102, networks 103, and hosts 111 through 119.

In the system shown in FIG. 1, nine IP hosts (hosts 111 through 119) having communication means conformed to the IP protocol used widely in general and having an interface of the Ethernet (registered trademark) are installed. In the network 103 shown in FIG. 1, a layer 2 level branching device (hub 102) widely known can be installed. By using the hub 102, a plurality of IP hosts can be connected to each other.

In the following description, it is assumed that the network 101 is the electric light wire network and the network 103 is the Ethernet (registered trademark). The terminals 100 in this embodiment are each structured as a bridge for connecting the electric light wire sub network 101 and the network 103 to each other and transferring data between different communication media.

Thus, in this embodiment, data to be exchanged in the network 101 is a frame, and data to be exchanged in the network 103 is a packet.

In this embodiment, the host 111 shown in FIG. 1 issues an IP multicast packet to an IP multicast address GA as an addressee. Here, it is assumed that the hosts belonging to an IP multicast group G (hosts which are operating an application for receiving or sending a packet to be distributed in the IP multicast group G) are the hosts 111, 112, 115, 116, 118 and 119.

Accordingly, an issuance of a multicast packet of the IP multicast group G is a request for a transfer of the multicast packet in the network 101 via a link I connecting the terminal (A) and the terminal (B), a link II connecting the terminal (A) and the terminal (D), a link III connecting the terminal (A) and the terminal (E), and a link IV connecting the terminal (A) and the terminal (F).

In this example, a network formed of the sub network 101 which is an electric light wire media network and the networks 103 is shown. The scope of application of the terminals 100 according to the present invention is not limited to these networks, needless to say. A terminal according to the present invention can be similarly applied to any network which uses a communication medium formed of, for example, wireless media, telephone lines, coaxial cables used for TV antenna cables or cable TV lines, speaker lines for transmitting audio signals in various facilities, or any other dedicated lines for specific uses.

The sub network 101 and the network 103 may be the same type of communication media. Each of the hosts 111 through 119 only needs to include communication means compatible with the networks 103. For example, the hubs 102 are usable as the communication means compatible with the networks 103.

FIG. 2 is a block diagram showing a structure of the terminal 100. The terminal 100 includes a transmission/reception section 201 which is an interface with the network 101, a data storage section 202, an external interface section 203 which is an interface with the network 103, a control unit 204, a timer section 205, a transfer management section 206, and a band reservation management section 207.

The transmission/reception section 201 transmits and receives data via the network 101. The transmission/reception section 201 has a function of extracting only a communication band, a function of checking whether there is a frame on the network 101 or not (carrier sense function) and the like.

The data storage section 202 stores various data. Specifically, the data storage section 202 is usable as an arithmetic operation temporary area or the like. The data storage section 202 also stores an estimation result on a transmission path characteristic of the network 101 as transmission path parameter information. The data storage section 202 is further used as a frame temporary area when data is transferred between the network 101 and network 103. The data storage section 202 stores information regarding what level of quality is to be guaranteed and transmitted to the network 101 in response to a transfer request received from the network 103. The data storage section 202 stores information regarding in what form a frame is to be issued to the network 101 in response to a transfer request received from the network 103. The data storage section 202 stores software to be executed by the control unit 204.

The external interface section 203 has a function of an upper layer in the network hierarchy as a host terminal. In the first embodiment, the terminals 100 are each in the form of a bridge. Therefore, in the case where the present invention is realized using a terminal having a bridge function, another form of protocol interface such as the Ethernet (registered trademark), a wireless medium, a coaxial cable, a telephone line or any other dedicated line may be used.

The timer section 205 counts time.

Regarding transfer processing between the network 101 and the network 103, the transfer management section 206 determines the type of frame to be transferred, and the form and method of transfer. Based on the determination result, the transfer management section 206 generates data, manages the data as a transmission policy, and stores the transmission policy in the data storage section 202.

The band reservation management section 207 is a functional block for managing a procedure to realize Quality of Service (QoS) in the network 101, by allowing the control unit 204 to have an exclusive opportunity of using the medium using a technique of time division of media access or the like.

The control unit 204 controls the entire operation of the terminal 100. In more detail, the control unit 204 includes a control unit main part 251, a transmission time calculation section 252, a grouping control unit 253, a multiple access map creation section 254, a packet type detection section 255, a group management information management section 256, a transmission policy application section 257, and a transmission path estimation control unit 258.

The control unit main part 251 performs main control of the control unit 204 and also operates as an external interface for communication between the control unit 204 and other elements. The transmission time calculation section 252 calculates a theoretical transmission time of each group and of the entire transmission. The grouping control unit 253 controls grouping into transmission groups. The multiple access map creation section 254 creates transmission maps in multicast and broadcast. The packet type detection section 255 identifies the specific type of a packet received from the network 101 or a packet received from the network 103. The group management information management section 256 refers to and edits group management information stored in the data storage section 202 and also manages a timer on the group management information to manage the groups. The transmission policy application section 257 operates in association with the group management information management section 256 to set a transfer policy. The transmission path estimation control unit 258 executes transmission path estimation.

FIG. 3 shows a format of a frame used in the network 101. A frame 601 is formed of a frame header 602 and a frame body 603. The frame header 602 is formed of identifier fields 605 and 606.

The identifier field 605 stores an identifier of the terminal 100 as an addressee, a multicast identifier or a broadcast identifier. The identifier field 606 stores an identifier of the terminal 100 which has issued the frame.

The frame data body 603 includes at least one unit of data to be transferred from the network 103 to the network 101 (in this case, IP Ethernet (registered trademark) packet). The frame for transferring data has a structure shown as the frame 601. However, a frame not including the frame data body 603 is also used in the network 101.

FIG. 4 shows the content of the group management information managed by the terminal 100. The group management information 701 includes an IP multicast group address 702 for identifying the group management information, a transfer permission/rejection flag 703 indicating whether the transfer of a multicast packet from the network 103 to the network 101 is permitted or rejected, a packet type 704, and a multicast address group transfer policy 705.

The packet type 704 shown in FIG. 4 represents the packet type, i.e., whether the packet to be transferred is video (HD/SD), AV voice, phone voice or the like.

The multicast address group transfer policy 705 includes transfer policy setting 721 indicating whether or not a transfer policy is set, a number 722 of the temporary maps registered for this multicast group, and transmission information 723 including the temporary map No., transmission capability, band reservation information and link information. The multicast address group transfer policy 705 includes a number of units of transmission information 723 corresponding to the number of the temporary maps.

In an initial state, the transfer policy setting 721 is set to FALSE (unset), the number 722 of the temporary maps registered for this multicast group is set to 0, and the transmission information 723 is set to NULL.

The temporary map mentioned regarding the transmission information 723 is a transmission map which is used when a frame is issued to the network 101 for transferring a multicast packet of this multicast address group.

The transmission capability included in the transmission information 723 is a sum of all the information amounts described in all the sub carriers included in the transmission map corresponding to the transmission information 723. The band reservation information included in the transmission information 723 includes information used for association with a device which determines the frame issuing timing or the like in the case where a band reservation has been made in the link specified by this transmission information.

The link information included in the transmission information 723 is the information which specifies a transmission path between the terminals in the network 101. Specifically, the link information is formed of an identifier of a terminal as the addressee of the multicast packet and an identifier of a host as the final destination.

The group management information 701 is stored in the data storage section 202 and is created, referred to and discarded mainly by the control unit 204 and the transfer management section 206.

The terminal 100 is a transfer device of the layer 2 level, but snoops on a protocol message of the layer 3 or higher level. The terminal 100 is allowed to analyze an Ethernet (registered trademark) packet queued to the external interface section 203 down to the Ethernet (registered trademark) header, the IP header, or even to the UDP header or the TCP header in the control unit 204. Thus, the terminal 100 can determine the type of the packet.

For example, the terminal 100 is allowed to snoop on an IGMP (Internet Group Management Protocol) protocol message or an MLD (Multicast Listener Discovery) message defined by the layer 3 level of the IP protocol. The IGMP and MLD protocols are group management protocols for controlling a group formed of a plurality of hosts for receiving an IP multicast packet.

The "group management protocol" is a protocol by which a router having an IP multicast mounted thereon determines whether there is a host participated in the multicast group or not in a physical network connected to the router.

The group management protocol defines a join message representing a message which notifies that a host joins the group defined by the group management protocol, a report message representing a message which notifies that a host belongs to the group, and a leave message representing a message which notifies that a host leaves the group.

More specifically, the IGMP and MLD protocols are known as the group management protocol. The IGMP and MLD protocols are widely used to exchange information that a host joins or leaves the group or to exchange information on the group among multicast routers. The IGMP and MLD protocols are widely mounted as a part of the IP. The IGMP protocol is a group management protocol defined by IPv4, and the MLD protocol is a group management protocol defined by IPv6.

In the IGMP and MLD protocols, a JOIN message corresponds to the join message described above and a REPORT message corresponds to a report message described above. In the IGMP protocol, an IGMP LEAVE message corresponds to the leave message described above. In the MLD protocol, an MLD DONE message corresponds to the leave message described above.

The JOIN message and the REPORT message are defined by IGMP Ver. 1. The IGMP LEAVE message is defined by IGMP Ver. 2.

In this example, for the convenience of description, it is assumed that the hosts 111 through 119 are conformed to IPv4 and have the IGMPv2 or higher protocol mounted thereon. Needless to say, such an assumption does not limit the application scope of the terminal according to the present invention in any way.

For transmitting or receiving information in the network 101, the terminal 100 uses the DMT (Discrete Multi Tone) multicast transmission format. The terminal 100 performs modulation/demodulation of dividing the frequency band to be used into a plurality of sub carriers and setting the number of units of information to be put on each sub carrier. Hereinafter, information which represents an information amount to be described in each of all the sub carriers in all the bands to be used will be referred to as a "transmission map".

An electric light wire exhibits a transmission path characteristic significantly varied along the frequency axis. Therefore, the transmission path parameter is significantly varied among the links for connecting the terminals 100. Accordingly, each terminal 100 evaluates the transmission path for each sub carrier in the 1:1 link connecting the terminals 100, and sets a transmission path parameter which optimizes the inter-1:1 link transmission. The terminal 100 has a function of realizing a fast inter-1:1 link transfer by setting the transmission path parameter.

The function of the terminal 100 of realizing a fast inter-1:1 link transfer by setting the transmission path parameter is conventionally known as a link optimization transfer format by transmission path estimation, in a communication system using a communication medium which is not specifically designed for high frequency transmission. In this embodiment, this is executed mainly by the control unit 204.

Because the frequency characteristic of the electric light wire is significantly varied, the transmission path parameter for connecting the terminals 100 is also significantly varied. Therefore, in order to perform a broadcast transmission in the network 101, a transmission path parameter needs to be set such that all the terminals can receive the transmitted data.

The "transmission path parameter" refers to a collection of information on error correction setting such as Reed-Solomon, Viterbi or the like and on the strength thereof, and the transmission map.

For the transmission path parameter, there is a mode in which only a small number of units of information can be described, the error correction strength is high, and a redundant operation of repeating a process along the time is set (hereinafter, referred to as the "diversity mode"). In actuality, the transmission path parameter performs a broadcast transfer in the network 101 in the diversity mode.

Figure 5:
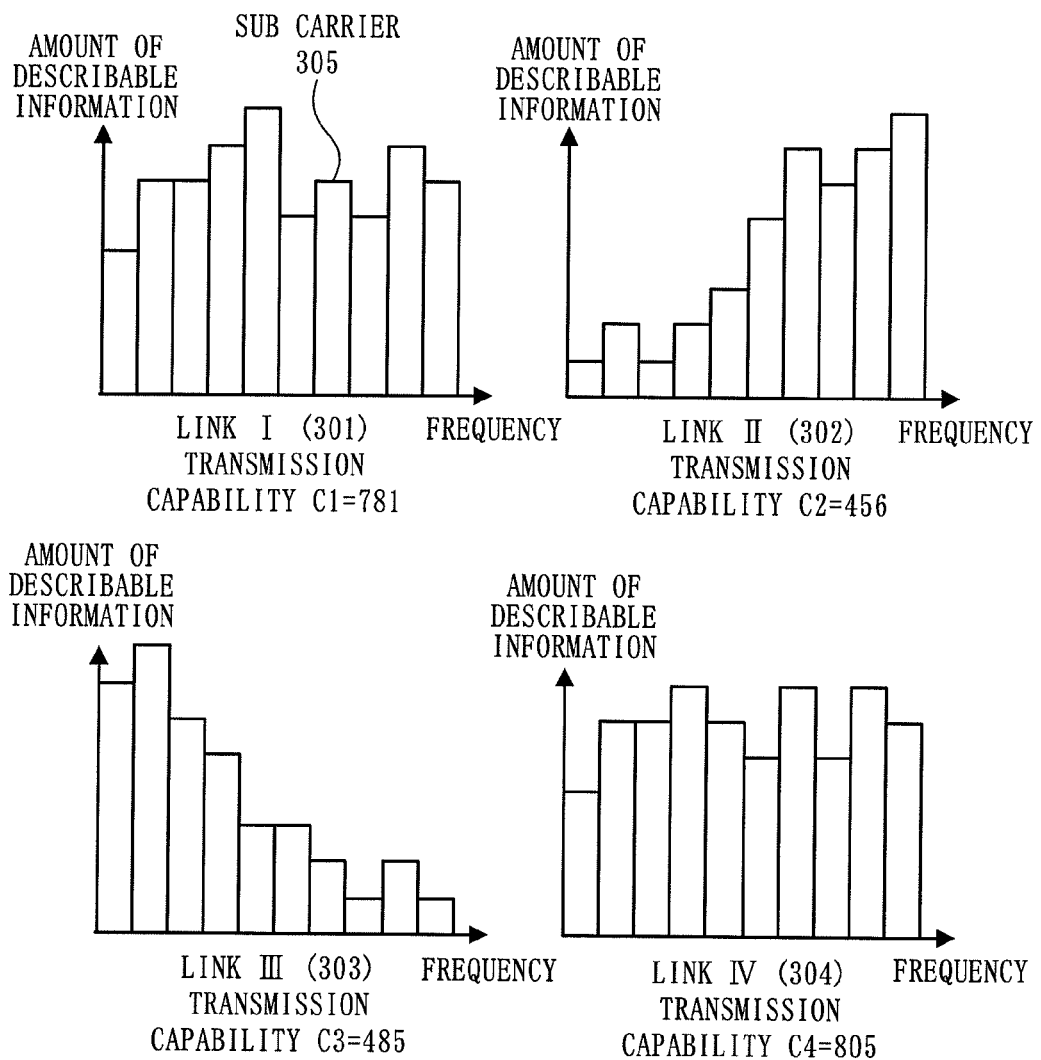
FIG. 5 shows transmission maps of links I through IV.

FIG. 5 shows transmission maps of the links I through IV (transmission maps 301 through 304) shown in FIG. 1. In the transmission maps 301 through 304, the horizontal axis represents the frequency, and the vertical axis represents the amount of information which can be described.

In this embodiment, the terminal 100 adopts the link optimization modulation/demodulation, by which the frequency band used in the network 101 is divided into 10 sub carriers 305 and the amount of information described in each sub carrier in a predetermined time length is set. The number of the sub carriers into which the terminal 100 divides the frequency band used in the network 101 may not be necessarily 10, and may be less than 10, or 11 or greater.

Among the transmission maps shown in FIG. 5, the transmission map 301 of the link I and the transmission map 304 of the link IV indicate that the transmission characteristic is relatively good. The transmission map 302 of the link II indicates that the transmission characteristic is poor in the low frequency region, and the transmission map 303 of the link III indicates that the transmission characteristic is poor in the high frequency region.

FIG. 6 is a band reservation information table which defines the minimum rate, maximum rate, tolerable delay and loss recovery for each of the packet types defined as the packet type 704. The terminal 100 refers to the band reservation information table in FIG. 6 to determine the transfer speed or loss recovery level of the packet to be transferred.

FIG. 7 defines the error correction strength, whether ACK is required or not, etc., for each of the loss recovery levels included in the band reservation information table. Based on the loss recovery level shown in FIG. 7, the terminal 100 determines the error correction strength and whether ACK is required or not regarding the packet to be transferred.

Hereinafter, with reference to FIG. 8, processing performed when the terminal 100 receives a multicast packet from the network 103 will be described.

Figure 8:
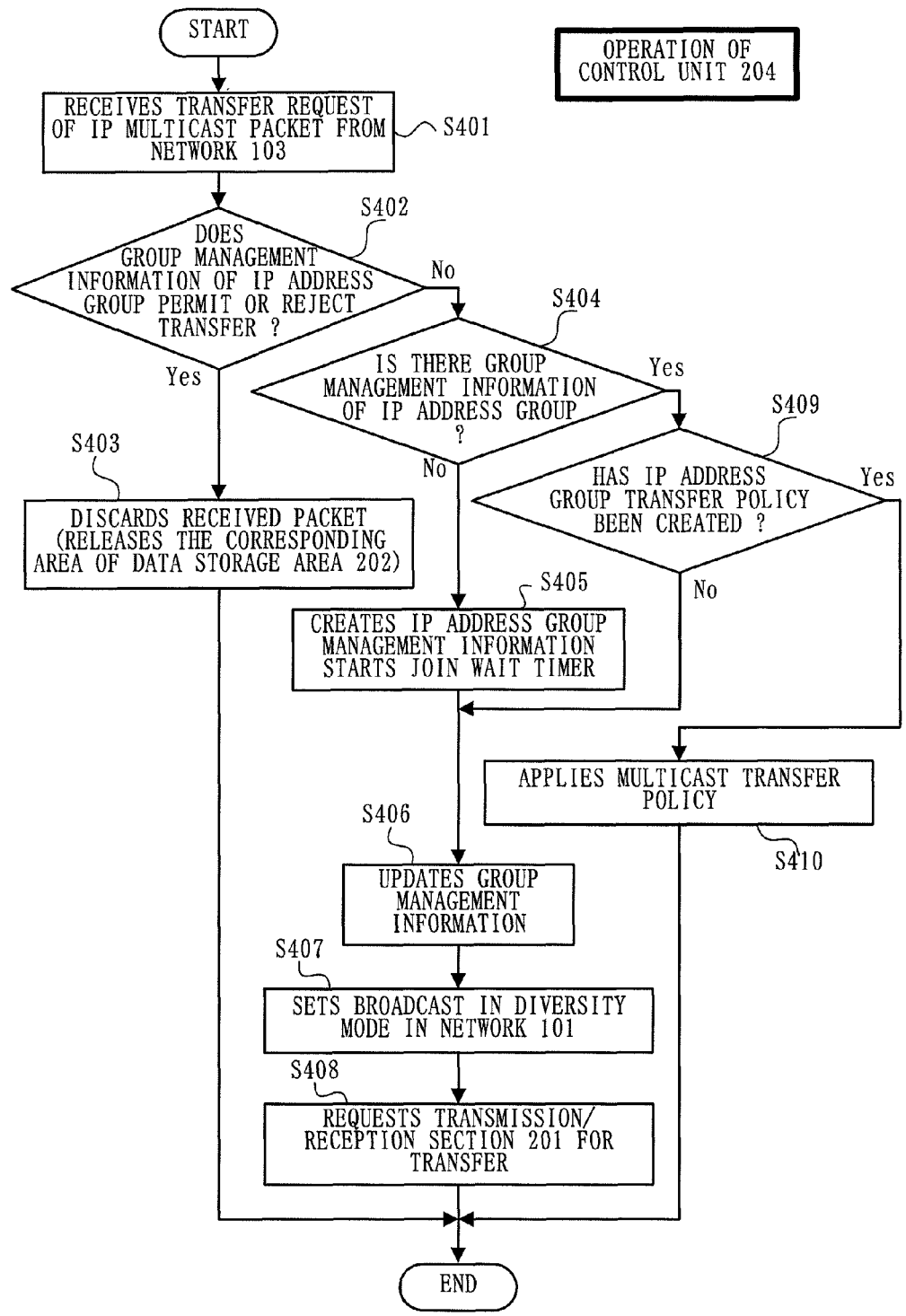
FIG. 8 shows processing of a control unit 204 of transmitting an IP multicast packet received from a network 103.

FIG. 8 illustrates the processing of the control unit 204 when the terminal 100 according to the present invention receives a multicast packet from the network 103. When the external interface section 203 receives an IP multicast packet, the control unit 204 of the terminal 100 starts the processing shown in FIG. 8.

Upon receipt of a packet from the network 103, the external interface section 203 analyzes the received packet in accordance with an upper IP protocol such as the IGMP protocol, the MLD protocol or the like. When a multicast address is described in the packet queued from the network 103, the external interface section 203 notifies the control unit 204 that a multicast packet has been received. The packet is temporarily stored in the data storage section 202.

In step S401, the control unit 204 receives a notification from the external interface section 203 that the multicast packet has been received. Upon receipt of the notification that the multicast packet has been received, the control unit 204 advances to the processing in step S402.

In step S402, the control unit 204 refers to the transfer permission/rejection flag 703 included in the group management information 701 corresponding to the multicast packet received by the external interface section 203. When the transfer permission/rejection flag 703 indicates rejection, the control unit 204 advances to step S403; whereas when the transfer permission/rejection flag 703 does not indicate rejection, the control unit 204 advances to step S404. When the group management information 701 corresponding to the multicast packet is not existent, the control unit 204 advances to step S404.

In step S403, the control unit 204 discards the received multicast packet. The control unit 204 releases the temporary area of the data storage section 202 in which the multicast packet received by the external interface section 203 has been stored.

In step S404, the control unit 204 determines whether the group management information 701 of the multicast address is existent or not. When the group management information 701 corresponding to the multicast address included in the received multicast packet is not existent, the control unit 204 advances to step S405; whereas when the group management information 701 is existent, the control unit 204 advances to step S409.

In step S405, the control unit 204 newly creates group management information 701 corresponding to the received multicast address. At this point, the control unit 204 may set the transfer permission/rejection flag 703 to "permit" and the packet type 704 to "others" as default values.

In step S405, after newly creating the group management information 701, the control unit 204 starts an IGMP (MLD) JOIN message wait timer. When a new IGMP (MLD) JOIN message is not received after a predetermined time length, the control unit 204 uses this timer to set the transfer permission/rejection flag 703 of this multicast address to "reject".

In step S405, using the IGMP (MLD) JOIN message wait timer, the control unit 204 can determine that no host belonging to this IP multicast address group is connected to the network 101. In this case, the control unit 204 can control the terminal 100 not to transfer this multicast packet. This provides an effect that the terminal 100 does not unnecessarily increase the traffic of the network 101.

The control unit 204 performs the processing in step S405 when the group management information 701 of this multicast address is not existent; namely, when a packet addressed to this multicast address has reached for the first time, or when the address group management information 701 of this IP multicast address has been erased for some reason.

In step S406, the control unit 204 compares the packet type 704 included in the group management information 701 and the packet type included in the received multicast packet. When the packet types compared are different, the control unit 204 updates the packet type 704 included in the group management information to the packet type of the received multicast packet.

The method by which the control unit 204 determines the packet type of the received multicast packet in step S406 may be as follows. The control unit 204 snoops on a ToS (Type of Service) field included in the IP header in accordance with the IP protocol and determines the packet type by an identifier defined in advance for each application. The method by which the control unit 204 determines the packet type of the received multicast packet in step S406 is not limited to the above.

In step S407, the control unit 204 sets the modulation/demodulation format for sending, to the network 101, the multicast packet to be transferred to the diversity mode, and changes the setting so as to perform a broadcast transfer to the network 101. In this embodiment, the mode by which the terminal 100 transfers a multicast packet is defined as the diversity mode, but the mode is not limited to this needless to say.

In step S408, the control unit 204 requests the transmission/reception section 201 to transfer the frame to the network 101.

In step S409, the control unit 204 determines whether or not a multicast address group transfer policy 705 corresponding to the multicast packet has already been created. When the multicast address group transfer policy 705 has been created, the control unit 204 advances to step S410; whereas when the multicast address group transfer policy 705 has not been created, the control unit 204 advances to the processing in step S406.

In step S410, the multicast address group transfer policy 705 has already been set. Therefore, the control unit 204 adopts the multicast address group transfer policy 705. The multicast address group transfer policy 705 is mainly created by the transfer management section 206. The process by which the control unit 204 creates the multicast address group transfer policy 705 will be described later.

Figure 9:
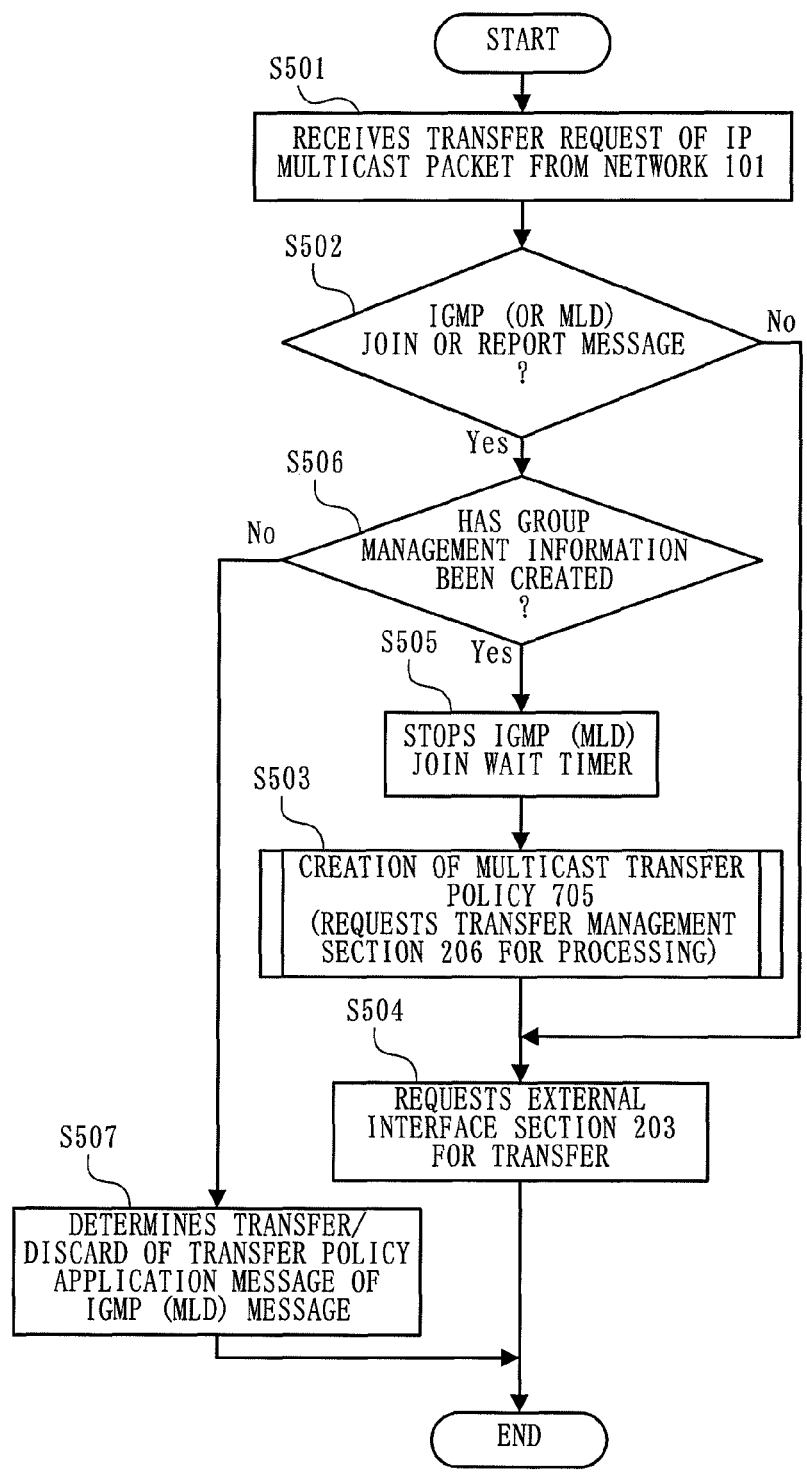
FIG. 9 shows processing of the control unit 204 of transmitting an IP multicast packet received from the network 101.

FIG. 9 illustrates processing of the control unit 204 when the terminal 100 receives a multicast packet from the network 101. When the terminal 100 receives a frame from the network 101, the processing shown in FIG. 9 is performed by the transmission/reception section 201 by a unit of the IP packet included in the frame.

Hereinafter, with reference to FIG. 9, the processing performed when the terminal 100 receives a packet from the network 101 will be described.

When an IP multicast address is set in the received IP packet, the transmission/reception section 201 notifies the control unit 204. At this point, in step S501, the control unit 204 starts the processing shown in FIG. 9. The received IP packet is temporarily stored in the data storage section 202.

In step S502, the control unit 204 analyzes the upper layer of the IP packet received by the transmission/reception section 201. When the IP packet is an IGMP (or MLD) JOIN message or a REPORT message, the control unit 204 advances to the processing in step S506. Otherwise, the control unit 204 advances to the processing in step S504.

In step S506, the control unit 204 determines whether or not the group management information 701 regarding this IP multicast address group has been created. When the group management information 701 regarding this IP multicast address group has been created, the control unit 204 advances to step S505; whereas when the group management information 701 has not been created, the control unit 204 advances to step S507.

In step S505, the control unit 204 stops an IGMP (MLD) JOIN wait timer and advances to step S503.

In step S503, the control unit 204 creates the multicast address group transfer policy 705. In step S503, the control unit 204 sets the transmission method of the packet to be transferred and the transmission map to be applied, and thus creates the multicast address group transfer policy 705. Regarding the transfer of the IP multicast packet, the control unit 204 sets the link to which the IP multicast packet is to be transferred, and sets the transmission method such as unicast, multicast, broadcast or the like and also the transmission map to be applied for each of the links used for the transfer. After performing the processing in S503, the terminal 100 advances to step S504.

The processing by which the control unit 204 creates the multicast address group transfer policy 705 will be described later.

In step S504, the control unit 204 requests the external interface section 203 to transfer the multicast packet to the network 103. When the external interface section 203 finishes the transfer of the IP packet to the network 103, the area of the data storage section 202 in which the IP packet has been stored is released. When the control unit 240 finishes the processing in step S504, the transfer of the multicast packet received from the network 101 to the network 103 is completed.

In step S507, the control unit 204 applies the multicast address group transfer policy 705 corresponding to the IGMP (MLD) message included in the frame received from the network 101 before transferring the multicast to the network 103.

For example, when the IGMP (MLD) message received by the transmission/reception section 201 is a JOIN message or a REPORT message, the external interface section 203 discards this message without transferring the message to the network 103. When the IGMP (MLD) message received by the transmission/reception section 201 is a QUERY message, the external interface section 203 may transfer this message to the network 103. The effect provided by this operation will be described later.

Figure 10A:
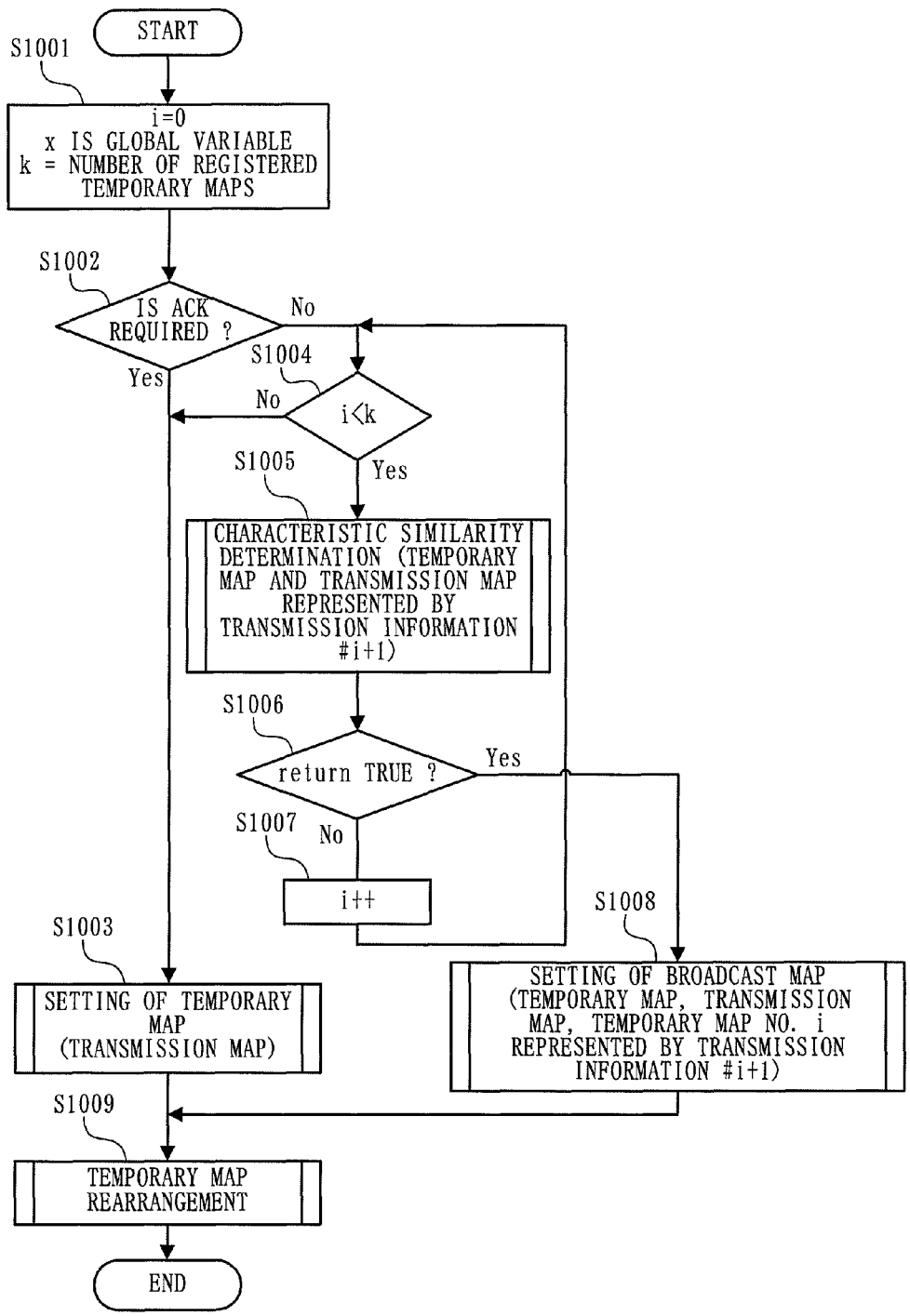
FIG. 10A shows detailed processing of a transfer management section 206 in step S503.

FIG. 10A illustrates the details of the processing by which the terminal 100 creates the multicast address group transfer policy 705 in step S503. The processing in step S503 is performed by the transfer management section 206.

In step S1001, the transfer management section 206 substitutes 0 for local variant i, and substitutes the number 722 of the temporary maps registered for this multicast address group at this stage for k. x is a global variant and is a parameter for identifying the transmission map for multicast transfer. x is initialized to 0 at an appropriate timing, for example, at the start of the terminal 100.

In step S1002, the transfer management section 206 determines whether ACK is required or not based on the loss recovery level definition specified by the packet type 704 included in the group management information 701. When ACK is required, the transfer management section 206 advances to step S1003; whereas when ACK is not required, the transfer management section 206 advances to step S1004.

In step S1003, the transfer management section 206 sets the temporary map and advances to step S1009. The details of the processing of the transfer management section 206 in step S1003 will be described later.

In step S1004, the transfer management section 206 compares i and k. When i is smaller thank, the transfer management section 206 advances to step S1005; whereas when i is not smaller thank, the transfer management section 206 advances to step S1003.

In step S1005, the transfer management section 206 performs characteristic similarity determination. The characteristic similarity determination is the processing of quantitatively determining the similarity on the frequency characteristic between the two transmission maps. The details of the processing of the transfer management section 206 in step S1005 will be described later. After performing the characteristic similarity determination in step S1005, the transfer management section 206 advances to step S1006.

In step S1006, the transfer management section 206 determines the result of the characteristic similarity determination performed in step S1005. When the result of step S1005 is TRUE, the transfer management section 206 advances to step S1008; whereas when the result of step S1005 is FALSE, the transfer management section 206 advances to the processing in step S1007.

In step S1007, the transfer management section 206 increments the parameter i by 1 and returns to the processing in step S1004.

In step S1008, the transfer management section 206 sets the multiple access map. Setting the multiple access map is the processing of updating the registered temporary map or information accompanying the registered temporary map. The details of the transfer management section 206 in step S1008 will be described later.

In step S1009, the transfer management section 206 rearranges the temporary maps and advances to step S504. The details of the transfer management section 206 in step S1009 will be described later.

Figure 10B:
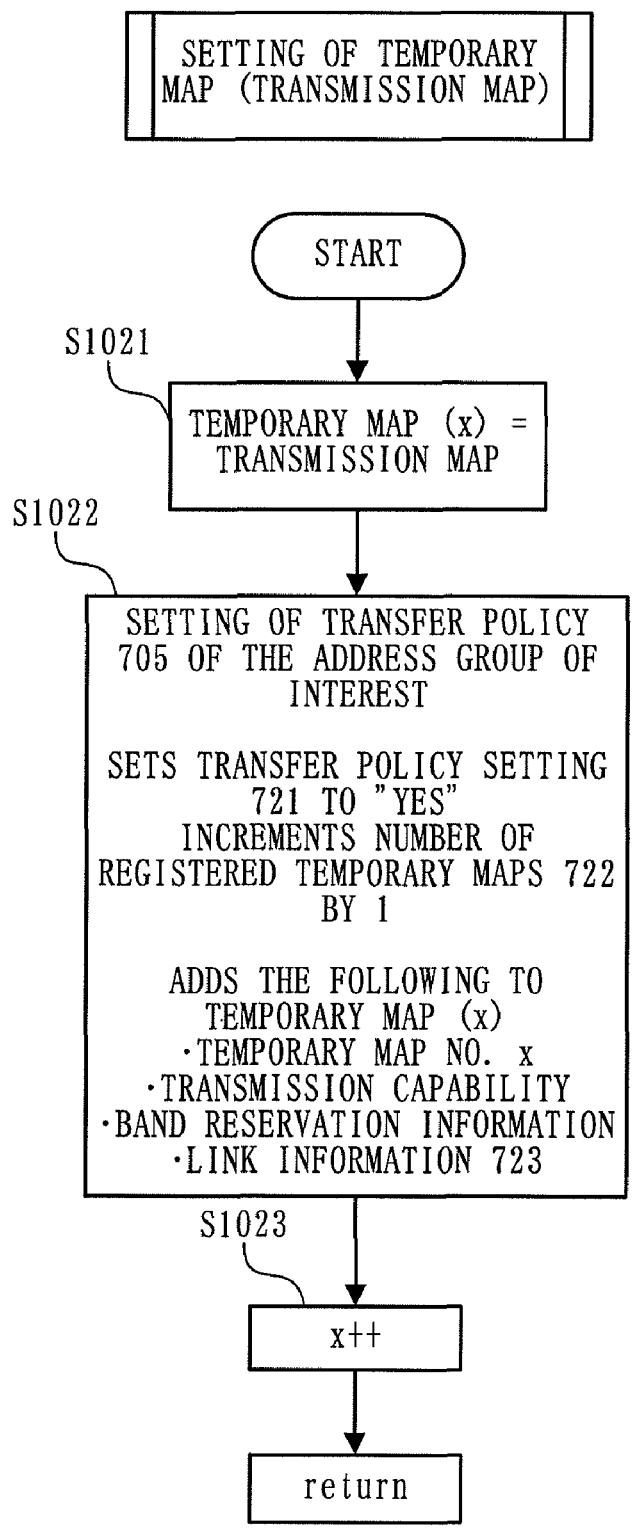
FIG. 10B shows temporary map setting

FIG. 10B illustrates the detailed operation in step S1003.

In step S1021, the transfer management section 206 registers the transmission map given as an argument in the temporary map (x).

In step S1022, the transfer management section 206 updates the multicast address group transfer policy 705. First, the transfer management section 206 updates the transfer policy setting 721 to "yes", and increments the number 722 of the temporary maps by 1. Then, the transfer management section 206 describes the temporary map No. x, the transmission capability, the band reservation information and the link information in the transmission information 723 corresponding to the number 722 of the registered maps.

In step S1023, the transfer management section 206 increments the global variant x by 1.

Figure 10C:
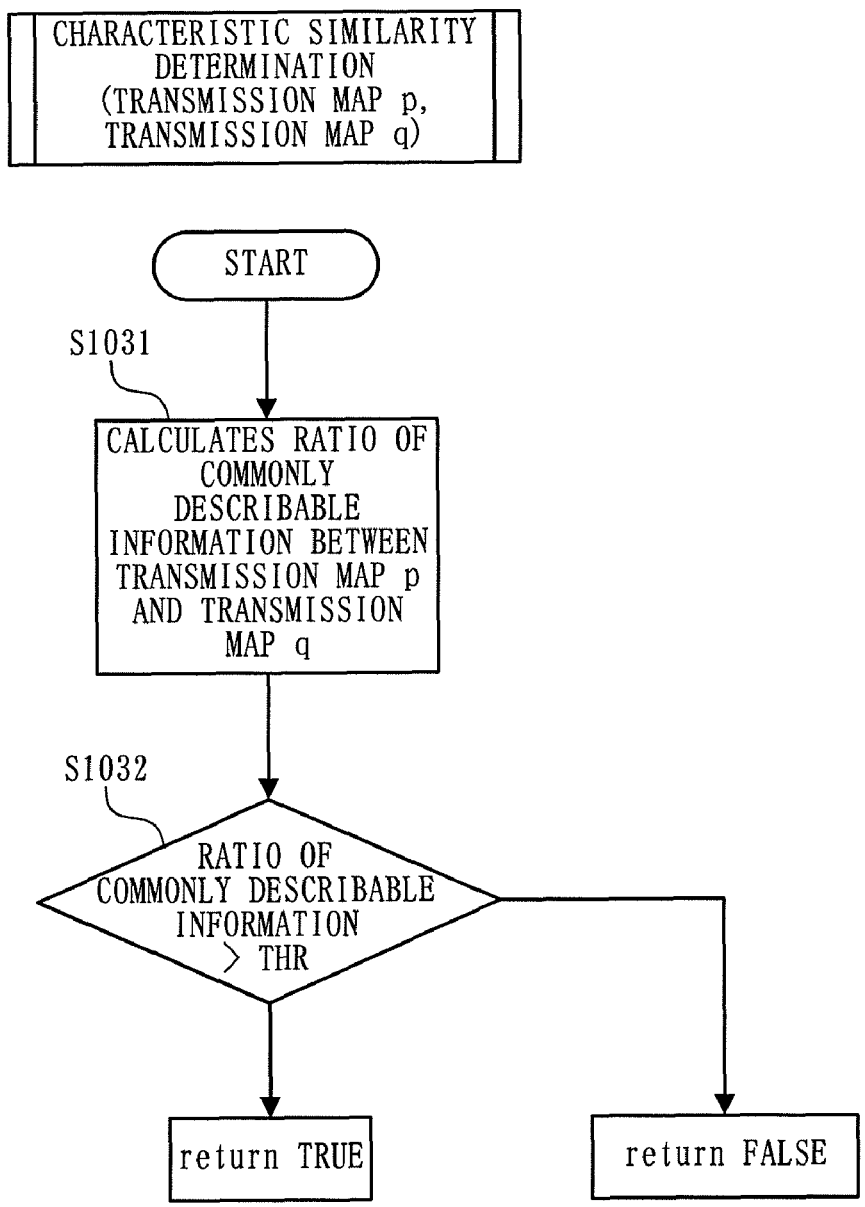
FIG. 10C shows processing of characteristic similarity determination.

FIG. 10C illustrates the detailed operation in step S1005.

In step S1031, the transfer management section 206 calculates the ratio of commonly described information between a transmission map p and a transmission map q given as an argument to the transfer management section 206. Specifically, the transfer management section 206 calculates, for all the sub carriers, the ratio of the number of units of commonly described information with respect to the total number of units of described information in the transmission map p of each sub carrier, and uses the total sum of the ratios as an index.

The ratio of commonly described information calculated in step S1031 may be calculated using a sub carrier group as one unit. The sub carrier group is obtained by grouping two or more subcarriers. Specifically, all the subcarriers are first grouped into at least one sub carrier group, and the total number of units of described information in the sub carriers included in each sub carrier group is obtained for all the sub carrier groups. The obtained number of units of described information in a sub carrier group of interest is used as the number of units of described information in the sub carrier mentioned above, and the ratio of the total number of units of commonly described information with respect to the total number of units of described information in each sub carrier group is obtained for all the sub carrier groups. The total sum of the ratios may be used as an index. Here, the "total number of units of described information in the sub carrier group" refers to the total number of units of described information in all the sub carriers included in the sub carrier group of interest. The method of grouping two or more sub carriers may be a method of grouping a plurality of sub carriers adjacent to each other on a frequency axis.

The number of sub carriers included in each sub carrier group may be different among the sub carrier groups or may be the same in all the sub carrier groups.

In step S1032, the transfer management section 206 compares the ratio of commonly described information calculated in step S1031 with a threshold value (THR). When the ratio of commonly described information is smaller than the threshold value THR, the transfer management section 206 returns TRUE; whereas when the ratio of commonly described information is not smaller than the threshold value THR, the transfer management section 206 returns FALSE. The threshold value THR may be predetermined or may be dynamically set case by case.

Figure 10D:
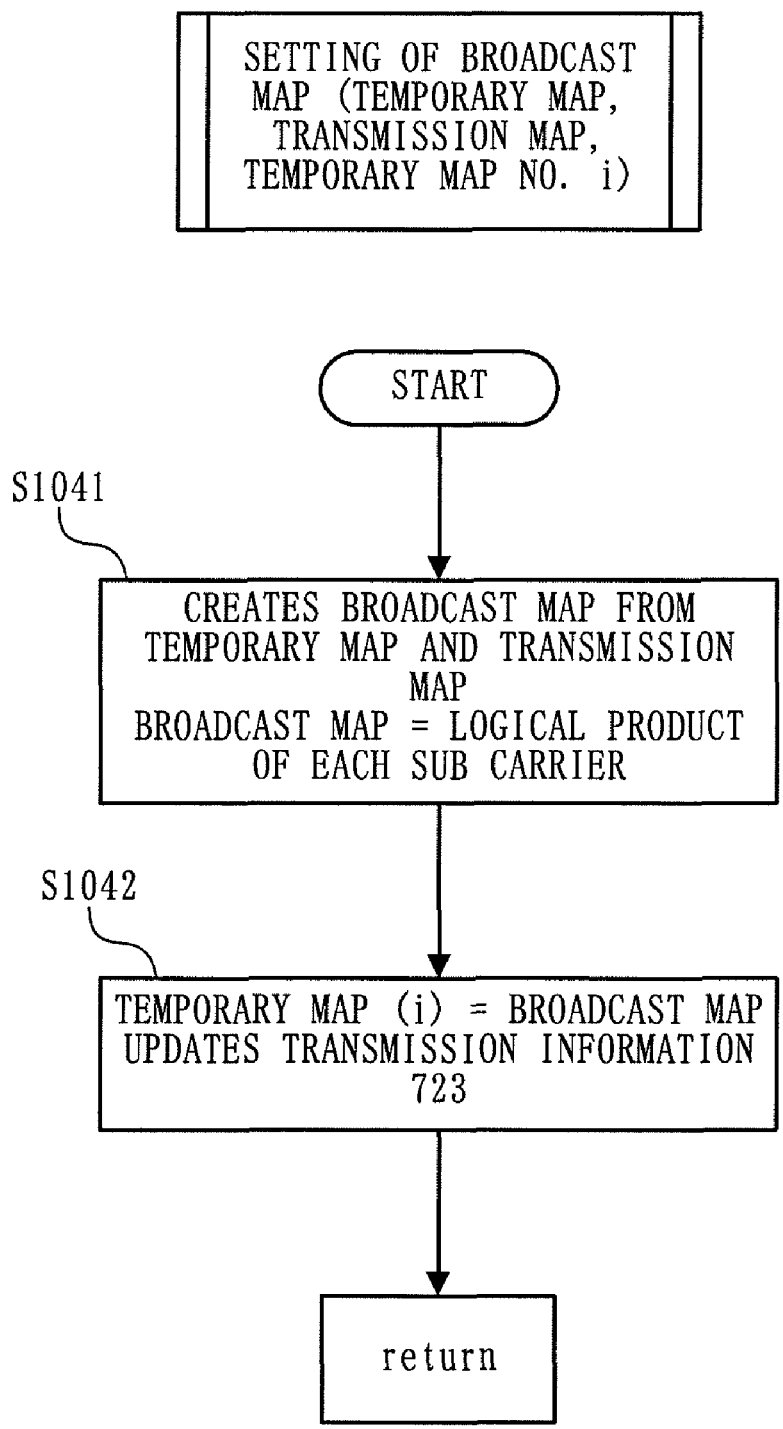
FIG. 10D shows processing of multiple access map setting.

FIG. 10D illustrates the detailed operation in step S1008.

In step S1041, the transfer management section 206 calculates a logical product of each sub carrier from the temporary map and the transmission map given by an argument and thus creates a multiple access map. In step S1041, the transfer management section 206 may use, for example, any of the following methods in addition to the method of calculating the logical product. When the error correction strength is high, a method of adding the amount of described information 1 bit by 1 bit may be used. When the packet type 704 does not require ACK, a method of decreasing the amount of described information 1 bit by 1 bit, or a method of setting the packet type 704 to a high loss recovery level and decreasing the amount of described information 1 bit by 1 bit may be used.

In step S1042, the transfer management section 206 updates a temporary map (i) specified by an argument to the multiple access map created in step S1041.

Figure 10E:
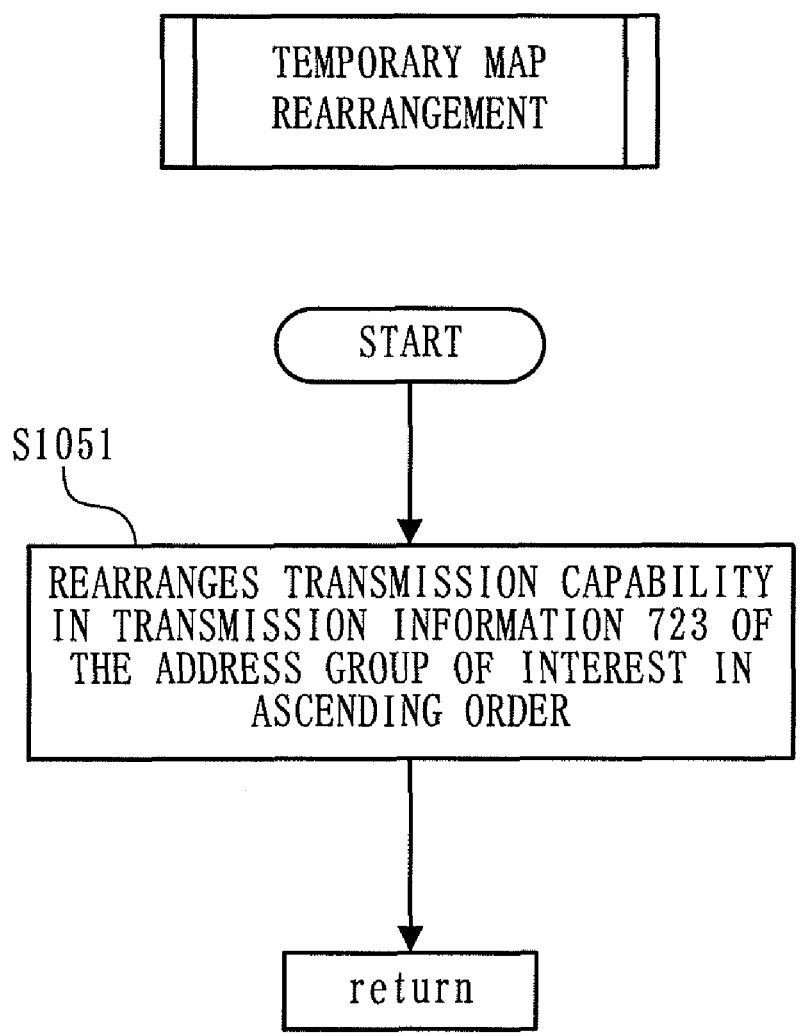
FIG. 10E shows processing of temporary map rearrangement.

FIG. 10E illustrates the detailed operation of the transfer management section 206 in step S1009.

In step S1051, the transfer management section 206 refers to the transmission capability included in the transmission information 723 of the multicast address group to rearrange the transmission information 723 in an ascending order. The "transmission capability" is a value corresponding to a substantially transmittable information amount which is determined based on a transmittable amount or an error correction strength of the registered temporary map in consideration of redundant information such as convolution code, RS code, ACK or the like. The order of rearranging the transmission information 723 does not need to be in an ascending order.

When finishing the step S1051, the transfer management section 206 returns to step S1009 shown in FIG. 10A.

So far, the functions of the terminal 100 according to the present invention have been described. Hereinafter, again with reference to FIG. 8, FIG. 9 and FIG. 10A through FIG. 10E, the operation of the terminal 100 when a host requests the network formed of the terminals 100 for a transfer of an IP multicast packet will be described more specifically and sequentially. It is assumed that the hosts 111 through 119 have IGMP protocol v2 or higher mounted thereon.

<1-1. Processing of the Terminal (A): Newly Creating a Transfer Policy>

The control unit 204 of the terminal (A) receives an IP multicast packet addressed to the multicast group address GA from the host 111. The packet type of the IP multicast packet is assumed to be "phone voice". Upon receipt of a request for a transfer of the multicast packet from the network 103, the control unit 204 of the terminal (A) performs the processing in accordance with the flowchart shown in FIG. 8.

In step S402, the control unit 204 determines whether or not the group management information 701 regarding the multicast group address GA is existent. Because the group management information 701 is not existent, the control unit 204 advances to step S404.

In step S404, because the group management information 701 is not existent, the control unit 204 advances to step S405.

In step S405, the control unit 204 creates the group management information 701 regarding the multicast group address GA. The control unit 204 describes GA in the group address 702, describes "permit" in the transfer permission/rejection flag 703, and describes "phone voice" in the packet type 704, and thus creates the group management information 701.

The transfer permission/rejection flag 703 is set to "permit" as the default when the group management information is created. The packet type 704 is determined based on the information described in the ToS area of the Ethernet (registered trademark) packet in accordance with the agreement made in advance with the application on a host generating the Ethernet (registered trademark) packet. The multicast address group transfer policy 705 is "unset". The control unit 204 starts an IGMP (MLD) JOIN wait timer TA.

In step S406, the control unit 204 checks the packet type 704 included in the group management information 701, and updates the packet type 704 if necessary.

In step S407, the control unit 204 sets the multicast packet received from the network 103 to be transferred to the network 101 by broadcast of the diversity mode.

The IP multicast packet corresponding to the multicast group G is broadcast in the network 101 and therefore reaches all the hosts 112 through 119.

Among the hosts which have received the IP multicast packet corresponding to the multicast group G, the hosts 112, 115, 116, 118 and 119 are operating an application for receiving an IP multicast packet corresponding to this group (hereinafter, these hosts will each be referred to as a "host belonging to the group").

These hosts issue an IGMP JOIN message MJ addressed to the multicast address GA as an Ethernet (registered trademark) packet in accordance with the IGMP protocol. Here, as an example, the host 115 issues the IGMP JOIN message.

The control unit 204 of the terminal (D) receives the IGMP JOIN message from the network 103 and performs the processing shown in FIG. 8. The control unit 204 of the terminal (D) receives a multicast packet belonging to the group address GA from the network 103 for the first time. Therefore, the control unit 204 of the terminal (D) advances to step S405, creates the group management information 701 and starts an IGMP JOIN wait timer TD.

The control unit 204 of the terminal (D) sets the multicast group address 702 to "GA", the transfer permission/rejection flag 703 to "permit" and the packet type 704 to "control", and thus creates the group management information 701. In this embodiment, the packet type 704 of the IGMP message is defined in advance as "control". The terminal (D) transmits the received IGMP JOIN message MJ to the network 101 by broadcast of the diversity mode.

The terminal (A) receives the IGMP JOIN message MJ issued by the host 115 from the terminal (D) via the network 101. Accordingly, the control unit 204 of the terminal (A) performs the processing shown in FIG. 9.

With reference to FIG. 9 again, the processing of the control unit 204 of the terminal (A) will be described. In step S502, because the received message is the IGMP JOIN message, the control unit 204 of the terminal (A) advances to step S506.

In step S506, because the group management information 701 has already been created, the control unit 204 of the terminal (A) determines "YES" and advances to step S505.

In step S505, the control unit 204 of the terminal (A) stops the IGMP JOIN wait timer and advances to step S503.

In step S503, the control unit 204 of the terminal (A) sets the multicast address group transfer policy 705 corresponding to the multicast address GA. The control unit 204 of the terminal (A) performs the processing shown in FIG. 10A and sets the multicast address group transfer policy 705.

With reference to FIG. 10A again, the operation of the control unit 204 of the terminal (A) of setting the multicast address group transfer policy 705 will be described.

In step S1001, the control unit 204 of the terminal (A) sets the number of temporary maps registered for the multicast address GA. Because the control unit 204 of the terminal (A) has not registered any temporary map, k is 0. x is the identifier of the temporary map. Because there is no temporary map, x is 0. i, which is used as the local variant, is initialized to 0.

In step S1002, the control unit 204 of the terminal (A) refers to the packet type 704. The packet type 704 is "phone voice". According to FIG. 6, the loss recovery level of "phone voice" is 1, and "phone voice" is defined as not requiring ACK. Accordingly, the control unit 204 of the terminal (A) determines "NO" in step S1002 and advances to step S1004.

In step S1004, i and k are 0. Therefore, the control unit 204 of the terminal (A) determines "NO" and advances to step S1003.

With reference to FIG. 10B again, the operation of the control unit 204 of the terminal (A) will be described. In step S1021, the control unit 204 of the terminal (A) makes a correspondence between a transmission map to be applied and the temporary map. In order to set the multicast address group transfer policy 705 corresponding to the terminal (D), the control unit 204 of the terminal (A) substitutes the transmission map 302 corresponding to the link II shown in FIG. 5 for the temporary map. Because the value of x is 0, the control unit 204 of the terminal (A) sets the temporary map of the terminal (D) to a temporary map (0).

In step S1022, the control unit 204 of the terminal (A) sets "yes" for the transfer policy setting 721, "1" for the number of the temporary maps, "0" for the temporary map No. of the transmission information 323 #1, and transmission capability C2 of the link II (=456) for the transmission capability, and records the band reservation information. Thus, the control unit 204 of the terminal (A) sets the multicast address group transfer policy 705 of the multicast address group GA.

The control unit 204 of the terminal (A) determines the band reservation information by the following mechanism. The link information includes information for specifying the terminal, in the network 101, to which the link information is addressed. In this example, the link information includes the information on the link II (identifier of the terminal (D) and the identifier of the host 116).

In step S1023, the control unit 204 of the terminal (A) increments x by 1. Thus, the value of x is 1.

When the processing in the step S1023 is finished, the processing of the control unit 204 of the terminal (A) in step S1003 is finished. Thus, the control unit 204 of the terminal (A) advances to step S1009.

The number of the temporary maps registered by the control unit 204 of the terminal (A) is merely 1. Accordingly, the control unit 204 of the terminal (A) finishes the operation in step S1009 without rearranging the temporary maps.

When the operation in step S1009 is finished, the operation of the control unit 204 of the terminal (A) in step S503 is finished.

As described above, in step S503, the control unit 204 of the terminal (A) has registered the temporary map (0) for the multicast address group GA, and has set the transmission map 302 of the link II in the temporary map (0). The control unit 204 of the terminal (A) finishes the setting of the multicast address group transfer policy 705 in step S503.

The multicast address group transfer policy 705 for the multicast address group GA is set in the terminal (A). Therefore, when receiving a request from the network 103 to transfer a multicast packet belonging to the multicast address group GA to the network 101 in the future, the terminal (A) applies the transmission map 302 and transfers the packet to the link II in accordance with the multicast address group transfer policy 705 included in the group management information 701 of the multicast address group GA.

In step S504, the control unit 204 of the terminal (A) transfers the received message MJ to the host 111 via the network 103.

<1-2. Processing of the Terminals (B), (C), (E) and (F)>

The IGMP JOIN message transferred by the terminal (D) is transferred by broadcast in the network 101, and therefore reaches the terminals other than the terminal (A). Here, the operation of the terminals which have received the unnecessary IGMP JOIN message will be described. The operation of the terminal (B) will be described as an example.

The control unit 204 of the terminal (B) performs the processing shown in FIG. 9 like the terminal (A). The control unit 204 of the terminal (B) has not created the group management information 701 for the multicast group G, and therefore determines "NO" in step S506 and advances to step S507.

In step S507, the control unit 204 of the terminal (B) discards the IGMP JOIN message MJ transferred from the terminal (D) in accordance with the transfer policy 705 on the IGMP message.

<2-1. Processing of the Terminal (B): Additionally Issuing the IGMP JOIN Message>

The other hosts 112, 116, 118 and 119 belonging to the multicast group G are also operating an application for receiving or sending a packet distributed by the IP multicast group G, and therefore issue an IGMP JOIN message for the multicast group G.

For example, it is assumed that after the host 115, the host 112 issues an IGMP JOIN message MK. Because the host 112 is connected to the terminal (B), the terminal (B) transmits the IGMP JOIN message MK issued by the host 112 to the network 101 by broadcast in accordance with the processing shown in FIG. 8.

After this, the terminal (B) operates in the same manner as when the host 115 transmits the IGMP JOIN message MJ to the terminal (D). Accordingly, the terminal (A) transfers the IGMP JOIN message MK, issued by the host 112 and transferred from the terminal (B), to the host 111 in accordance with the operation described below.

<2-2. Processing of the Terminal (A): Adding the Link I>

When the IGMP JOIN message issued by the host 112 reaches the terminal (A), the terminal (A) performs the processing shown in FIG. 9.

The control unit 204 of the terminal (A) advances to step S503 as in the case of processing the IGMP JOIN message MJ issued by the host 115. With reference to FIG. 10A illustrating the detailed operation in step S503 again, the operation of the control unit control unit 204 of the terminal (A) will be described.

In step S1001, the control unit 204 of the terminal (A) sets i to 0. k is the number of the temporary maps registered for the multicast address group GA. The terminal (A) has registered the temporary map for the host 115 and therefore sets k to 1. The terminal (A) has already set the global variable x to 1 when the host 115 transferred the IGMP JOIN message MJ.

In step S1002, the control unit 204 of the terminal (A) refers to the packet type 704 included in the group management information 701 and the band reservation information table shown in FIG. 6 to determine the loss recovery level corresponding to the packet type 704. The packet type 704 of the IGMP JOIN message MK issued by the host 112 is "phone voice", which is the same as the packet type 704 of the IGMP JOIN message MJ issued by the host 115.

Accordingly, the control unit 204 of the terminal (A) makes a correspondence between the loss recovery level of the "phone voice" of the band reservation information table shown in FIG. 6 and the loss recovery level definition shown in FIG. 7 and determines that ACK is not required, and thus advances to step S1004.

In step S1004, because i is 0 and k is 1, the control unit 204 of the terminal (A) determines "YES" and advances to step S1005.

In step S1005, the control unit 204 of the terminal (A) performs the processing shown in FIG. 10C. In step S1031, the control unit 204 of the terminal (A) calculates the ratio of commonly described information between the temporary map (0) currently registered and the transmission map 301 of the link I connecting the terminal (A) and the terminal (B). After calculating the ratio of commonly described information, the control unit 204 of the terminal (A) advances to step S1032.

The control unit 204 of the terminal (A) compares the similarity between the transmission map 302 registered as the temporary map (0) and the transmission map 301 in the form of parameters. In step S1032, the control unit 204 of the terminal (A) compares the calculated ratio of commonly described information and the threshold value THR. Here, the description will be made assuming that the result of the characteristic similarity determination is FALSE.

Because the result of the characteristic similarity determination is FALSE, the control unit 204 of the terminal (A) determines "NO" in step S1006 and advances to step S1007.

In step S1007, the control unit 204 of the terminal (A) increments i by 1. When finishing the operation in step S1007, the control unit 204 of the terminal (A) returns to step S1004.

In step S1004, because i is 1 and k is 1, the control unit 204 of the terminal (A) determines "NO" and advances to the processing in step S1003.

In step S1003, the control unit 204 of the terminal (A) registers the transmission map 301 in correspondence with a temporary map (1) and thus updates the multicast address group transfer policy 705 corresponding to the multicast address group GA.

The control unit 204 of the terminal (A) performs the processing shown in FIG. 10B which illustrates the detailed operation in step S1003 and thus sets "2" for the number 722 of the registered temporary maps included in the multicast address group transfer policy 705.

The control unit 204 of the terminal (A) updates the multicast address group transfer policy 705 by setting the elements included in transmission information #2 corresponding to the temporary map (1) as follows: the temporary map No. is 1, the transmission capability is 781 as the value of the transmission capability C1 of the link I, and the link information is a combination of the identifier of the terminal (A) and the identifier of the host 112. When finishing the processing shown in FIG. 10B, the control unit 204 of the terminal (A) advances to step S1009.

In step S1009, the control unit 204 of the terminal (A) compares the transmission capability included in transmission information #1 and that of the transmission information #2, and rearranges the transmission information based on the comparison result.

The control unit 204 of the terminal (A) performs the processing shown in FIG. 10E, namely, compares the transmission capability C1 of the transmission information #1 and the transmission capability C2 of the transmission information #2, and rearranges the transmission information in an ascending order of the transmission capability. Because the transmission capability C1> the transmission capability C2, these units of transmission information corresponding to the transmission capabilities are not rearranged.

The final registration result obtained in step S503 additionally includes the multicast address group transfer policy 705 corresponding to the multicast address group GA. After this, for transferring a multicast packet belonging to the multicast address group GA to the network 101, the terminal (A) transfers the multicast packet in accordance with the multicast address group transfer policy 705 included in the group management information 701 of the multicast address group GA.

The terminal (A) applies the transmission map 302 to transfer the multicast packet to the terminal (D) via the link II based on the transmission information #1, and then applies the transmission map 301 to transfer the multicast packet to the terminal (D) via the link I based on the transmission information #2.

The link information included in the transmission information #1 and the link information included in the transmission information #2 each include one identifier of each of the terminals 100. Accordingly, for transferring a multicast packet corresponding to the multicast address group GA to the network 103, the terminal (A) transmits the multicast packet to the terminals (D) and (B) by unicast via the network 101.

<2-3. Processing of the Terminals (C) through (F)>

The IGMP JOIN message MK transmitted by the host 112 is transferred by broadcast by the terminal (B) via the network 101, and therefore reaches the terminals other than the terminal (A). Here, the operation of the terminals 100 which have received the IGMP JOIN message belonging to the multicast group G registered in the group management information 701 will be described. The operation of the terminal (D) will be described as an example.

The terminal (D) has created the group management information 701 of the multicast group G when the host 115 issued the IGMP JOIN message MJ. The processing of the terminal (D) when receiving the IGMP JOIN message MK sent from the terminal (B) will be described with reference to FIG. 9 again.

In step S502, because the received message is an IGMP JOIN message, the terminal (D) determines "YES" and advances to the processing in step S506.

In step S506, the terminal (D) has the group management information 701 of the multicast address group GA to which the received IGMP JOIN message MK belongs, and therefore determines "YES" and advances to the processing in step S505.

In step S505, the terminal (D) stops the IGMP JOIN wait timer TD and advances to the processing in step S503.

After advancing to step S503, the terminal (D) performs the processing shown in FIG. 10A. In step S1001, the terminal (D) sets the local variable i to 0, x to 1 and k to 1, and advances to the processing in step S1002.

The packet type of the IGMP JOIN message is "control". Therefore, in step S1002, the terminal (D) makes a correspondence between the band reservation information table shown in FIG. 6 and the packet type 704, and determines that the transmission quality is not specified. Because the transmission quality is not specified, the terminal (D) does not perform the band reservation processing.

The terminal (D) refers to FIG. 6 to determine that the loss recovery level of the IGMP JOIN message is 7, and applies the multicast address group transfer policy 705 by which a multicast packet is sent by unicast to all the terminals.

In order to do this, the terminal (D) sets a transmission map of each link in the terminals (A), (B), (C), (E) and (F) and thus prepares the multicast address group transfer policy 705. The terminal (D) can create this by performing the processing shown in FIG. 10A for all the terminals 100 connected to the network.

<3. Processing of the Terminal (A): Creating a Multiple Access Map>

In step S1032 of FIG. 10C, the terminal 100 compares the ratio of the commonly described information and the threshold value THR. The operation of the terminal 100 when the comparison result is TRUE will be described. As an example, the operation when the host 119 shown in FIG. 1 has issued an IGMP JOIN message ML will be described.

The terminal (F) transmits the IGMP JOIN message ML issued by the host 119 by broadcast via the network 101 and thus transfers the message to the terminal (A). The processing of the terminal (A) when receiving the IGMP JOIN message ML will be described with reference to FIG. 9 again.

The terminal (A) advances to step S503 as when receiving the IGMP JOIN message MJ. In step S503, the terminal (A) performs the processing shown in FIG. 10A.

In step S1001, the terminal (A) sets the variable i to 0. k is the number 722 of the temporary maps registered for the multicast address group GA. The terminal (A) has registered the temporary map for the host 115 and the temporary map for the host 112, and therefore sets k to 2. The terminal (A) has already set the global variable x to 2 when the host 112 transferred the IGMP JOIN message MK.

In step S1002, the control unit 204 of the terminal (A) refers to the packet type 704 included in the group management information 701 and the band reservation information table shown in FIG. 6 to determine the loss recovery level corresponding to the packet type 704. The packet type 704 of the IGMP JOIN message ML issued by the host 119 is "phone voice", which is the same as the packet type 704 of the IGMP JOIN message MJ issued by the host 115.

Accordingly, the control unit 204 of the terminal (A) makes a correspondence between the loss recovery level of the "phone voice" of the band reservation information table shown in FIG. 6 and the loss recovery level definition shown in FIG. 7 and determines that ACK is not required, and thus advances to step S1004.

In step S1004, because i is 0 and k is 2, the terminal (A) determines "YES" and advances to step S1005.

In step S1005, the terminal (A) performs the processing shown in FIG. 10C. In step S1031, the terminal (A) calculates the ratio of commonly described information between the temporary map (0) and the transmission map 304 of the link IV connecting the terminal (A) and the terminal (F). The control unit 204 of the terminal (A) calculates the ratio of commonly described information and advances to step S1032.

The terminal (A) compares the similarity between the transmission map 302 registered as the temporary map (0) and the transmission map 304 in the form of parameters. In step S1032, the terminal (A) compares the calculated ratio of commonly described information and the threshold value THR. Here, the description will be made assuming that the ratio of commonly described information<THR and thus the result of the characteristic similarity determination is FALSE.

Because the result of the characteristic similarity determination is FALSE, the control unit 204 of the terminal (A) determines "NO" in step S1006 and advances to step S1007.

In step S1007, the control unit 204 of the terminal (A) increments i by 1. When finishing the operation in step S1007, the control unit 204 of the terminal (A) returns to step S1004.

In step S1004, because i is 1 and k is 2, the control unit 204 of the terminal (A) determines "YES" and advances to the processing in step S1005.

In step S1005, the terminal (A) performs the processing shown in FIG. 10C again. The terminal (A) calculates the ratio of commonly described information of the temporary map (1) and the transmission map 304 of the link IV connecting the terminal (A) and the terminal (F). After calculating the ratio of commonly described information, the terminal (A) advances to step S1032.

The terminal (A) compares the similarity between the transmission map 301 registered as the temporary map (1) and the transmission map 301 in the form of parameters. In step S1032, the terminal (A) compares the calculated ratio of commonly described information and the threshold value THR. Here, the description will be made assuming that the result of the characteristic similarity determination is TRUE.

Because the result of the characteristic similarity determination is TRUE, the terminal (A) determines "YES" and advances to step S1008.

In step S1008, the terminal (A) performs multiple access map setting. The processing of the terminal (A) of setting a multiple access map will be described with reference to FIG. 10D and FIG. 11.

In step S1041, the terminal (A) sets a multiple access map. Here, the multiple access map is created by calculating a logical product of information description areas of mutually corresponding subcarriers in two transmission maps. The terminal (A) calculates the logical product of the information description areas of mutually corresponding sub carriers in the transmission map 301 and the transmission map 304 compared in step S1005, and thus creates a multiple access map. Namely, the logical product of the information description areas of mutually corresponding sub carriers in the transmission map 301 and the transmission map 304 is a common information description area 1101 shown in FIG. 11.

Figure 11:
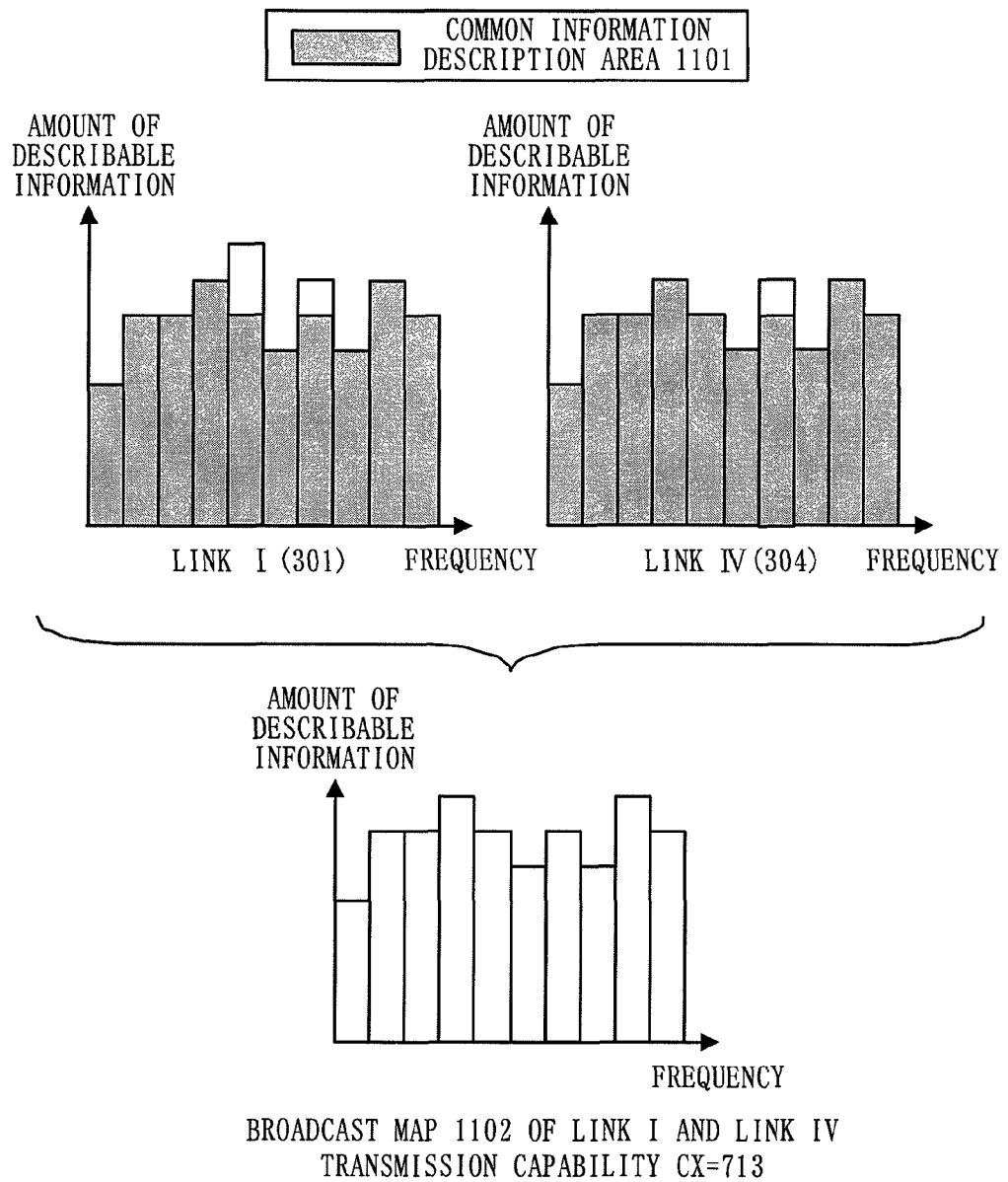
FIG. 11 shows a multiple access map of a transmission map 301 and a transmission map 304.

A multiple access map 1102 updated by the terminal (A) in step S1042 applies the common information description area 1101 shown in FIG. 11 as it is. Alternatively, the terminal (A) may adjust the common information description area 1101 in some way and apply the resultant area as a multiple access map 1202.

In step S1042, the terminal (A) overwrites the temporary map (1) corresponding to the transmission information #2 registered in the multicast address group transfer policy 705 with the multiple access map 1202 set by the terminal (A) in step S1041.

The terminal (A) updates the transmission capability of the transmission information #2 to capability CX (=713) of the multiple access map 1202, updates the band reservation information of the transmission information #2 to information matching the multiple access map 1202, and updates the link information of the transmission information #2 to the link I, the identifier of the terminal (B) and the identifier of the host 112 and also to the link IV, the identifier of the terminal (F) and the identifier of the host 119.

In step S1009, the terminal (A) compares the transmission capability included in the transmission information #1 and the transmission capability included in the transmission information #2, and rearranges these units of transmission information.

In step S1009, the terminal (A) performs the processing shown in FIG. 10E, namely, compares the transmission capability C2 of the transmission information #1 and the transmission capability CX of the transmission information #2, and rearranges these units of transmission information in an ascending order of the transmission capability. Because the transmission capability C1> the transmission capability CX, these units of transmission information corresponding to the transmission capabilities are not rearranged.

After this, the terminal (A) transfers a multicast packet based on the updated transmission information #1 and #2. Accordingly, for transferring a packet addressed to the multicast address group GA from the network 103, the terminal (A) transmits the packet by unicast to the terminal (D) by applying the transmission map 302 to the link II and transmits the packet by multiple access to the terminals (B) and (F) by applying the multiple access map 1202 to the links I and IV.

<4. Processing of the Terminal (A): Adding the Host to be Connected to the Registered Link II>

Next, the operation of the terminal (A) when receiving a request from a host included in the link already registered in the multicast address group transfer policy 705 to transfer an IGMP JOIN message will be described. As an example, the operation when the host 116 has issued an IGMP JOIN message MH will be described.

The IGMP JOIN message MH issued by the host 116 is sent by broadcast to the network 101 via the terminal (D) and reaches the terminal (A). Upon receipt of the IGMP JOIN message MH transferred by the terminal (D), the terminal (A) performs the processing shown in FIG. 9.

The terminal (A) advances to step S503 as in the case of processing the IGMP JOIN message MJ issued by the host 115. The operation of the terminal (A) will be described with reference to FIG. 10A again which illustrates the detailed operation in step S503.

In step S1001, the terminal (A) sets i to 0. k is the number 722 of the temporary maps registered for the multicast address group GA. Therefore, the terminal (A) sets k to 2. The terminal (A) has already set the global variable x to 2 when the terminal (A) received the IGMP JOIN message ML issued by the host 112.

In step S1002, the terminal (A) performs the same processing as for transferring the IGMP JOIN message ML issued by the host 112 and determines that the message is of the packet type which does not require ACK, and thus advances to step S1004.

In step S1004, because i is 0 and k is 2, the control unit 204 of the terminal (A) determines "YES" and advances to step S1005.

In step S1005, the terminal (A) performs the processing shown in FIG. 10C as for transferring the IGMP JOIN message ML issued by the host 112, namely, performs the characteristic similarity determination. In step S1031, the terminal (A) calculates the ratio of commonly described information between the temporary map (0) included in the multicast address group transfer policy 705 corresponding to the multicast address group GA and the transmission map 302 of the link II connecting the terminal (A) and the terminal (D). After calculating the ratio of commonly described information, the terminal (A) advances to the operation in step S1032.

In step S1032, the terminal (A) compares the calculated ratio of commonly described information and the threshold value THR. Here, the description will be made assuming that the temporary map (0) equals the transmission map 302 and thus the result of the characteristic similarity determination is TRUE.

Because the result of the characteristic similarity determination is TRUE, the control unit 204 of the terminal (A) determines "YES" and advances to step S1008.

In step S1008, the terminal (A) performs multiple access map setting. The operation of the terminal (A) of setting a multiple access map will be described with reference to FIG. 10D again and also FIG. 11.

In step S1041, the terminal (A) sets a multiple access map. The multiple access map is obtained by calculating a logical product of information description areas of mutually corresponding sub carriers in the transmission map 302 corresponding to the temporary map (0) and the transmission map 302 compared in step S1005.

The terminal (A) calculates the logical product by comparing the same transmission maps. Therefore, the common information description area 1101 shown in FIG. 11 is equivalent to the transmission map 302. In step S1042, the terminal (A) overwrites the temporary map (0) corresponding to transmission information #0 registered in the multicast address group transfer policy 705 corresponding to the multicast address group GA with the multiple access map equal to the transmission map 302.

Accordingly, the terminal (A) updates the transmission capability of the transmission information #1 to the capability C2 (=456) of the transmission map 302, maintains the band reservation information of the transmission information #2 as it is, and updates the link information of the transmission information #2 to the link II, the identifier of the terminal (D) and the identifier of the host 115 and also the identifier of the host 116. Thus, the terminal (A) adds the identifier of the host 116 to the transmission information #1.

In step S1009, the terminal (A) compares the transmission capability C2 included in the transmission information #1 and the transmission capability CX included in the transmission information #2, and rearranges these units of transmission information in an ascending order of the transmission capability. Because the transmission capability C2> the transmission capability CX, these units of transmission information corresponding to the transmission capabilities are not rearranged.

The terminal (A) receives a request from the network 103 to transfer a packet addressed to the multicast address group GA. The link information of the transmission information #1 includes only the link II, and therefore the terminal (A) transmits the packet to the link II by unicast by applying the transmission map 302. The link information of the transmission information #2 includes the link I and the link IV, and therefore the terminal (A) transmits the packet to the links I and IV by multiple access by applying the multiple access map 1202.

As described above, by the host 116 issuing the IGMP JOIN message MH, the identifier of the host 116 is added to the transmission information #1 included in the multicast address group transfer policy 705 corresponding to the multicast group G of the terminal (A).

<5. Processing of the Terminal (A): Adding the Link III>

The operation of the terminal (A) when the host 118 has issued an IGMP JOIN message MM will be described. Because the host 118 is connected to the terminal (E), the terminal (E) transmits the IGMP JOIN message MM issued by the host 118 by broadcast via the network 101 and thus transfers the message to the terminal (A).

The terminal (A) performs the same processing as when receiving the IGMP JOIN message MJ, and advances to step S503. The detailed operation of the terminal (A) will be described with reference to FIG. 10A again which illustrates the detailed operation in step S503.

In step S1001, the terminal (A) sets i to 0. k is the number 722 of the temporary maps registered for the multicast address group GA. Therefore, the terminal (A) sets k to 2. The terminal (A) has already set the global variable x to 2 when the terminal (A) received the IGMP JOIN message MH issued by the host 116.

In step S1002, the terminal (A) performs the same processing as for transferring the IGMP JOIN message ML issued by the host 112 and determines that the IGMP JOIN message MM issued by the host 118 is of the packet type which does not require ACK, and thus advances to step S1004.

In step S1004, because i is 0 and k is 2, the control unit 204 of the terminal (A) determines "YES" and advances to step S1005.

In step S1005, the terminal (A) performs the processing shown in FIG. 10C as for transferring the IGMP JOIN message ML issued by the host 112, namely, performs the characteristic similarity determination. In step S1031, the terminal (A) calculates the ratio of commonly described information between the temporary map (0) corresponding to the transmission information #1 included in the multicast address group transfer policy 705 corresponding to the multicast group G and the transmission map 303 of the link III connecting the terminal (A) and the terminal (E). After calculating the ratio of commonly described information, the terminal (A) advances to step S1032.

In step S1032, the terminal (A) compares the calculated ratio of commonly described information and the threshold value THR. Here, the description will be made assuming that the ratio of commonly described information<THR and thus the result of the characteristic similarity determination is FALSE.

Because the result of the characteristic similarity determination is FALSE, the control unit 204 of the terminal (A) determines "NO" in step S1006 and advances to step S1007.

In step S1007, the control unit 204 of the terminal (A) increments i by 1. When finishing the processing in step S1007, the terminal (A) returns to step S1004.

In step S1004, because i is 1 and k is 2, the control unit 204 of the terminal (A) determines "YES" and advances to the processing in step S1005.

In step S1005, the terminal (A) performs the processing shown in FIG. 10C again. The terminal (A) calculates the ratio of commonly described information between the temporary map (1) and the transmission map 303 of the link III connecting the terminal (A) and the terminal (E). After calculating the ratio of commonly described information, the terminal (A) advances to step S1032.

In step S1032, the terminal (A) compares the obtained ratio of commonly described information and the threshold value THR. Here, the description will be made assuming that the ratio of commonly described information<THR and thus the result of the characteristic similarity determination is FALSE.

Because the result of the characteristic similarity determination is FALSE, the control unit 204 of the terminal (A) determines "NO" in step S1006 and advances to step S1007.

In step S1007, the control unit 204 of the terminal (A) increments i by 1. When finishing the processing in step S1007, the terminal (A) returns to step S1004.

In step S1004, because i is 2 and k is 2, the terminal (A) determines "NO" and advances to the processing in step S1003.

In step S1003, the terminal (A) substitutes the transmission map 303 for a temporary map (2) and registers the transmission map 303, and thus updates the multicast address group transfer policy 705 for the multicast address group GA.

The control unit 204 of the terminal (A) performs the processing shown in FIG. 10B which illustrates the detailed operation in step S1003 and thus sets "3" for the number 722 of the registered temporary maps included in the multicast address group transfer policy 705.

The control unit 204 of the terminal (A) registers the elements included in transmission information #3 corresponding to the temporary map (2) as follows: the temporary map No. is 2, the transmission capability is 485 as the value of the transmission capability C3 of the link III, and the link information is a combination of the identifier of the terminal (E) and the identifier of the host 118. The terminal (A) also updates the band reservation information of the transmission information #3 to the information matching the transmission map 303.

In step S1009, the control unit 204 of the terminal (A) compares the transmission capabilities included in the transmission information #1 through the transmission information #3, and rearranges these units of transmission information in an ascending order.

The transmission capability C1 of the transmission information #1 is 456. The transmission capability CX of the transmission information #2 is 713. The transmission capability C3 of the transmission information #3 is 485. Therefore, In step S1009, the terminal (A) rearranges the transmission information #2 and the transmission information #3.

Now, the terminal (A) has received the IGMP JOIN messages from all the hosts operating a multicast packet belonging to the multicast group G. Accordingly, the terminal (A) sets the group management information corresponding to the multicast address group GA as group management information 1301 shown in FIG. 12.

The information included in a multicast address group transfer policy 1305 is that the IP multicast address group is GA, the transfer permission/rejection flag is "permit", the packet type is "phone voice", the transfer policy setting is "yes", and the number of the registered temporary maps is "3". The transmission information #1 indicates that the temporary map No. is 0, the transmission capability is 456, and the link information is link II. The band reservation information of the link II is included. The transmission information #2 indicates that the temporary map No. is 2, the transmission capability is 485, and the link information is link III. The band reservation information of the link III is included. The transmission information #3 indicates that the temporary map No. is 1, the transmission capability is 713, and the link information is link I and link IV. The band reservation information of the links I and IV is included.

Accordingly, upon receipt of a request from the network 103 to transfer a packet addressed to the multicast address group GA, the terminal (A) transmits the packet by unicast to the link II by applying the temporary map (2) and transmits the packet by multiple access to the links I and IV by applying the temporary map (1). Thus, the terminal (A) replicates the multicast packet received from the network 103 into three packets, and issues the multicast packet three times as being adapted to the frame format of the network 101.

The terminal (A) issues the multicast packets in the order of the level of the transmission capability described in the transmission information, from a higher level to a lower level. In a link with a high transmission capability and a multiple access link, the transmission delay is unlikely to occur because the transmission characteristic of the transmission path is good.

Since the terminal (A) issues the frames in the order from a link with a good transmission path characteristic and from a multiple access link, the effect that unnecessary delay to the other links does not occur can be expected.

Regarding the order by which the terminal (A) issues the multicast packets, a link not requiring ACK or a multiple access link may be prioritized; a unicast link may be prioritized over a multiple access link; or a multiple access link with a smaller number of terminals as addresses may be prioritized over a multiple access link with a larger number of terminals as addressees. Since the terminal (A) issues the frames in consideration of the order of issuance, the effect that the transmission quality deterioration due to transmission delay or the like is suppressed can be expected.

In the above description, the content of the band reservation information is not explicitly specified. According to an exemplary conceivable manner, the terminal 100 separately prepares a transmission buffer or the like such that a packet can be sent, with certainty, within a time length in which the band can be exclusively occupied, and an identifier of such a transmission buffer may be set as the band reservation information. The band reservation information may include information such as the maximum number of packets which can be carried on the network 103 for each frame transmitted in the network 101, or the effective time length of the packet.

Now, additional functions will be described.

The criterion by which the control unit 204 of the terminal (A) determines in step S507 whether to transfer or discard the received IGMP (MLD) message as described above will be described, hereinafter.

The IGMP (MLD) protocol defines that in response to a QUERY message transmitted to one multicast group, it is sufficient that any one of the terminals belonging to the multicast group issues an IGMP (MLD) REPORT message to the device which issued the IGMP (MLD) QUERY message.

For example, it is assumed that an IGMP (MLD) QUERY message is periodically issued to a host belonging to one multicast group connected to a network. In this case, by a terminal 100 discarding the IGMP (MLD) REPORT message in response to the IGMP (MLD) QUERY message, a host belonging to the group, among the hosts connected to the device 100, necessarily issues an IGMP (MLD) report message.

Accordingly, when the terminal 100 blocks the IGMP (MLD) REPORT message in response to the host which issued the IGMP (MLD) QUERY message, all the hosts belonging to the group transfer the IGMP (MLD) REPORT message to the terminal 100 connected thereto via the network 103. The operation that all the hosts belonging to the group transfer the IGMP (MLD) REPORT message to the terminal 100 connected thereto via the network 103 is effective for grasping the necessary link in step S503.

In order to transfer the IGMP (MLD) QUERY message to all the terminals 100 with certainty, the terminal 100 may apply a transfer policy of transmitting the IGMP (MLD) QUERY message by unicast. In the unicast transfer, ACK can easily be obtained. Therefore, by applying this policy, the terminal 100 can find whether or not re-transmission is necessary due to a frame loss or the like. Hence, the level of guarantee can be improved for the reason that the IGMP (MLD) QUERY message can be transferred with higher certainty. The multicast address group transfer policy 705 on the IGMP (MLD) message applied by the control unit 204 in step S507 is not limited to the above.

Figure 13:
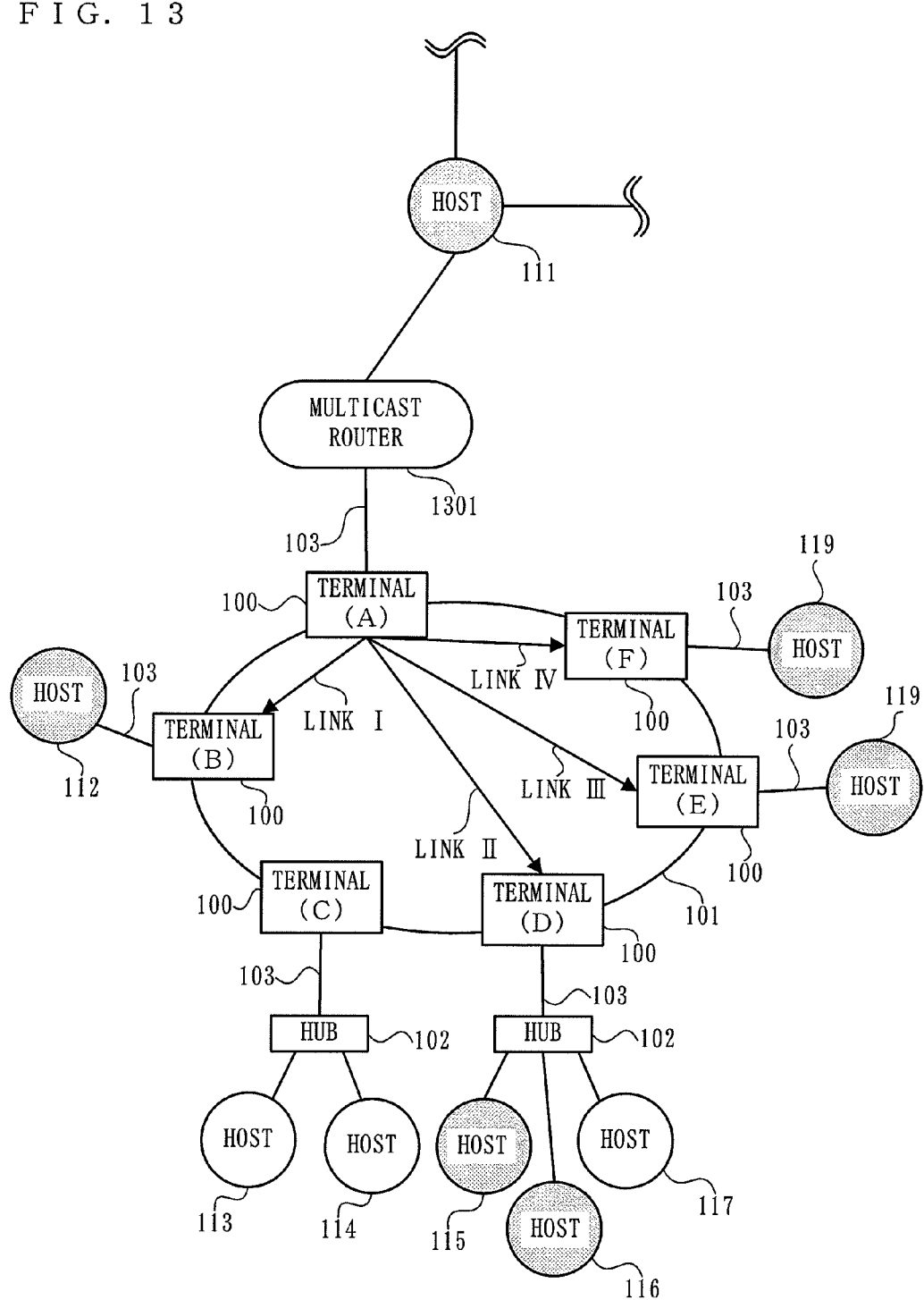
FIG. 13 shows a system including a multicast router.

FIG. 13 shows a system including a host which has a multicast router function of periodically issuing an IGMP (MLD) QUERY message in order to carry out the above-described method. The host is provided between the host 111 and the terminal (A).

In FIG. 13, a multicast router 1301 is assumed to be provided between the host 111 and the terminal (A). The multicast router 1301 periodically issues an IGMP (MLD) QUERY message belonging to the multicast group G and issued by the host 111, to ports connected to the terminal (A).

According to the IGMP specifications, a host belonging to this multicast address group issues an IGMP (MLD) REPORT message in response to the IGMP (MLD) QUERY message of this multicast address group.

When a host detects the issuance of an IGMP (MLD) REPORT message from another host belonging to the same sub network, the first host does not issue an IGMP (MLD)

REPORT message. In other words, if a host different from the host which issued the IGMP (MLD) REPORT message cannot detect the issuance of the IGMP (MLD) REPORT message, such a different host issues an IGMP (MLD) REPORT message.

By the above-described method, a mechanism by which the terminals 100 other than the terminal (A) do not transfer the IGMP (MLD) REPORT message outside the network 101 is provided. Accordingly, all the receiving hosts (one host connected to each of all the terminals belonging to the multicast group G; the host 112, the host 115 or 116, the host 118, the host 119) issue an IGMP (MLD) REPORT message, and the IGMP (MLD) REPORT message reaches the terminal 100 (A).

The hosts 115 and 116 belong to the same network 103 connected to the terminal (D). Therefore, when either the host 115 or 116 issues an IGMP (MLD) REPORT message, the host which did not issue the message does not issue another IGMP (MLD) REPORT message.

As long as the terminal (A) manages the IGMP (MLD) REPORT message in this manner, even if a host has left this multicast address group G, the terminal (A) can grasp that the host has left this multicast address group G at the precision of the cycle at which an IGMP (MLD) QUERY message is issued. Thus, a mechanism of not unnecessarily increasing the traffic of the network 101 can be provided.

According to IGMP of ver.2 and higher versions, a message explicitly notifying that a member host leaves the group is defined as an IGMP (MLD) LEAVE message. The present invention provides a method using this message to achieve the same purpose. This method will be described later.

By the above-described method, even a host conformed to IGMPver.1, which does not define the IGMP (MLD) LEAVE message, can grasp that a host leaves the group by the terminal (A). The same is true in the case where the host 111 shown in FIG. 1, which is a multicast data server, has a multicast router function.

The terminal 100 according to the present invention may further have the following mechanism, assuming that there is a host which issues an IGMP LEAVE message in order to leave the multicast address group.

Hereinafter, with reference to FIG. 14A through FIG. 14C, the processing of the terminal 100 in the case where there is a host issuing an IGMP LEAVE message will be described. In the following example described with reference to FIG. 14A through FIG. 14C, the host 119 issues an IGMP LEAVE message MN in order to leave the multicast group G.

Figure 14A:
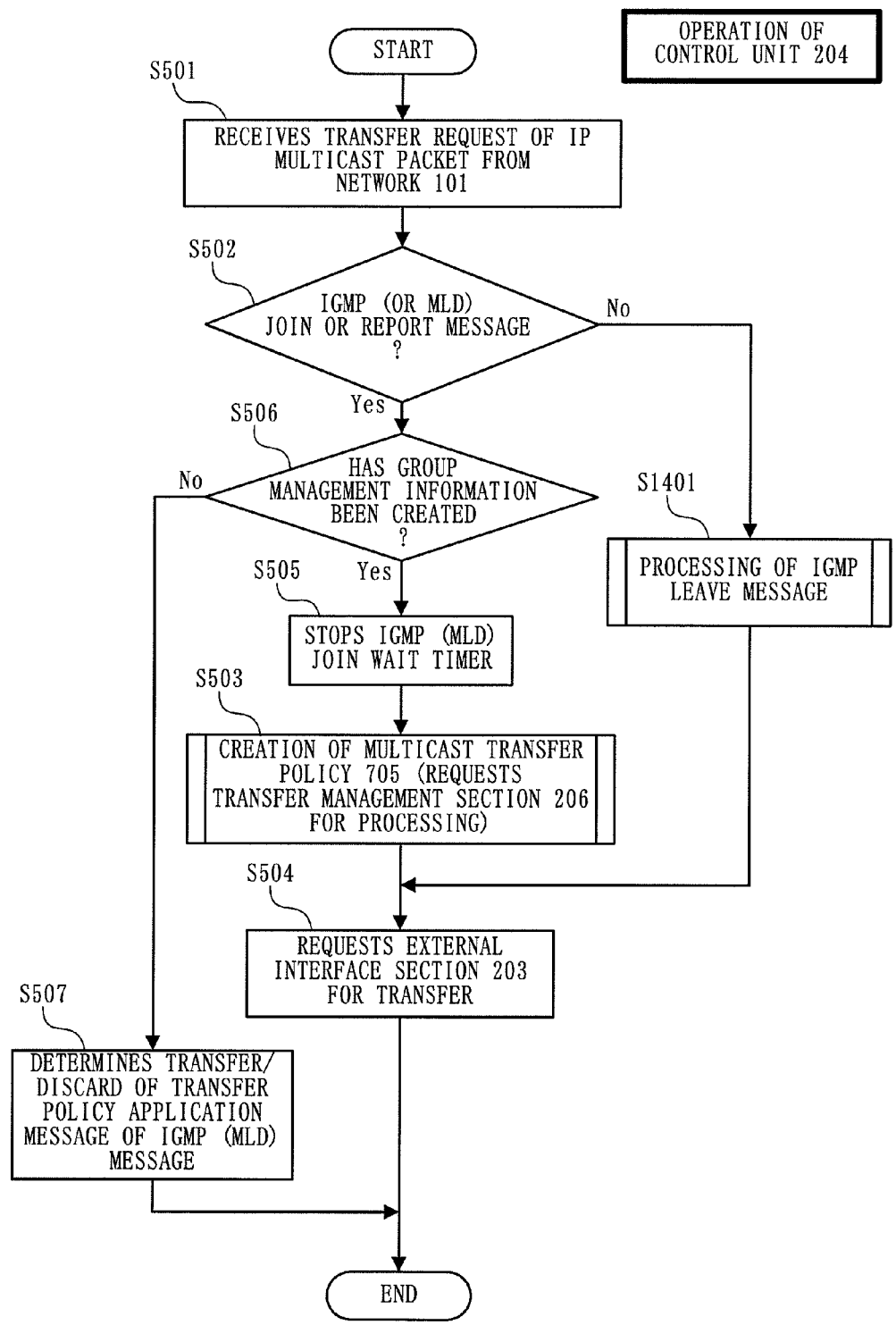
FIG. 14A shows processing of the control unit 204 of transferring an IP multicast packet received from the network 101.
Figure 14B:
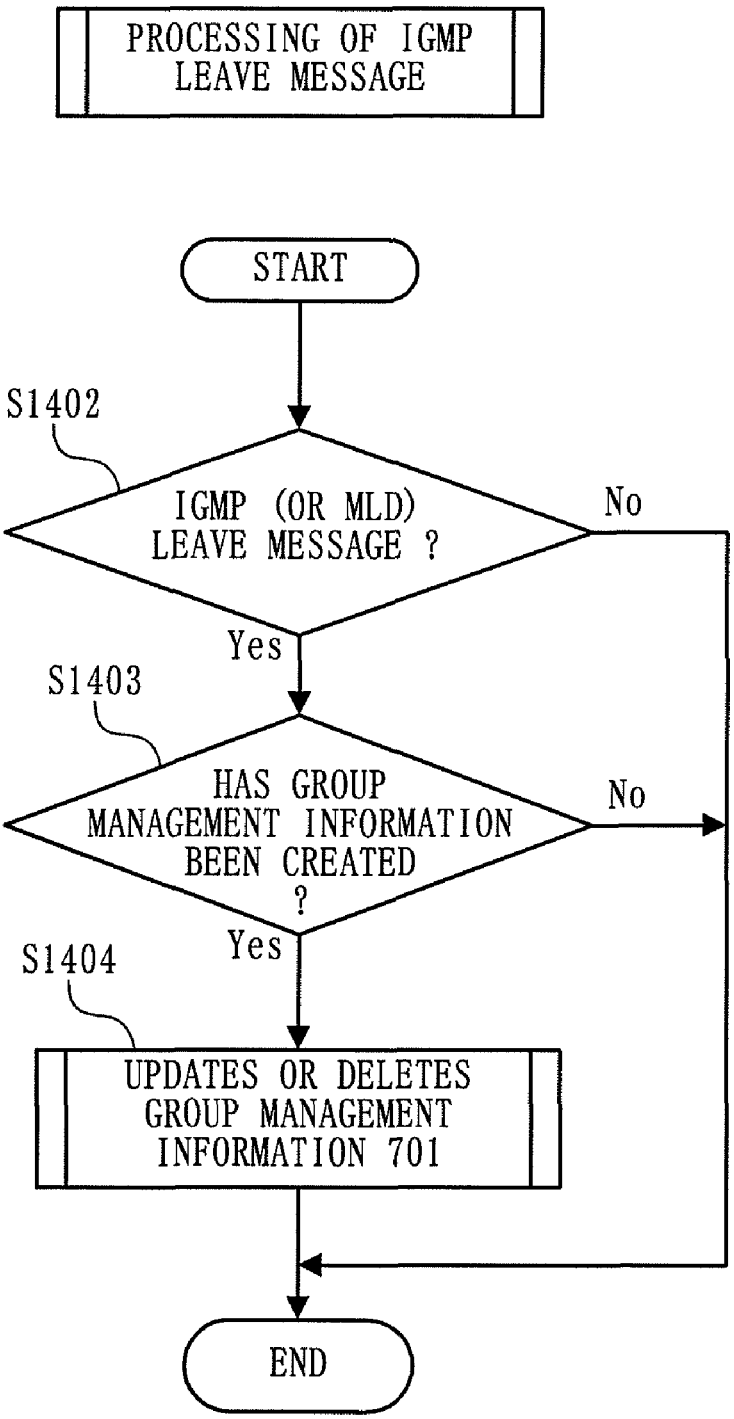
FIG. 14B shows processing on an IGMP LEAVE message.

FIG. 14A is a flowchart including the processing on the IGMP (MLD) LEAVE message. The flowchart shown in FIG. 14A includes step S1401 in addition to the flowchart shown in FIG. 9.

The operation of the terminal (A) of processing the IGMP LEAVE message will be described with reference to FIG. 14B. In step S1402, the terminal (A) determines whether the multicast packet transferred from another terminal 100 is an IGMP LEAVE message or not. When the packet is an IGMP LEAVE message, the terminal (A) advances to step S1403; whereas when the packet is not an IGMP LEAVE message, the terminal (A) terminates the processing.

In step S1403, the terminal (A) determines whether or not the group management information 701 has been created. When the group management information 701 for the multicast address group GA is not existent, the terminal (A) terminates the processing; whereas when the group management information 701 for the multicast address group GA is existent, the terminal (A) advances to step S1404.

In step S1404, the terminal (A) updates the group management information 701 of the multicast group address.

Figure 14C:
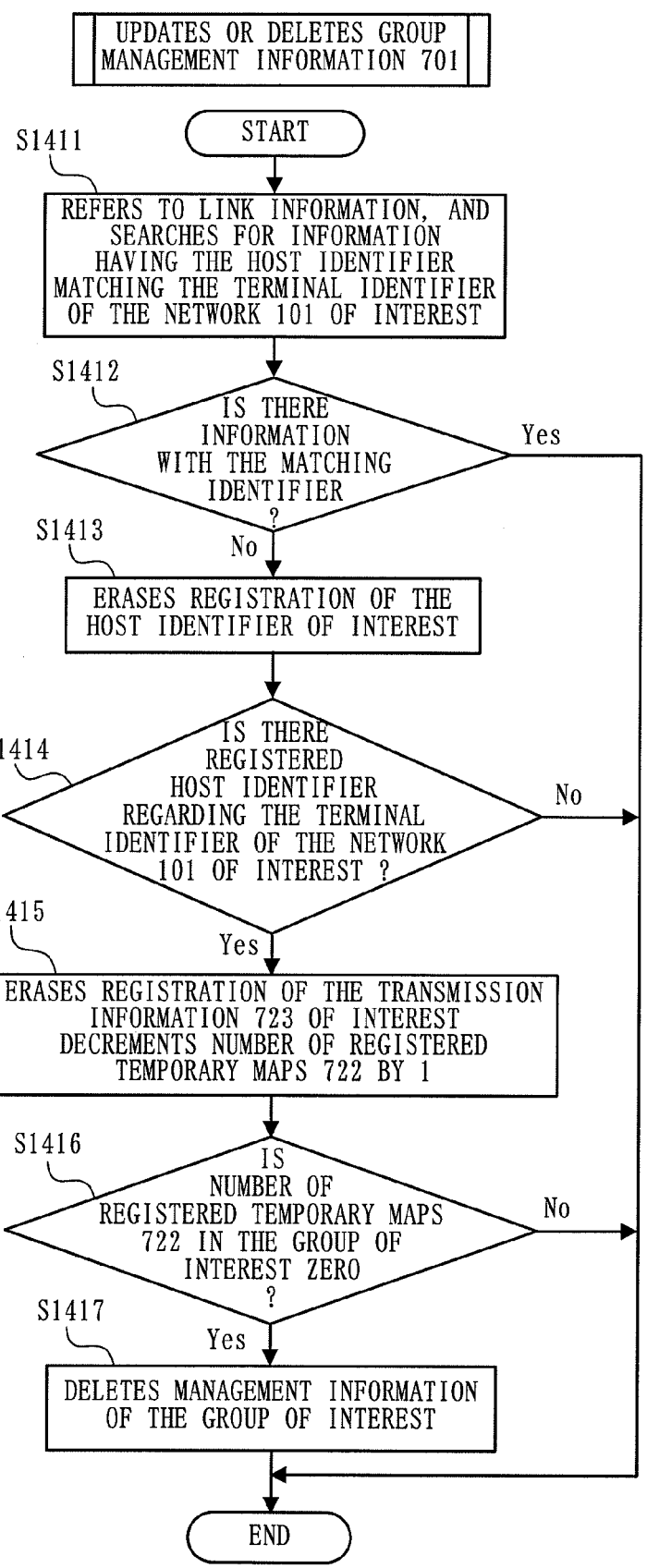
FIG. 14C shows processing of updating or deleting group management information.

FIG. 14C illustrates the detailed operation in step S1404. In step S1411, the terminal (A) refers to the host identifier of the host 119 which issued the IGMP LEAVE message MN and the terminal identifier of the terminal (F) in the network 101 which transferred the IGMP LEAVE message MN, and searches for the identifier of the host which issued the message from the group management information 701 corresponding to the multicast group G. When finishing the search, the terminal (A) advances to the processing in step S1412.

In step S1412, the terminal (A) determines whether or not a matching host identifier has been found in step S1411. When no matching host identifier has been found in step S1411, the terminal (A) terminates the processing; whereas a matching host identifier has been found, the terminal (A) advances to step S1413.

In step S1413, the terminal (A) deletes the host identifier corresponding to the host 119 from the transmission information including the identifier of the host 119. After deleting the host identifier, the terminal (A) advances to step S1414.

In step S1414, the terminal (A) determines whether or not the transmission information includes a host identifier other than the host identifier of the host 119. When there is no other host identifier, the terminal (A) advances to step S1415; whereas when there is another host identifier, the terminal (A) terminates the processing.

In step S1415, the terminal (A) deletes the transmission information which does not include the host identifier, and decrements the number of the registered temporary maps by 1. After decrementing the number of the registered temporary maps by 1, the terminal (A) advances to step S1416.

In step S1416, the terminal (A) determines whether the number of the registered temporary maps corresponding to the group management information is 0 or not. When determining that the number of the registered temporary maps is 0, the terminal (A) advances to the processing in step S1417; whereas when determining that the number of the registered temporary maps is not 0, the terminal (A) terminates the processing.

In step S1417, the terminal (A) deletes the group management information in which no temporary map is registered. After deleting the group management information, the terminal (A) terminates the processing shown in FIG. 14C and advances to step S504 shown in FIG. 14A.

<6. Processing of the Terminal (A) Deleting the Identifier of the Host 116>

In order to specifically describe the processing of the control unit 204 shown in FIG. 14, a case in which the host 116 issues an IGMP LEAVE message MP to the multicast address GA and leaves the multicast group G will be described. The host 116 is connected to the terminal (D). Therefore, the terminal (D) transfers the IGMP LEAVE message MP issued by the host 116 to the terminal (A).

Upon receipt of the IGMP LEAVE message MP transferred by the terminal (D), the control unit 204 of the terminal (A) performs the processing shown in FIG. 14A. In step S502, the received message is an IGMP LEAVE message MP, and therefore the terminal (A) advances to step S1401.

With reference to FIG. 14B again, the processing of the terminal (A) will be described. In step S1402, the terminal (A) determines whether the received message is an IGMP LEAVE message or not. In step S1402, because the received message is an IGMP LEAVE message, the terminal (A) determines "YES" and advances to step S1403.

In step S1403, the control unit 204 of the terminal (A) determines whether or not the group management information 701 corresponding to the multicast group address GA has been created. In step S1403, because the group management information 701 corresponding to the multicast group address GA has been created, the terminal (A) determines "YES" and advances to step S1404.

With reference to FIG. 14C again, the operation of the terminal (A) will be described. In step S1411, the control unit 204 of the terminal (A) searches for, and retrieves, the terminal identifier of the terminal (D) and the host identifier of the host 116 from the group management information corresponding to the multicast address group GA. When finishing the search, the terminal (A) advances to step S1412.

In step S1412, the terminal identifier of the terminal (D) and the host identifier of the host 116 are registered in the group management information 701 corresponding to the multicast address group GA. Therefore, the control unit 204 of the terminal (A) determines "YES" and advances to step S1413.

In step S1413, the control unit 204 of the terminal (A) deletes the host identifier of the host 116. Specifically, the control unit 204 of the terminal (A) deletes the identifier of the host 116 from the link information of the transmission information #1 shown in FIG. 12. After deleting the host identifier, the terminal (A) advances to the processing in step S1414.

In step S1414, the control unit 204 of the terminal (A) determines whether or not a host identifier other than the deleted host identifier of the host 116 is recorded in the transmission information #1. The identifier of the host 115 is left in the transmission information #1. Therefore, the terminal (A) determines "YES" and terminates the processing shown in FIG. 14C. Owing to this function, the control unit 204 of the terminal (A) determines a host to which the multicast packet does not need to be transferred and thus does not unnecessarily transmit a multicast packet. Therefore, an unnecessary increase of the traffic in the network 101 can be avoided.

In the case where the link in the network 101 is deleted in step S1413, the control unit 204 of the terminal (A) may start a transmission path estimation mechanism to the link indicated by the transmission information at the timing of step S1414.

If the host 119 issues an IGMP LEAVE message and leaves the multicast group G, when the control unit 204 finishes the processing in step S1413, the link information of the transmission information #3 includes only the identifier of the host 112 corresponding to the link I. However, the temporary map described in the transmission information #3 is a multiple access map of the links I and IV. Accordingly, after the host identifier of the host 119 is deleted, it is basically not necessary to consider the transmission map of the link IV when creating the multiple access map.

Hence, by the control unit 204 of the terminal (A) making a transmission path estimation on the link I, a more efficient transfer can be realized. In the case where the terminal (A) has such a function, and also in the case where the terminal (A) has a mechanism of periodically starting a transmission path estimation mechanism for each unit of transmission information, the traffic of the network 101 can be effectively reduced.

By the above-described method, when transferring a multicast packet via the network 101, the terminal (A) can realize QoS (Quality of Service) such as band guarantee or the like in the network 101. The terminal 100 according to the present invention may also have a function of automatically adjusting the band reservation.

The external interface section 203 included in the terminal 100 according to the present invention has a function of monitoring and measuring the input packet rate from the external interface section 203 for each multicast address group, and a function of comparing the content of the band reservation of the multicast address group included in the group management information 701 and the input packet rate from the network 103 and determining whether or not the comparison result has exceeded a certain threshold value.

Here, it is assumed that when the comparison result of the content of the band reservation in the network 101 and the input packet rate from the network 103 exceeds a certain threshold, the external interface section 203 causes an event via the control unit 204 such that the band reservation management section 207 adjusts the band reservation again.

The content of the adjustment performed by the band reservation management section 207 may be based on the packet rate monitored and measured by the external interface section 203. By this mechanism, the terminal 100 can cause the transmission quality by the band reservation to follow the packet rate received from the network 103.

Accordingly, the terminal 100 can prevent the waste of the band occupied by the band reservation when the packet to be transferred is not input, or can prevent the quality reduction occurring due to the shortage of the band occupied by the band reservation with respect to the actual packet rate. Thus, a high quality transmission system can be automatically realized.

In the case where while the host 118 is receiving distribution type AV contents, the multicast address group is frequently changed by channel zapping conducted by the user, the terminal 100 can perform the following operation in order to realize automatic band reservation without causing an overload.

It is assumed that the terminal 100 manages the group management information 701 corresponding to the multicast address group G and the group management information 701 corresponding to the multicast address group F.

Here, the host 118 corresponding to the multicast address group G issues an IGMP JOIN message belonging to the multicast address group F. The terminal (A) manages the host 118 in correspondence with the link III in the group management information corresponding to the multicast address group G.

The terminal (A), even if not detecting the IGMP LEAVE message to the multicast address group G, which has been issued by the host 118, cancels the band reservation of the link III corresponding to the multicast address group G.

After canceling the band reservation of the link III corresponding to the multicast address group G, the terminal (A) makes a band reservation of the link III corresponding to the multicast address group F or transfers the reserved band of the link III regarding the multicast address group G to the reserved band of the link III regarding the multicast address group F with no additional processing.

Even when the multicast address group of a certain host is frequently changed as described above, the terminal (A) performs the above-described operation and thus can realize an automatic band reservation without an overload. In this example, the determination is made based on a host identifier. Alternatively, the determination may be made based on an application identifier (IP protocol, port No., etc.) or other information.

So far, the processing of the terminal 100 according to the first embodiment has been described. After finishing the processing in step S503 shown in FIG. 9, the terminal 100 according to the first embodiment may first perform band guarantee described below and then advance to the processing in step S504.

"Band guarantee" is a method used in a concentrated control media access format for controlling media access of the network 101 by a control terminal. According to band guarantee, the control terminal assigns time lengths in which the packet transmission is permitted, such that media are assigned to the transmission terminals with priority, like the TDMA format, for example. The band guarantee provides a mechanism for guaranteeing the quality of data transmission with certainty.

The above-described band reservation mechanism requires a separate communication with a control terminal which manages the band reservation. This procedure is realized mainly by the band reservation management section 207. Hereinafter, the processing of the band reservation management section 207 for performing the band guarantee will be described.

The band reservation management section 207 refers to the packet type 704 included in the group management information 701 regarding the multicast address group GA and the band reservation information table (see FIG. 6) prepared by the vendor for each packet type.

The band reservation management section 207 refers to the packet type 704 and the band reservation information table to perform a first stage of the reservation of the transmission quality of a frame regarding the multicast address group GA issued by the terminal (A) to the network 101.

Here, the packet type 704 included in the group management information 701 regarding the multicast address group GA is set to be "phone voice". Accordingly, the band reservation management section 207 determines the request quality based on the minimum rate, maximum rate, tolerated delay and loss recovery corresponding to the "phone voice" in FIG. 6. When the request quality is determined, the band reservation management section 207 performs the procedure of the band reservation and realizes the band reservation.

When the transmission capability is changed by the change in the transmission path state, the band reservation by the band reservation management section 207 may be performed in the form of band adjustment. The band reservation information may be managed as information included in the multicast address group transfer policy 705.

FIG. 7 shows the loss recovery. The loss recovery level of "phone voice" which is set in the packet type 704 by the control unit 204 of the terminal (A) is 1. Level 1 is defined as a loss recovery level which does not need to use an error correction function by convolution code using Viterbi, Reed-Solomon (hereinafter, referred to as "RS") code or the like and does not require ACK. The definition that ACK is not required means that multiple access transmission such as multicast transmission, broadcast transmission or the like may be performed to improve the efficiency.

In order to describe the other loss recovery levels, a case where the packet type 704 is "control" will be described. With reference to FIG. 6, in the case where the packet type 704 is "control", the corresponding minimum rate, maximum rate and tolerated delay are not specified. Therefore, it is not necessary to make a reservation for band guarantee. Namely, the access may be controlled by distributed control type media access control or the like such as the CSMA/CA format.

With reference to FIG. 7, the loss recovery level is 7. The frame transmitted via the network 101 includes, as an error correction function, the convolution code using Viterbi at 50% and the RS code in 16 bytes out of 255 bytes for transmission. The control unit 204 decreases the amount of described information for each sub carrier.

For example, in the transmission map 302 of the link II, the control unit 204 decreases the amount of described information in each of ten sub carriers by 1 bit. The loss recovery level 7 is defined as requiring ACK. Therefore, the terminal (A) sets the packet to be transferred by unicast to the network 101. Alternatively, the terminal (A), even though usually performing multiple access transmission which does not require ACK, requires ACK for this link.

The terminal (A) demands ACK. By this, in the case where error correction is used for data transmission but the error is not sufficiently corrected and data is lost, the terminal (A) can grasp the data loss and re-transmit the data. The loss recovery level 7 is defined as transmitting the same frame twice in repetition.

Here, when the network 103 is an Ethernet (registered trademark), the terminal (A) may set the packet which is especially wished to be transferred in network 101 with certainty to "control". For example, an IGMP message and also an UPnP packet identifiable with the multicast address may be set to "control". For transferring the type of packet which is wished to be transferred with certainty, for example, a packet set to "control", a redundant modulation/demodulation format or the like may be applied without performing transmission path estimation.

Modification of the First Embodiment

In the first embodiment described above, the algorithm shown in FIG. 10A shows a method of making a determination from a registered temporary map having a lower transmission capability and thus setting the multiple access map uniquely In step S503, the transfer management section 206 may consider all the transmission methods and select a transmission method which is assumed to transfer data in the shortest time, when transferring data to a link to which the data needs to be transferred.

For example, the transfer management section 206 may create all the multiple access maps for a link to which the data needs to be transferred, and find a transmission method which requires the shortest transmission time to such a link, among the transmission methods such as unicast, multicast, broadcast and the like, based on the transmission capability of the transmission map and the total time calculated by taking the number of issued frames in the network 101 into account.

In the first embodiment, the algorithm as in FIG. 10A is shown in consideration of the hardware resource or the like such as the CPU load of the terminal. Instead of the algorithm shown in FIG. 10A, the following algorithm of calculating and applying the optimum transmission method may be used, needless to say.

In this modification, the algorithm in step S503 in FIG. 9 carried out in the first embodiment is modified.

Figure 15A:
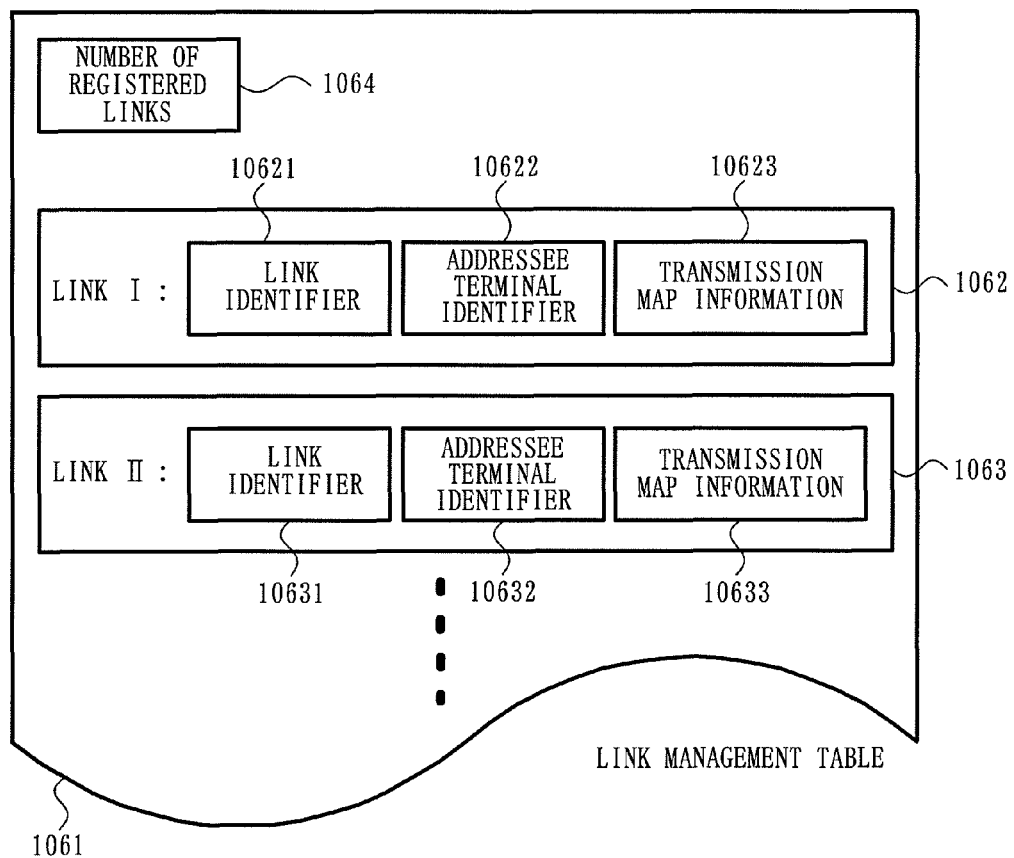
FIG. 15A shows a link management table in a modification of the first embodiment.

FIG. 15A shows a link management table 1061 used by the terminal 100 in the modification of the first embodiment.

The link management table 1061 shown in FIG. 15A manages the information on the link which defines a pair of terminal 100 and terminal 100, and is stored in the data storage section 202. The link management table 1061 includes link management information 1062 and 1063 indicating information on the link between the terminal 100 which holds this table and the addressee terminal connected thereto. The number of units of link management information corresponds to the number of the terminals connected to this terminal.

The link management information 1062 includes a link identifier 10621, an addressee terminal device identifier 10622, and transmission map information 10623. The transmission map information 10623 indicates the result of the transmission path estimation. The link management information 1063 includes substantially the same information as the link management information 1062. A number 1064 of registered links represents the number of units of link information included in the link management table 1061. The value held by the number 1064 of registered links equals to the number of terminals 100 with which this terminal 100 can communicate.

Figure 15B:
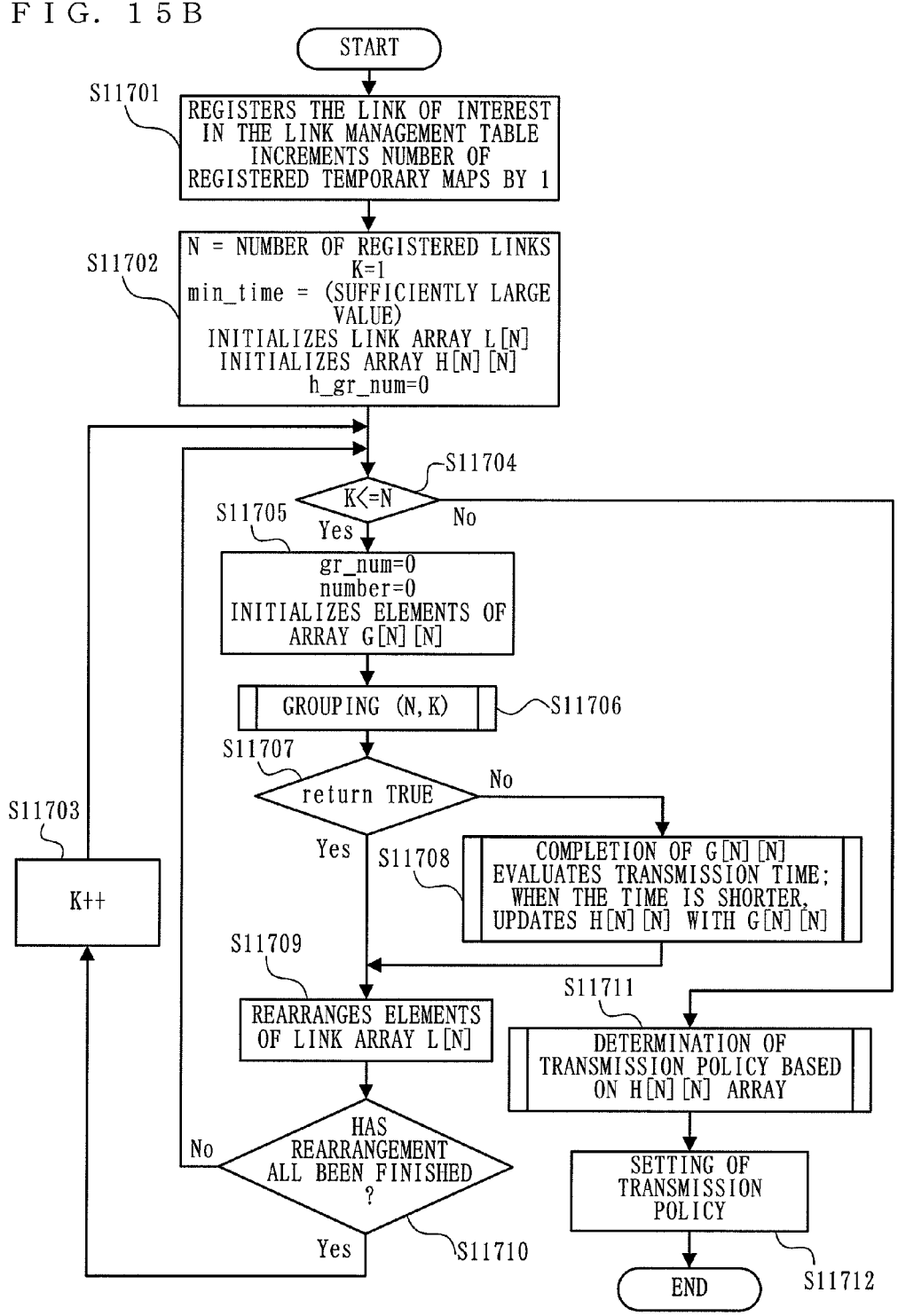
FIG. 15B shows processing of determining a transmission map in the modification of the first embodiment.

FIG. 15B shows the detailed processing of the terminal 100 in the modification of the first embodiment. The transfer management section 206 starts the processing shown in FIG. 15B upon receipt of an IGMP (MLD) message from a terminal 100.

In step S11701, the transfer management section 206 registers the link between the terminal 100 which issued the received IGMP (MLD) message and this terminal 100 in the link management table 1061, and increments the number N of registered links by 1.

In step S11702, the transfer management section 206 initializes variable K, link array L[N], array H[N] [N] and variable h_gr_num. N is a value held by the number 1064 of registered links. min_time is initialized to a sufficiently large value.

The link array L is an array for storing the link identifier 10621 or the like. The array H[N] [N] is an array for storing the group to be set in the transfer policy for transferring a multicast packet in correspondence with the link information. The array H[N] [N] stores information on the group, among all the groups, which gives the shortest transmission time min_time and information on the link corresponding to such a group. The variable h_gr_num is a variable for storing the number of rows of the array H[N] [N]. The value of the variable h_gr_num represents the number of the groups. When finishing the initialization in step S11702, the transfer management section 206 advances to step S11704.

In step S11704, the transfer management section 206 compares the value of the variable K and the value of the number N of the registered links. When the value of the variable K is equal to or greater than the number N of the registered links, the transfer management section 206 advances to step S11711; whereas when the value of the variable K is less than the number N of the registered links, the transfer management section 206 advances to step S11705.

In step S11705, the transfer management section 206 initializes group identifier gr_num, variable "number" and array G[N] [N]. The group identifier gr_num, the variable "number", the array G[N] [N], array H[N] [N], and the number N of the registered links are global variables.

The array G is an array for storing all the combinations of links in correspondence with the groups in order to determine the array H. The elements of the arrays G and H are groups and links. When finishing the processing in step S11705, the transfer management section 206 advances to step S11706.

In step S11706, the transfer management section 206 defines all the combinations of links as groups. The detailed processing in step S11706 will be described later. After defining all the combinations of links as groups, the transfer management section 206 advances to step S11707.

Figure 15C:
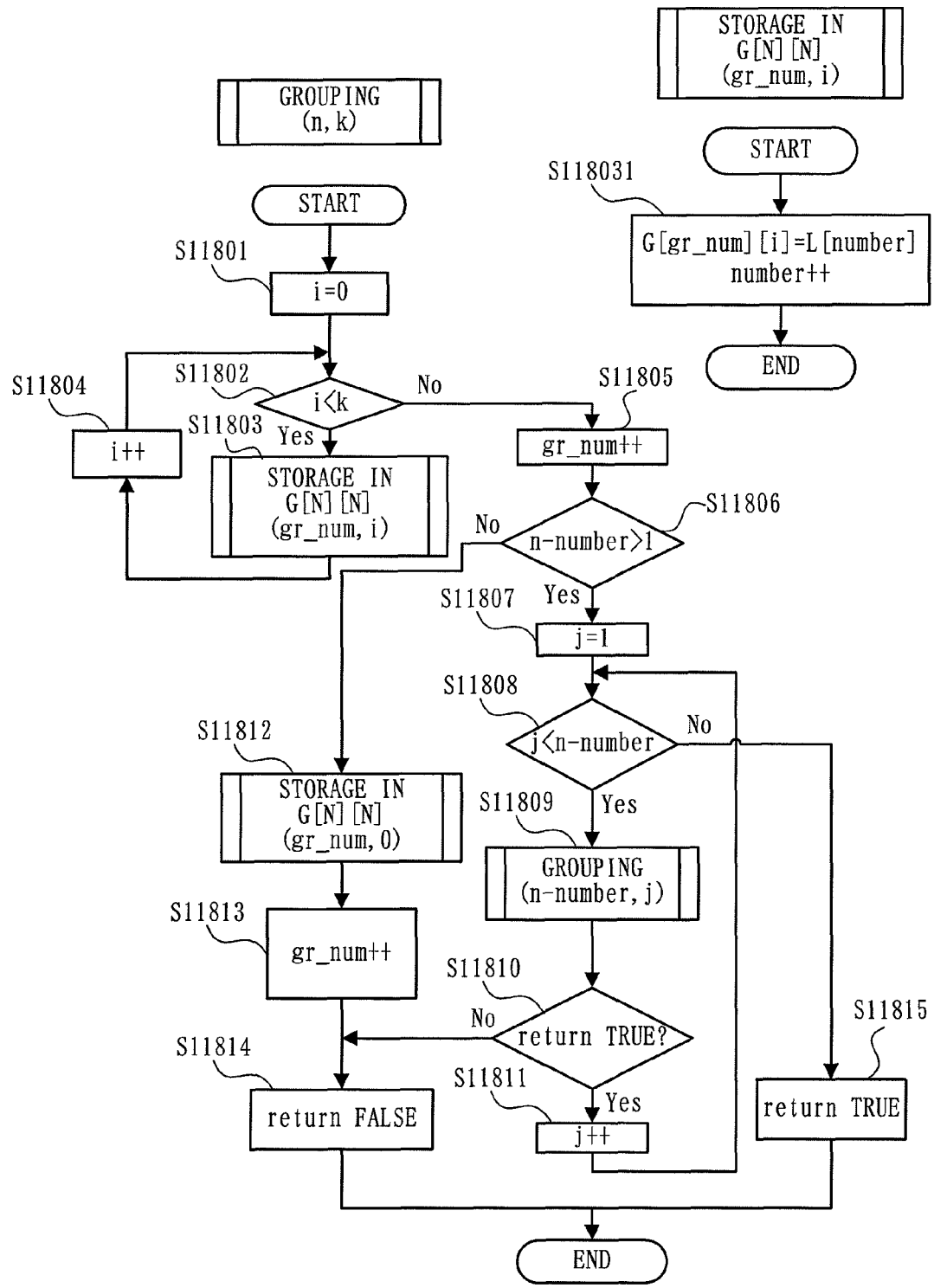
FIG. 15C shows processing of grouping in the modification of the first embodiment.

In step S11707, the transfer management section 206 performs the processing shown in FIG. 15C to determine whether TRUE or FALSE is stored in the data storage section 202. When TRUE is stored in the data storage section 202, the transfer management section 206 advances to step S11709; whereas when FALSE is stored in the data storage section 202, the transfer management section 206 advances to step S11708.

In step S11709, the transfer management section 206 rearranges the link array L[N] and advances to the processing in step S11710.

In step S11710, the transfer management section 206 determines whether the evaluation on the transmission time in step S11708 has been finished for the rearrangement of the entire link L[N]. When the evaluation on the transmission time has not been finished, the transfer management section 206 advances to step S11703; whereas when the evaluation on the transmission time has been finished, the transfer management section 206 returns to the processing in step S11704.

In step S11703, the transfer management section 206 increments the variable K by 1 and advances to step S11704. The variable K represents the number of links included in the group.

In step S11711, the transfer management section 206 sets the transfer policy based on the group and the link included in array H[N] [N], and advances to step S11712. The detailed processing of the transfer management section 206 in step S11711 will be described later.

In step S11712, the transfer management section 206 sets a multicast address group transfer policy 705 as in step S1022 shown in FIG. 10B based on the array H[N][N].

Also for performing the processing shown in FIG. 15B, the transfer management section 206 can find the optimum transmission map and perform a fast and stable multiple access transmission in substantially the same manner as in step S503 in FIG. 9 described in the first embodiment.

FIG. 15C illustrates the detailed processing in step S11706.

In step S11801, the transfer management section 206 sets variable i to 0 and advances to the processing in step S11802.

In step S11802, the transfer management section 206 compares the value of the variable i and the value of variable k. In step S11802, when the value of the variable i is less than the value of the variable k, the transfer management section 206 advances to step S11803; whereas when the value of the variable is not less than the value of the variable k, the transfer management section 206 advances to step S11805.

In step S11803, the transfer management section 206 substitutes the link identifier stored in the link array L[number] for the array G[gr_num] [i] and increments the value of the variable "number" by 1. When finishing the processing in step S11803, the transfer management section 206 advances to the processing in step S11804.

In step S11804, the transfer management section 206 increments the value of the variable i by 1 and returns to step S11802.

The transfer management section 206 repeats the operation of steps S11802 through S11804 while incrementing the variable i and the variable "number" 1 by 1, by the number of times specified by the variable k. Accordingly, the number of links corresponding to the link identifier included in the group corresponding to the group identifier gr_num becomes equal to the value of the variable k. The processing shown in FIG. 15C is performed in repetition in accordance with the value of the variable K which is incremented in step S11703 shown in FIG. 15B. Accordingly, the transfer management section 206 generates all the combinations of the links of the number equal to the value of the variable k, as groups.

In step S11805, the transfer management section 206 increments the value of the group identifier gr_num by 1 and advances to step S11806.

In step S11806, the transfer management section 206 obtains the difference between the number N of the registered links and the variable "number", and determines whether the obtained difference is larger than 1 or not. When the difference between the number N of the registered links and the variable "number" is larger than 1, the transfer management section 206 advances to step S11807; whereas when the difference is smaller than 1, the transfer management section 206 advances to step S11812.

In step S11807, the transfer management section 206 substitutes 1 for variable j and advances to the processing in step S11808.

In step S11808, the transfer management section 206 obtains the difference between the number N of the registered links and the variable "number", and determines whether the obtained difference is larger than the value of the variable j or not. When the difference between the number N of the registered links and the variable "number" is larger than the value of the variable j, the transfer management section 206 advances to step S11809; whereas when the difference is smaller than the value of the variable j, the transfer management section 206 advances to step S11815.

In step S11809, the transfer management section 206 performs again the processing shown in FIG. 15C recursively. Namely, the transfer management section 206 repeats the processing in steps S11801 through S11809, and therefore stores the combinations of all the links and the group identifier gr_num in the array G[gr_num] [i] and stores the combinations of the links as the group.

In step S11810, the transfer management section 206 determines whether the result of the processing in step S11809 (namely, the value returned in step S11814 or S11815 of the processing called recursively) is TRUE or FALSE. When the result of the processing in step S11809 is TRUE, the transfer management section 206 advances to step S11811; whereas when the result is FALSE, the transfer management section 206 advances to step S11814.

In step S11811, the transfer management section 206 increments the value of the variable j by 1 and returns to the step S11808.

The transfer management section 206 returns to step S11812 when it is determined "NO" in step S11806. In step S11812, the transfer management section 206 substitutes the elements of the array L[number] for the elements of the array G[gr_num] [0], and advances to step S11813.

In step S11813, the transfer management section 206 increments the value of the group identifier gr_num by 1 and advances to step S11814.

In step S11814, the transfer management section 206 returns FALSE.

In step S11815, the transfer management section 206 returns TRUE.

Figure 15D:
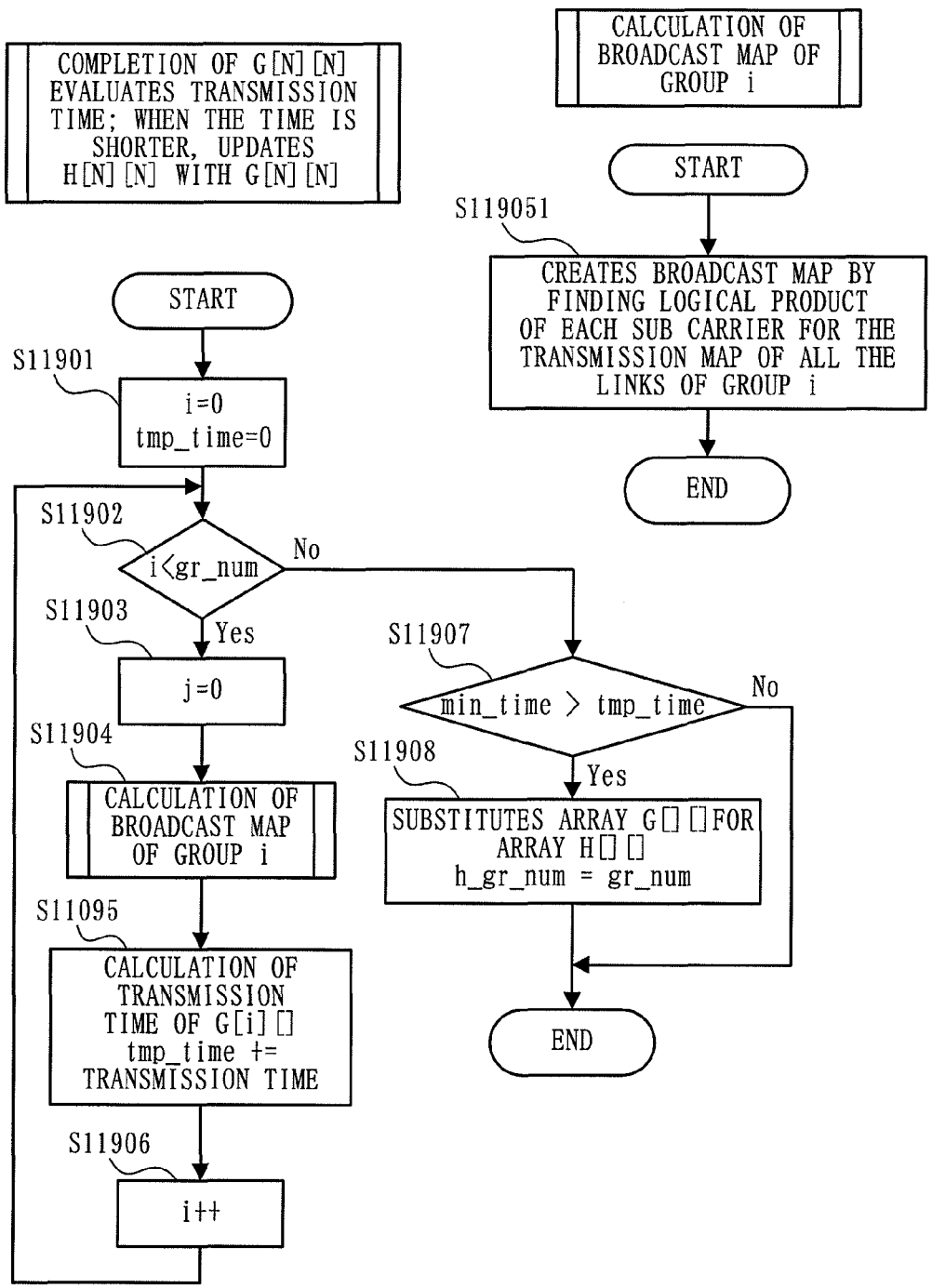
FIG. 15D shows processing of specifying a group with the shortest transmission time.

FIG. 15D illustrates the processing in step S11708 shown in FIG. 15B in detail.

In step S11901, the transfer management section 206 sets the variable i and variable tmp_time to 0, and advances to step S11902.

In step S11902, the transfer management section 206 compares the variable i and the group identifier gr_num. When the variable i is smaller than the group identifier gr_num, the transfer management section 206 advances to step S11903; whereas when the variable i is larger than the group identifier gr_num, the transfer management section 206 advances to step S11907.

In step S11903, the transfer management section 206 sets the value of the variable j to 0, and advances to step S11904.

In step S11904, the transfer management section 206 calculates a logical product of each sub carrier in the transmission map of all the links included in array G[i] [ ], and thus creates a multiple access map. When finishing the creation of the multiple access map, the transfer management section 206 advances to step S11905.

In step S11905, the transfer management section 206 calculates the time required to send desired data in the created multiple access map, and adds the calculated time to the variable tmp_time. After adding the calculated time to the variable tmp_time, the transfer management section 206 advances to step S11906.

The transmission map indicates a transmittable data amount for each symbol length. Therefore, the transfer management section 206 calculates a transmission time required to transmit desired data, based on the requested transmission data amount or a predetermined value and the transmission map. The transfer management section 206 may calculate the transmission time in step S11905 in consideration of the inter-frame time (IFS) defined by the specification of L2 and overhead other than data to be transmitted such as the frame header or the like.

In step S11906, the transfer management section 206 increments the variable i by 1 and returns to the processing in step S11902.

The transfer management section 206 reaches step S11906 when it is determined that the variable i is not smaller than the group identifier gr_num in step S11902. In step S11906, the transfer management section 206 compares the value of variable min_time and the value of the variable tmp_time. When the value of the variable tmp_time is smaller than the value of the variable min_time, the transfer management section 206 advances to step S11907; whereas when the value of the variable tmp_time is not smaller than the value of the variable min_time, the transfer management section 206 terminates the processing shown in FIG. 15D.

In step S11907, the transfer management section 206 substitutes the array G[N] [N] for the array H[N] [N] and substitutes the group identifier gr_num for variable h_gr_num. After substituting the group identifier gr_num for the variable h_gr_num, the transfer management section 206 terminates the processing shown in FIG. 15D and advances to step S11709.

As a result of performing the processing shown in FIG. 15D, the transfer management section 206 stores the multiple access map providing the shortest transmission time in the array H[N] [N].

Figure 15E:
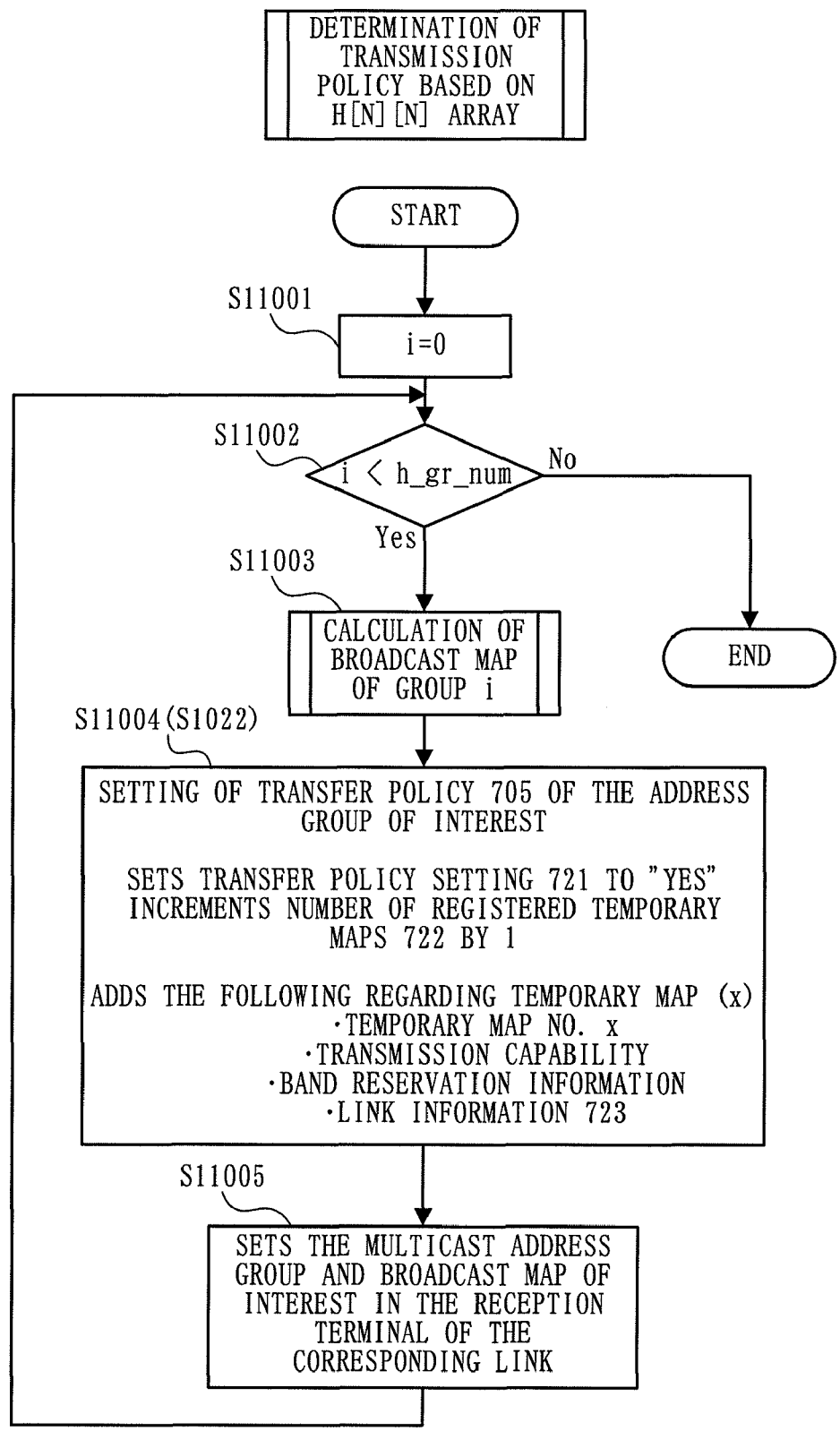
FIG. 15E shows processing of setting a group transfer policy with the shortest transmission time.

FIG. 15E shows the processing of the transfer management section 206 in step S11711 shown in FIG. 15B.

In step S11001, the transfer management section 206 initializes the variable i to 0 and advances to step S11002.

In step S11002, the transfer management section 206 compares the variable i and the variable h_gr_num. When the variable i is smaller than the variable h_gr_num, the transfer management section 206 advances to the processing in step S11003. When the variable i is larger than the variable h_gr_num, the transfer management section 206 terminates the processing shown in FIG. 15E and advances to step S11712 shown in FIG. 15B.

In step S11003, the transfer management section 206 calculates a logical product of each sub carrier in the transmission map of all the links included in array H[i] [ ], and thus creates a multiple access map. After creating the multiple access map, the transfer management section 206 advances to step S11004.

In step S11004, the transfer management section 206 performs the same processing as in step S1022 shown in FIG. 10B, and sets the calculated multiple access map in step S11003 in the multicast address group transfer policy 705.

In step S11005, the transfer management section 206 notifies the multicast address group and the multiple access map to all the terminals corresponding to all the links included in the array H[N] [N]. After notifying the multicast address group and the multiple access map, the transfer management section 206 returns to step S11002.

Second Embodiment

In a second embodiment, the speed of multiple access transmission is increased by a simpler method than in the first embodiment. The first embodiment is especially effective in a medium, such as an existing dedicated line or the like, which does not have much varied frequency characteristic on the transmission path.

The basic structure of a terminal 100 according to the second embodiment is the same as that according to the first embodiment. Thus, FIG. 1 through FIG. 3 are incorporated in this embodiment and the description of the structure will be repeated. As in the first embodiment, it is assumed that the network 103 is conformed to the Ethernet (registered trademark) standard. In the second embodiment, also as in the first embodiment, a multiple carrier transmission by DMT is performed in the network 101.

Figure 16:
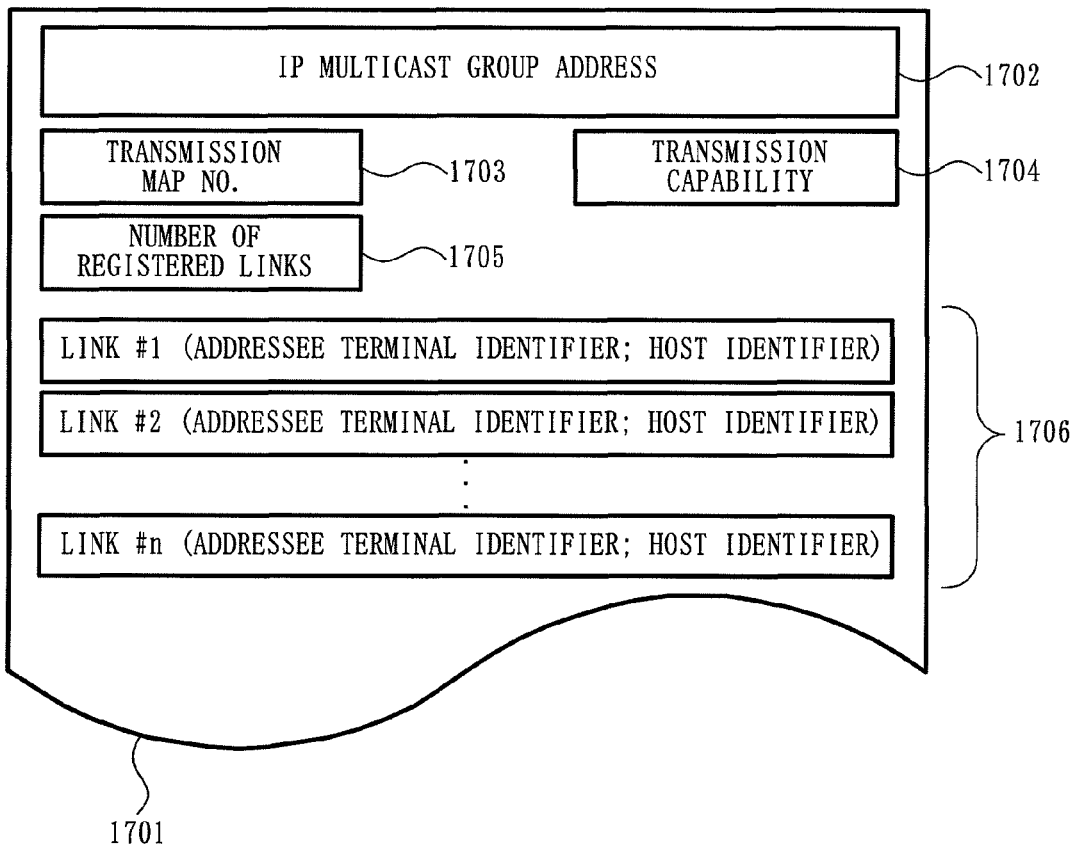
FIG. 16 shows group management information managed by a terminal 100 according to a second embodiment.

FIG. 16 shows a structure of group management information 1701 used by the terminal 100 in the second embodiment.

The group management information 1701 according to the second embodiment includes an IP multicast group address 1702, a transmission map No. 1703, a transmission capability 1704, a number 1705 of registered links, and a plurality of units of link information 1706. Each of the units of the link information 1706 includes an addressee terminal identifier and a host identifier.

Figure 17:
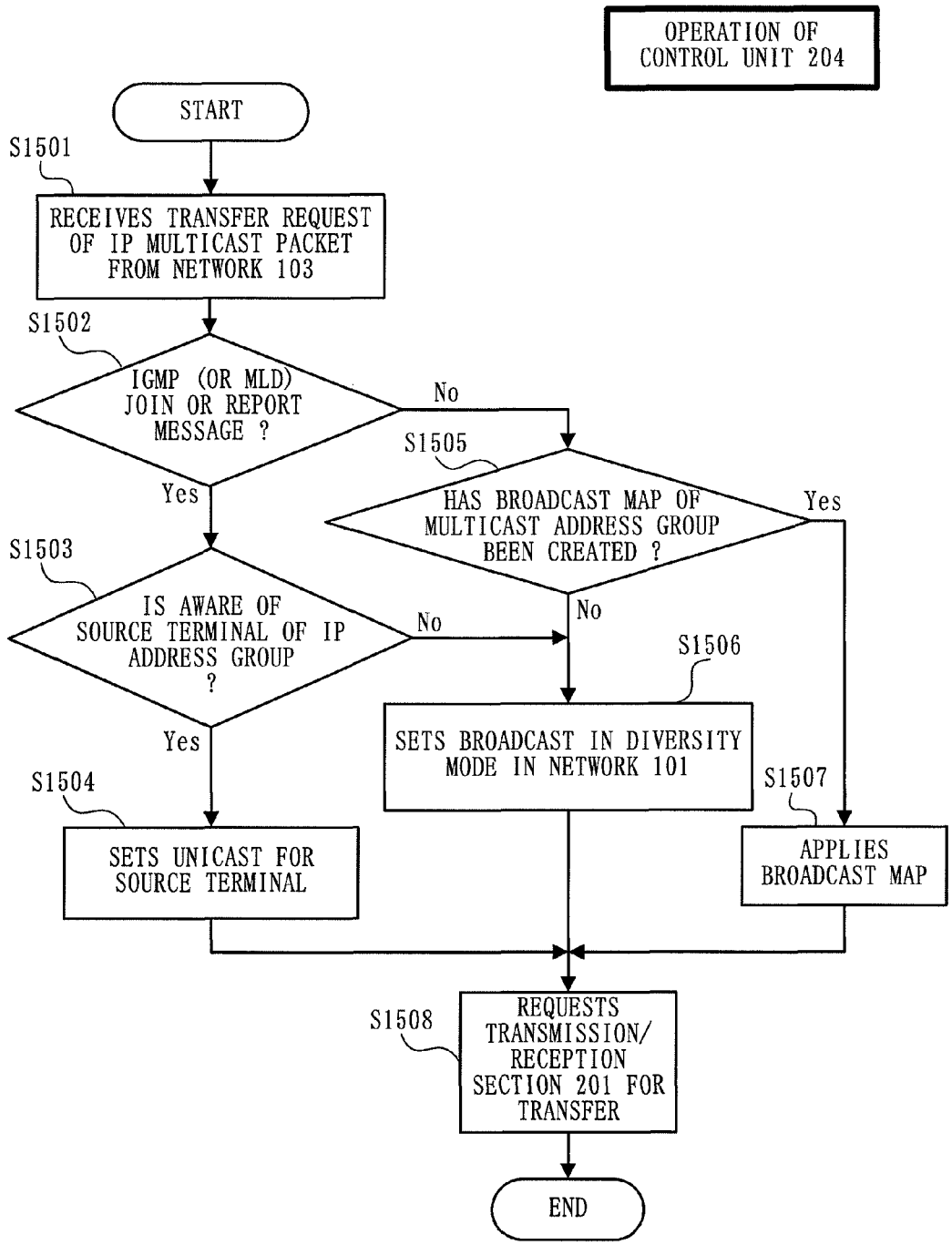
FIG. 17 shows processing of a control unit 204 of transferring an IP multicast packet received from the network 103.

FIG. 17 is a flowchart illustrating the details of processing performed by the control unit 204 in the terminal according to the second embodiment of the present invention.

Upon receipt of a multicast packet to be transferred to the network 101 from the network 103, the external interface section 203 of the terminal 100 refers to the header information of the received multicast packet. When the packet is a multicast packet, the external interface section 203 gives the received packet to the control unit 204.

In step S1501, the control unit 204 receives the multicast packet from the external interface section 203.

In step S1502, the control unit 204 determines whether or not the received packet is one of an IGMP JOIN message and an IGMP REPORT message. When the received packet is either an IGMP JOIN message or an IGMP REPORT message, the control unit 204 advances to step S1503. Otherwise, the control unit 204 advances to the processing in step S1505.

In step S1503, the control unit 204 determines whether or not the control unit 204 grasps the source terminal, which has issued the multicast packet to be transferred to the multicast address. The method by which the control unit 204 grasps the source terminal will be described later.

When grasping the source terminal, the control unit 204 advances to step S1504. Otherwise the control unit 204 advances to step S1505.

In step S1504, the control unit 204 makes a setting such that a packet replicated from the received multicast packet is transmitted by unicast to the source terminal that the control unit 204 grasps. When finishing the setting on the unicast transmission, the control unit 204 advances to step S1508.

In step S1505, the control unit 204 determines whether or not a multiple access map corresponding to the multicast packet to be transferred has been created. The method for creating a multiple access map will be described later. When the multiple access map corresponding the multicast address group including the received multicast packet has been created, the control unit 204 advances to step S1507. Otherwise, the control unit 204 advances to step S1506.

In step S1506, the control unit 204 makes a setting such that the packet to be transferred is transmitted by broadcast of the diversity mode within the network 101. When finishing the processing in step S1506, the control unit 204 advances to step S1508.

In step S1507, the control unit 204 applies the multiple access map corresponding to the multicast packet to be transferred and advances to step S1508.

In step S1508, the control unit 204 requests the transmission/reception section 201 that the multicast packet requested to be transferred should be to transferred to the network 101 in accordance with the set mode.

Figure 18:
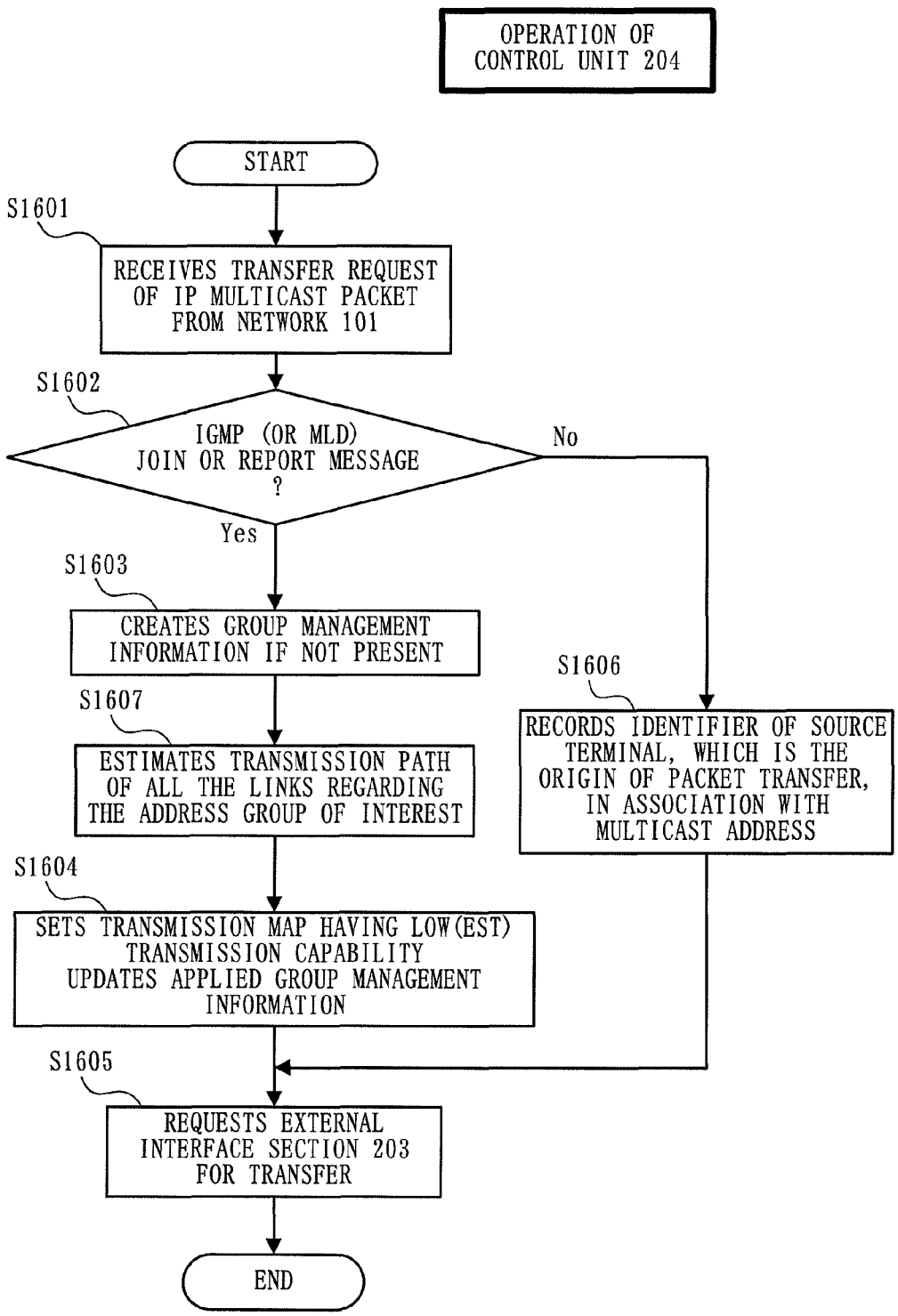
FIG. 18 shows processing of the control unit 204 of transferring an IP multicast packet from the network 101.

FIG. 18 is a flowchart illustrating the details of processing performed by the control unit 204 when the terminal receives a multicast packet in the second embodiment of the present invention.

In step S1601, when determining that the packet received by the transmission/reception section 201 is a multicast packet, the control unit 204 receives the packet from the transmission/reception section 201.

In step S1602, the control unit 204 determines whether or not the received packet is one of an IGMP (MLD) JOIN message and an IGMP (MLD) REPORT message. When the packet to be transferred is either an IGMP (MLD) JOIN message or an IGMP (MLD) REPORT message, the control unit 204 advances to step S1603. Otherwise, the control unit 204 advances to step S1606.

In step S1603, when the group management information 1701 regarding the multicast address to which the multicast packet is to be transferred has not been created, the control unit 204 creates the group management information 1701 regarding the multicast address to which the multicast packet is to be transferred. Namely, the control unit 204 creates the group management information 1701 using the IP multicast group address 1702 and the link information 1706 taken out from the received multicast packet. The control unit 204 sets "1" for the number 1705 of the registered links included in the group management information 1701. In addition, the control unit 204 may set the identifier of the terminal 100 which requested a transfer of the IGMP (MLD) message as the addressee terminal identifier of the link information, and set the identifier of the host which issued the IGMP (MLD) message as the host identifier.

On the other hand, when the group management information 1701 has already been created, the control unit 204 adds the link information 1706. In the added link information 1706, the identifier of the terminal 100 which requested the transfer of the IGMP (MLD) message and the identifier of the host which issued the IGMP (MLD) message are set. The control unit 204 increments the value of the number 1705 of the registered links by 1. When finishing the processing in step S1603, the control unit 204 advances to step S1607.

In step S1607, the control unit 204 performs transmission path estimation on all the links registered in the group management information corresponding to the multicast address. In more detail, the control unit 204 obtains a transmission map on each of the links. When finishing the processing in step S1607, the control unit 204 advances to step S1604.

In step S1604, the control unit 204 selects the transmission map having the lowest transmission capability among the obtained transmission maps, and updates the group management information 1701 using the selected transmission map. In more detail, the control unit 204 sets the transmission map No. of the transmission map determined to have the lowest transmission capability as the transmission map No. 1703, and sets the transmission capability obtained from the transmission map determined as above as the transmission capability 1704. After the group management information 1701 is updated, the resource for holding the transmission maps which were not selected by the control unit 204 may be released.

In step S1605, the control unit 204 requests the external interface section 203 to send the multicast packet requested to be transferred, to the network 103.

In step S1606, the control unit 204 stores the multicast address included in the multicast packet requested to be transferred and the identifier of the terminal which requested the transfer in association with each other. The control unit 204 makes the above-described determination in step S1504 based on the multicast address and the identifier of the terminal which are stored by performing the processing in step S1606.

In step S1604, the control unit 204 may update the group management information 1701 by performing the following processing.

First, the control unit 204 performs transmission path estimation only on the link to which the multicast packet is requested to be transferred. Next, the control unit 204 compares the transmission capability of the link on which the transmission path estimation has been performed and the already set transmission capability 1704. The control unit 204 selects the transmission map having a lower transmission capability, and updates the transmission map No. 1703 and the transmission capability 1704 based on the No. and the transmission capability of the selected transmission map. After updating the group management information 1701, the resource for holding the transmission maps which were not selected may be released.

By the above-described control processing, the control unit 204 can reduce the load on, for example, the common band which is caused by performing the transmission path estimation on all the links, or the resource such as a memory area or the like temporarily used in order to create the transmission map.

Now, with reference to FIG. 1, a specific example of the processing of the terminal 100 according to this embodiment will be described. In the following specific example, it is assumed that the host 111 issued a multicast packet addressed to a multicast group address HA (IP multicast group H). It is also assumed that the hosts belonging to the IP multicast group H, i.e., the hosts which are operating an application for receiving or sending a packet to be distributed in the IP multicast group H are the hosts 111, 112, 115, 116, 118 and 119.

<1. Processing of the Terminal (A)>

When the host 111 issues a packet addressed to the multicast address HA, the external interface section 203 of the terminal (A) receives the packet. When the external interface section 203 determines that the input packet is a multicast packet, the control unit 204 performs the following processing in accordance with the flowchart shown in FIG. 17.

In step S1502, the control unit 204 determines that the received message is not an IGMP (MLD) message and advances to step S1505.

In step S1505, because the multiple access map corresponding to the multicast group H of the received multicast packet has not been created, the control unit 204 advances to step S1506.

In step S1506, the control unit 204 makes a setting such that the multicast unit to be transferred is transmitted by broadcast of the diversity mode and advances to step S1508.

In step S1508, the control unit 204 requests the transmission/reception section 201 to transfer the multicast packet to the network 101.

When finishing the processing shown in FIG. 17, the terminal (A) transmits the multicast packet transmitted by the host 111 to the network 101 by broadcast of the diversity mode. As a result, the received packet can be transferred to all the terminals.

<2. Processing of the Terminal (B)>

Next, the operation when the terminal 100 according to this embodiment receives a multicast packet from the network 101 will be described. As an example, the processing of the terminal (B) will be described.

The transmission/reception section 201 of the terminal (B) receives a frame including the multicast packet transmitted from the terminal (A) by broadcast from the network 101. Because the frame received by the terminal (B) includes the multicast packet, the control unit 204 performs the following processing in accordance with the flowchart shown in FIG. 18.

In step S1602, because the received multicast packet is not an IGMP (MLD) message, the control unit 204 advances to step S1606.

In step S1606, the control unit 204 stores the multicast address H in correspondence with the identifier of the source terminal which issued the multicast packet, and advances to step S1605.

In step S1605, the control unit 204 requests the external interface section 203 to transfer the multicast packet.

The multicast packet transferred from the terminal (B) reaches the host 112. The host 112 wishes to receives a packet of the multicast group address HA and so issues an IGMP JOIN message MB. The IGMP JOIN message MB is a packet addressed to the multicast group address HA and is given to the external interface section 203 of the terminal (B).

The packet received by the external interface section 203 is the multicast packet transmitted from the host 112. Accordingly, the control unit 204 of the terminal (B) performs the following processing in accordance with the flowchart shown in FIG. 17.

In step S1502, because the received multicast packet is the IGMP (MLD) JOIN message MB, the control unit 204 advances to step S1503.

In step S1503, the control unit 204 manages the source terminal of the IP address group (step S1606 shown in FIG. 18), and so advances to step S1504.

In step S1504, the control unit 204 makes a setting such that the IGMP (MLD) JOIN message MB requested to be transferred is transmitted by unicast to the terminal (A), and advances to step S1508.

In step S1508, the control unit 204 requests the transmission/reception section 201 to transfer the IGMP (MLD) JOIN message to the network 101.

As described above, the terminal 100 according to this embodiment manages, by a unit of a multicast address, the terminal sending a multicast data packet. Therefore, the terminal 100 can transmit an IGMP JOIN message, an IGMP REPORT message and the like corresponding to each multicast address by unicast to the network 101. In the case where the terminal 100 transmits a multicast packet by unicast, ACK is easily managed, and an IGMP JOIN message or an IGMP REPORT message can be sent with certainty.

In addition, the terminal 100 according to the present invention does not transmit an IGMP REPORT message to anything other than the source terminal which issued a multicast data packet in the network 101. Therefore, the terminal 100 connected to a host belonging to the multicast group in the network 103 issues an IGMP REPORT message.

By issuing the IGMP REPORT message with certainty, the terminal 100 can find, in real time, to which terminal 100 the multicast data packet should be sent, using an IGMP QUERY message or IGMP REPORT message, as in the first embodiment. Accordingly, the effect that the traffic in the network 101 is not unnecessarily increased can be expected.

<3. Processing of the Terminal (A)>

The transmission/reception section 201 of the terminal (A) receives the IGMP (MLD) message MB transferred by the terminal (B). Because the received IGMP (MLD) message MB is a multicast packet, the control unit 204 performs the following processing in accordance with the flowchart shown in FIG. 18.

In step S1602, because the IGMP (MLD) message MB is an IGMP JOIN message, the control unit 204 advances to the processing in step S1603.

In step S1603, because the group management information 1701 corresponding to the multicast group address HA has not been created, the control unit 204 creates the group management information 1701 corresponding to the multicast group address HA and describes HA in the multicast group address 1702. When finishing the creation of the group management information 1701, the control unit 204 advances to step S1607.

In step S1607, the control unit 204 performs transmission path estimation on the link I connecting the terminals (B) and (A) and thus creates a transmission map. The control unit 204 of the terminal (A) creates the group management information 1701 using the information on the created transmission map. The control unit 204 sets "1" for the number of the registered links and describes the identifier of the terminal (B) and the identifier of the host 112 in link information #1. When finishing the processing in step S1607, the control unit 204 advances to step S1604.

In step S1604, because the number of the registered links corresponding to the multicast group address HA is only 1, the control unit 204 applies the transmission map of the link II with no further processing and advances to the processing in step S1605.

In step S1605, the control unit 204 transfers the message MB to the host 111.

The hosts 115, 116 and 118 belonging to the multicast group H also issue an IGMP JOIN message. The processing of each terminal is substantially the same as the processing when the terminal (B) receives the message MB from the host 112, and thus will not be described.

Figure 19:
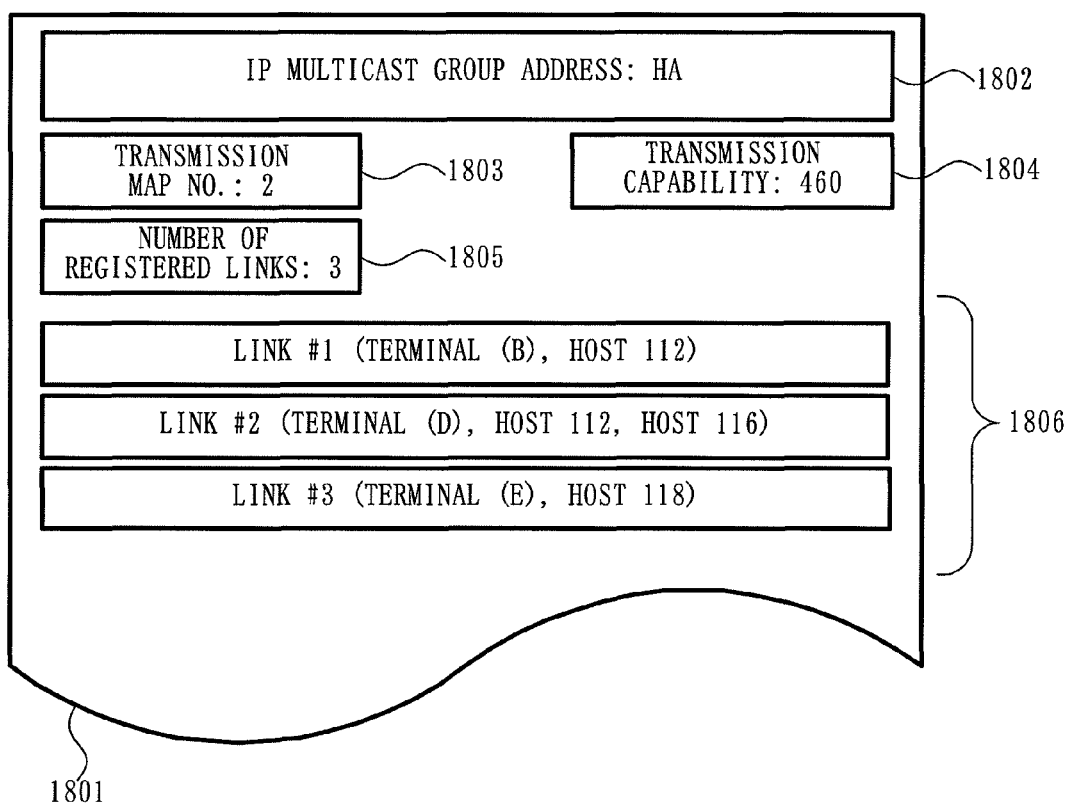
FIG. 19 shows group management information managed by the terminal 100 according to the second embodiment.

FIG. 19 shows group management information 1801 corresponding to the multicast group H stored in the terminal (A) at the time when the hosts 112, 115, 116 and 118 belonging to the multicast group H finish the issuance of the IGMP (MLD) JOIN message.

<4. Processing of the Terminal (A)>

Next, the operation of the terminal (A) when the host 119 issues an IGMP JOIN message MF will be described. The message MF is transmitted by unicast to the terminal (A) by the terminal (F), and reaches the terminal (A).

When the transmission/reception section of the terminal (A) determines that the message MF is a multicast packet, the control unit 204 performs the following processing in accordance with the flowchart shown in FIG. 18.

In step S1601, the control unit 204 receives a request to transfer the multicast packet from the terminal (F) and advances to step S1602.

In step S1602, because the message MF is an IGMP (MLD) JOIN message, the control unit 204 advances to step S1603.

In step S1603, the group management information 1801 corresponding to the multicast group address HA has already been created, the control unit 204 additionally stores the identifiers of the terminal (F) and the host 119 in link #4 as information regarding the link IV connecting the terminals (A) and (F), and increments the number of the registered links by 1. When finishing the additional storage in the link #4, the control unit 204 advances to step S1607.

In step S1607, the control unit 204 performs transmission path estimation on all the four links registered in link information 1806 and thus creates transmission maps. When finishing the creation of the transmission maps, the control unit 204 advances to step S1604.

In step S1604, the control unit 204 selects the transmission map having the lowest transmission capability among the four transmission maps created in step S1607. Assuming that the control unit 204 selects transmission map No. 5 and the transmission capability (=435) thereof, the control unit 204 updates the value of the transmission map No. 1803 to 5 and updates the value of transmission capability 1804 to 435. Then, the control unit 204 advances to step S1605.

In step S1605, the control unit 204 requests the external interface section 203 to transfer the message MF to the host 111.

<5. Processing of the Terminal (A)>

The processing of the control unit 204 of the terminal (A) of transferring the multicast packet transmitted from the host 111 based on the group management information created by the above-described processing will be described, hereinafter.

When the external interface section 203 of the terminal (A) receives a packet including the multicast address HA, the control unit 204 performs the following processing in accordance with the flowchart shown in FIG. 17.

In step S1502, the control unit 204 determines that the received packet is not an IGMP (MLD) message and advances to step S1505.

In step S1505, a multiple access map corresponding to the multicast address group H has already been created, the control unit 204 advances to step S1507. The multiple access map corresponding to the multicast address group H used in step S1507 refers to transmission map No. 5. The control unit 204 makes a setting that the transmission map of transmission map No. 5 is applied, and advances to step S1507.

In step S1507, the control unit 204 applies the transmission map of transmission map No. 5 to request the transmission/reception section 201 to transfer the multicast packet to the network 101.

As described above, the terminal (A) according to the present invention can transmit the packet belonging to the multicast address HA by multiple access to the terminal (B) and also the terminals (D) through (F) based on the transmission map indicated by transmission map No. 5.

Third Embodiment

In a third embodiment, an exemplary communication terminal capable of increasing the speed of multiple access transmission by a simpler method than in the second embodiment will be described. The communication terminal according to this embodiment is especially effective in a communication medium, such as an existing dedicated communication medium or the like, which does not have much varied frequency characteristic on the transmission path.

Figure 20:
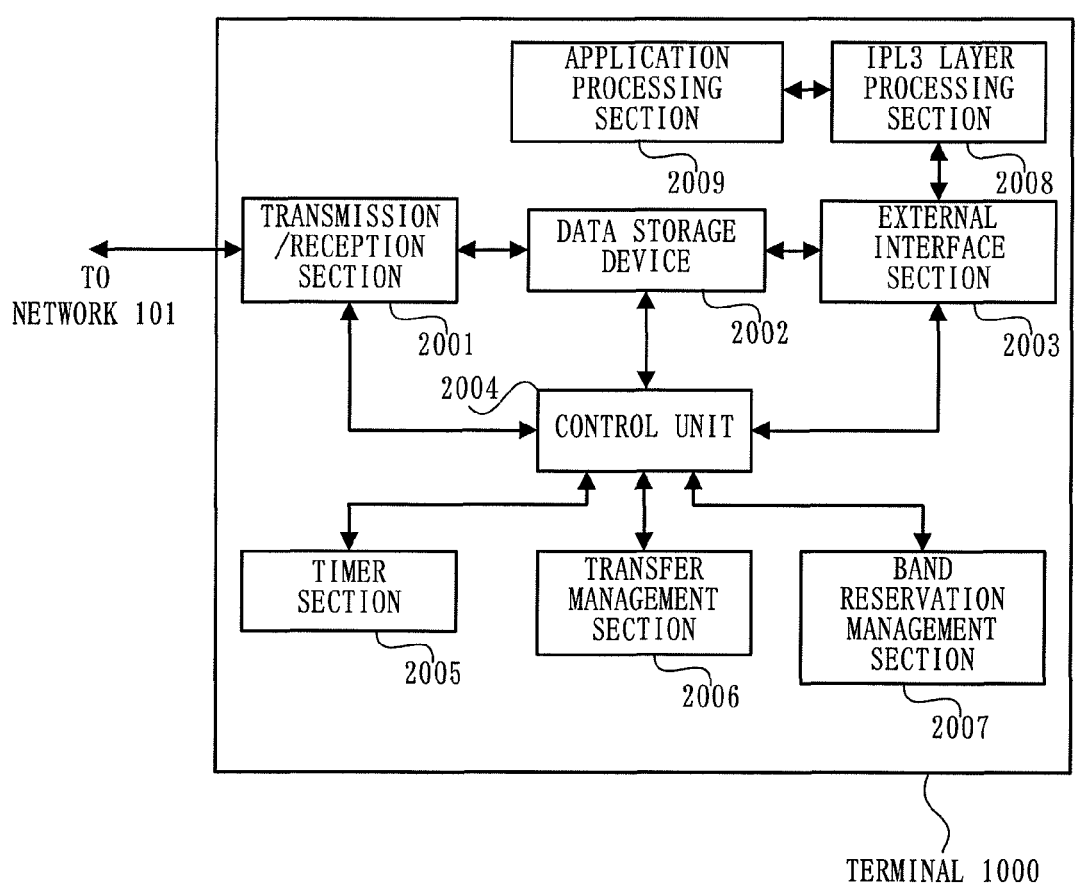
FIG. 20 is a block diagram showing a structure of a terminal 1000.

FIG. 20 shows a structure of a terminal 1000 according to the third embodiment. The format of frames transmitted or received in the network 101 is the same as that in the first embodiment, and thus FIG. 3 is incorporated in this embodiment. In the third embodiment, the terminal 1000 performs a multiple carrier transmission by DMT in the network 101 as in the first embodiment.

The terminal 1000 includes a transmission/reception section 2001, a data storage section 2002, an external interface section 2003, a control unit 2004, a timer section 2005, a transfer management section 2006, and a band reservation management section 2007, and further includes an IPL3 layer processing section 2008 and an application processing section 2009. The transmission/reception section 2001 through the transfer management section 2006 have substantially the same functions as those of the transmission/reception section 201 through the transfer management section 206 shown in FIG. 2, respectively.

Figure 21:
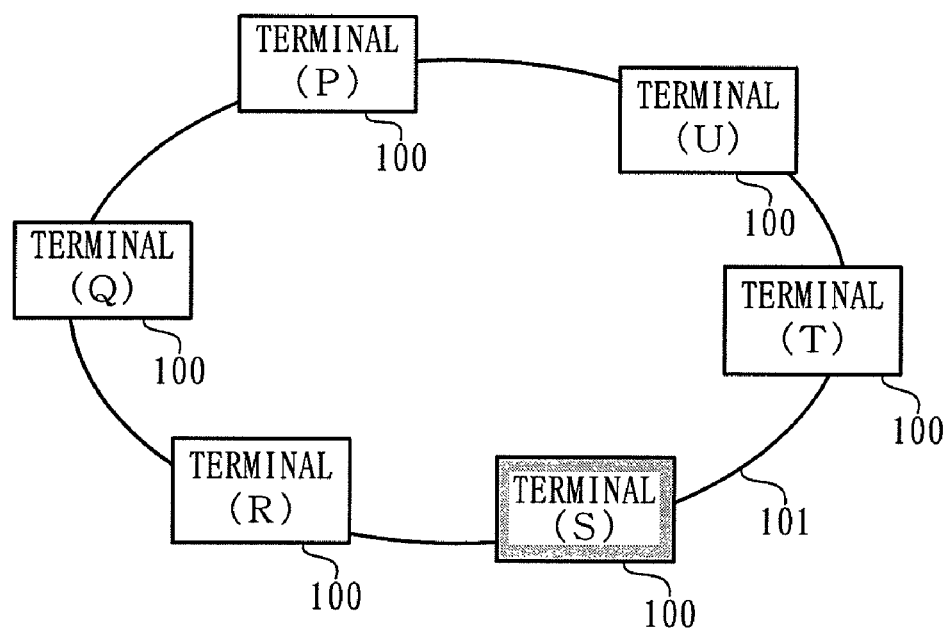
FIG. 21 shows a system according to a third embodiment.

FIG. 21 shows a structure of a network connected to the terminal shown in FIG. 20. The terminal 1000 is connected to an upper layer of the network hierarchy via the external interface section 2003.

FIG. 21 does not apparently show the elements corresponding to the network 103 and the hosts 111, etc. shown in FIG. 1. However, the terminal 1000 realizes the functions of the network 103 and the hosts shown in FIG. 1 by the IPL3 layer processing section 2008 and the application processing section 2009. Namely, in this embodiment, the network 103 and the hosts in the first embodiment are mounted on the terminal 1000. The terminal 1000 can construct the network 101 even when being used together with the terminal according to the first embodiment.

An terminal (S) shown in FIG. 21 acts as an authentication terminal. In the network 101 constructed by the terminal 1000, only a terminal which requested the terminal (S) for an authentication and obtained such an authentication can join the network 101.

For authenticating a terminal 1000, the terminal (S) gives an encryption key to be used for communication in the network 101. By the terminal (S) giving an authentication using the encryption key, the network 101 can be constructed as a highly secure network. In this example, the terminal (S) uses an encryption key for authentication, but the method of authentication is not limited to this.

Where the terminal (S) constructs the network 101 by authenticating the terminal 1000, the terminal (S) can grasp all the terminals 1000 participated in the network 101. Hereinafter, the terminal (S) will be referred to as the "authenticating terminal". The authenticating terminal grasps all the terminals 1000 participated in the network 101.

The authenticating terminal is a terminal having the same structure as that of the terminals 1000, but operates as an authenticating terminal by changing the software to be used.

Hereinafter, with reference to FIG. 22, the operation of the terminal 1000 according to the third embodiment will be described. As an example, it is assumed that the application processing section 2009 of the terminal 1000 requests the IPL3 layer processing section 2008 to issue a broadcast packet or a multicast packet.

Figure 22:
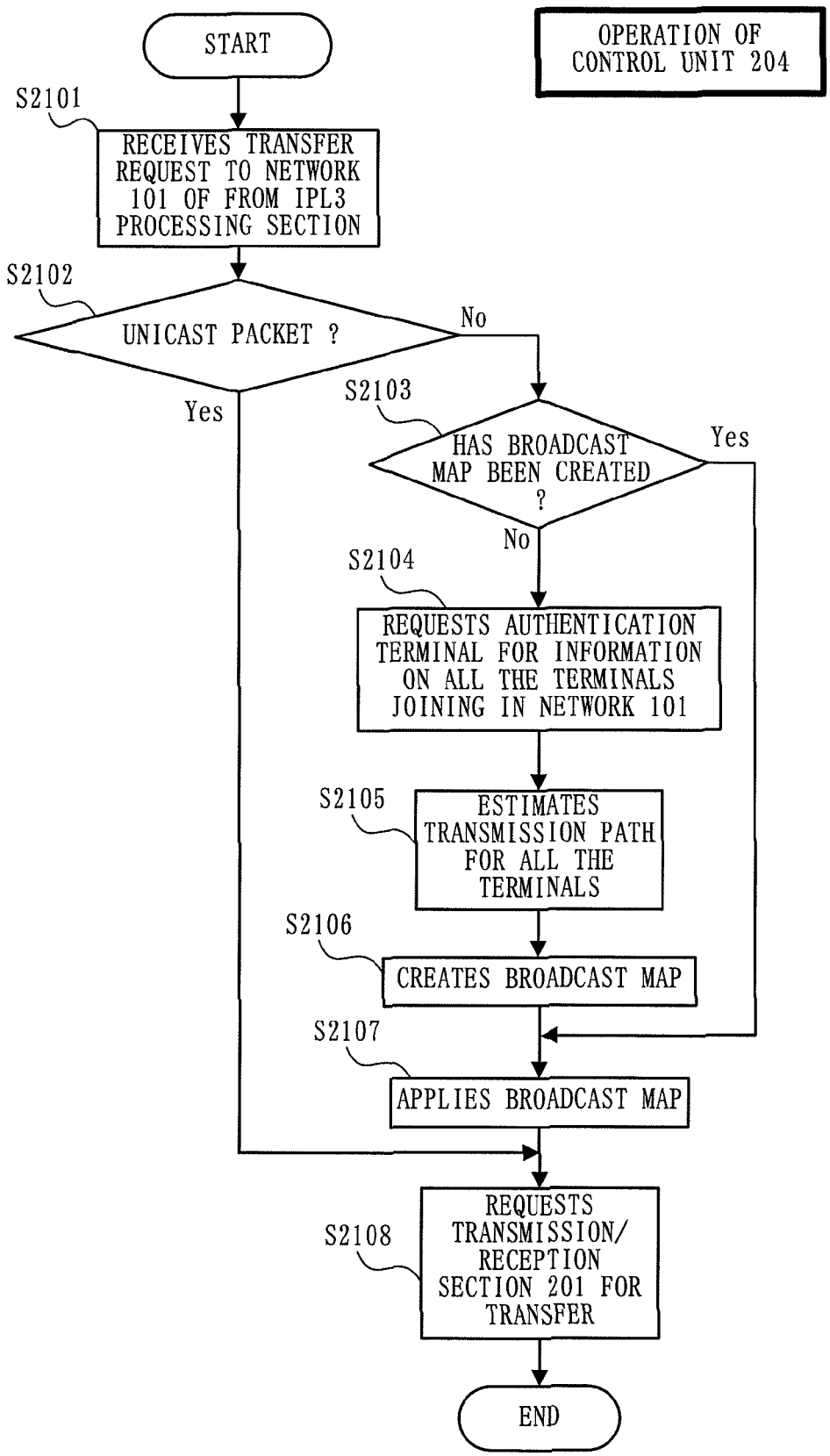
FIG. 22 shows processing of a control unit 204 of transferring an IP multicast packet from an IPL3 processing section to the network 101.

FIG. 22 is a flowchart illustrating the details of the processing performed by the control unit 2004 shown in FIG. 20.

In step S2101, when the external interface section 2003 receives a request to issue a packet from the application processing section 2009, the control unit 2004 performs the following processing.

In step S2102, the control unit 2004 determines whether the received packet is a unicast packet or not. When the received packet is a unicast packet, the control unit 2004 advances to step S2108. Otherwise, the control unit 2004 advances to step S2103. The processing in step S2101 may be performed by the external interface section 2003.

In step S2103, the control unit 2004 determines whether or not a multiple access map corresponding to the received packet has already been created. When the multiple access map has already been created, the control unit 2004 advances to step S2107; whereas when the multiple access map has not been created, the control unit 2004 advances to step S2104.

In step S2104, the control unit 2004 requests the authenticating terminal for information on all the terminals 1000 participated 1000 in the network 101. In order to obtain the information on the terminals 1000 participated in the network 101, the control unit 2004 uses a dedicated frame. The control unit 2004 transmits this frame to the authenticating terminal. Upon receipt of a response from the authenticating terminal on the transmitted frame, the control unit 2004 advances to step S2105.

In step S2105, the control unit 2004 performs transmission path estimation on all the terminals 1000 participated in the network 101 and thus creates transmission maps on the transmission paths to all the addressee terminals. The transmission maps created by the control unit 2004 in step S2105 are substantially the same as those shown in FIG. 5 and will not be described here.

In step S2106, the control unit 2004 creates a multiple access map using all the transmission maps created in step S2105. In step S2106, the control unit 2004 creates the multiple access maps using the method described in the first embodiment. For example, the control unit 2004 creates the multiple access map to all the terminals 1000 in the network 101 in accordance with the control processing shown in FIG. 11, and advances to step S2107.

In step S2107, the control unit 2004 applies the created multiple access map and advances to the processing in step S2108.

In step S2108, the control unit 2004 requests the transmission/reception section 201 to transfer a packet.

In the control processing shown in FIG. 22, the same multiple access map is applied regardless of whether the packet to be transmitted is a multicast packet or a broadcast packet.

The transmission/reception section 201 may have a function of monitoring the transmission state of the frames to be issued to the network 101, using the packet re-transmission rate, the error correction rate or the like. The transmission/reception section 201 compares the packet re-transmission rate or the error correction rate and a predetermined threshold value or a predetermined range. When the packet re-transmission rate or the error correction rate exceeds the predetermined threshold value or the predetermined range, the transmission/reception section 201 determines that the multiple access map is not suitable and notifies this determination to the control unit 2004.

Upon receipt of the notification that the multiple access map is not suitable from the transmission/reception section 201, the control unit 2004 may change the multiple access map. For example, when receiving a notification that the re-transmission rate has exceeded the threshold value from the transmission/reception section 201, the control unit 2004 decreases the number of units of described information in each sub carrier in the multiple access map. When receiving a notification that the re-transmission rate is lower than the predetermined range, the control unit 2004 increases the number of units of information to be described for each sub carrier in the multiple access map.

By the control unit 2004 changing the multiple access map in accordance with the packet re-transmission rate, the error correction rate or the like, packets can always be transmitted in a manner suitable to the state of the transmission path.

Fourth Embodiment

FIG. 23 shows a structure of a terminal T100 according to a fourth embodiment of the present invention. The terminal T100 according to this embodiment includes a zero cross detection control unit 2401 in addition to the elements of the terminal according to the first embodiment. In this embodiment, the format of frames used by the terminal T100 for data transmission in the network 101 is the same as that in the first embodiment, and thus FIG. 3 is incorporated in this embodiment. In this embodiment, the terminal T100 performs a multiple carrier transmission by DMT in the network 101 as in the first embodiment.

In an electric light wire, noise of a short cycle is generated in synchronization with the power source cycle of the electric light wire by the influence of electric/electronic household appliances having a thyristor or the like. The noise generated in the electric light wire has a serious influence on the transmission capability thereof. It has been found that the noise in the electric light wire is generated at a half cycle of the power source cycle of the electric light wire.

Figure 24:
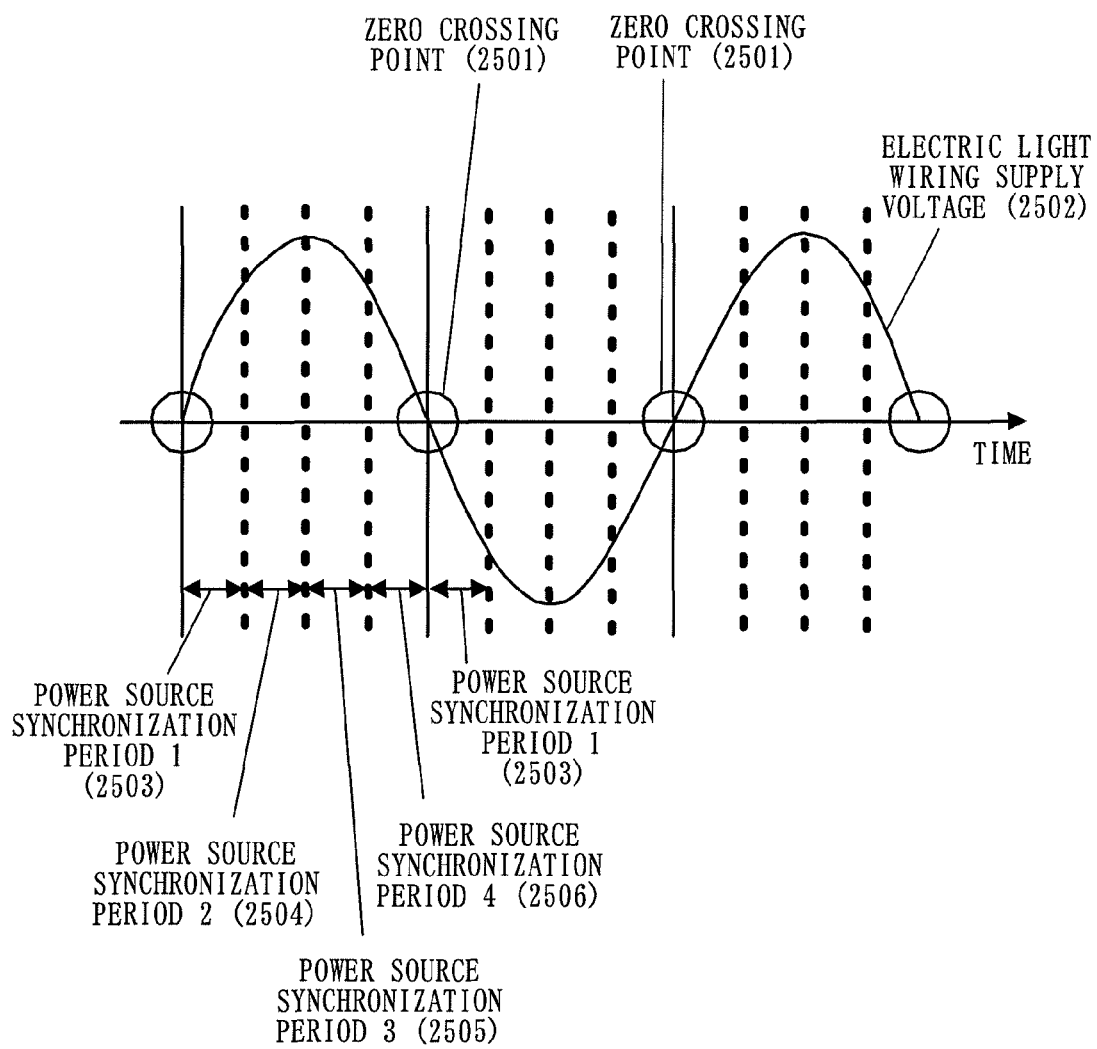
FIG. 24 shows power source cycle synchronization periods.

The zero cross detection control section 2401 detects zero crossing points shown in FIG. 24 using the transmission/reception section 201 and the timer section 205 in the case where an electric light wire is used in the network 101. The zero cross detection control section 2401 actually measures, or virtually detects, the zero crossing points and notifies the control unit 204 of the timing at which the zero crossing points were detected. The control unit 204 can grasp the power source synchronization period by the timing notified from the zero cross detection control section 2401.

FIG. 24 illustrates the zero crossing points of the supply voltage and the power source synchronization period of an electric light wire. FIG. 24 shows power source synchronization periods 1 through 4 (2503 through 2506) obtained as a result of dividing the half cycle of the supply voltage into four. The control unit 204 determines whether the power source cycle is 50 Hz or 60 Hz using the timer section 205 and thus calculates the time of the half cycle of the supply voltage.

In FIG. 24, the power source synchronization periods are defined as obtained by equally dividing the half cycle of the supply voltage into four, but the definition of the power source synchronization periods are not limited to this. The power source synchronization periods do not need to be equal to one another.

The terminal T100 according to this embodiment performs transmission path estimation in all the power source synchronization periods, and thus records and manages all the transmission maps for each of all the power source synchronization periods. In more detail, the terminal T100 performs the transmission path estimation for each of the zone of the power source synchronization period 1 (2503), the zone of the power source synchronization period 2 (2504), the zone of the power source synchronization period 3 (2505) and the zone of the power source synchronization period 4 (2506). The terminal T100 records the transmission map obtained in each power source synchronization period in the data storage section 202, and the control unit 204 manages the recorded transmission maps.

By the control unit 2004 managing the transmission map obtained in each power source synchronization period, the terminal T100 for transmitting a packet and the terminal T100 for receiving the packet can switch the transmission map in accordance with the power source synchronization period. Hence, the terminal T100 can apply a transmission map in consideration of the noise in synchronization with the power source synchronization period in the electric light wire, and thus makes an effective use of the transmission capability of the electric light wire.

The terminal T100 prepares four temporary maps respectively corresponding to the four power source synchronization periods for transmission information 423 of each transmission map. The terminal T100 also prepares multiple access maps for broadcast and multicast in the network 101 by the same number as that of the power source synchronization periods. The prepared multiple access maps are switched and applied by the transmitting terminal and the receiving terminal.

The terminal T100 according to this embodiment prepares the multiple access maps for broadcast and multicast by the same number as that of the power source synchronization periods for each unit of transmission information 423. Thus, also for multiple access transmission, the terminal T100 can make an effective use of the electric light wire network in which the noise in synchronization with the power source cycle exists.

Figure 25:
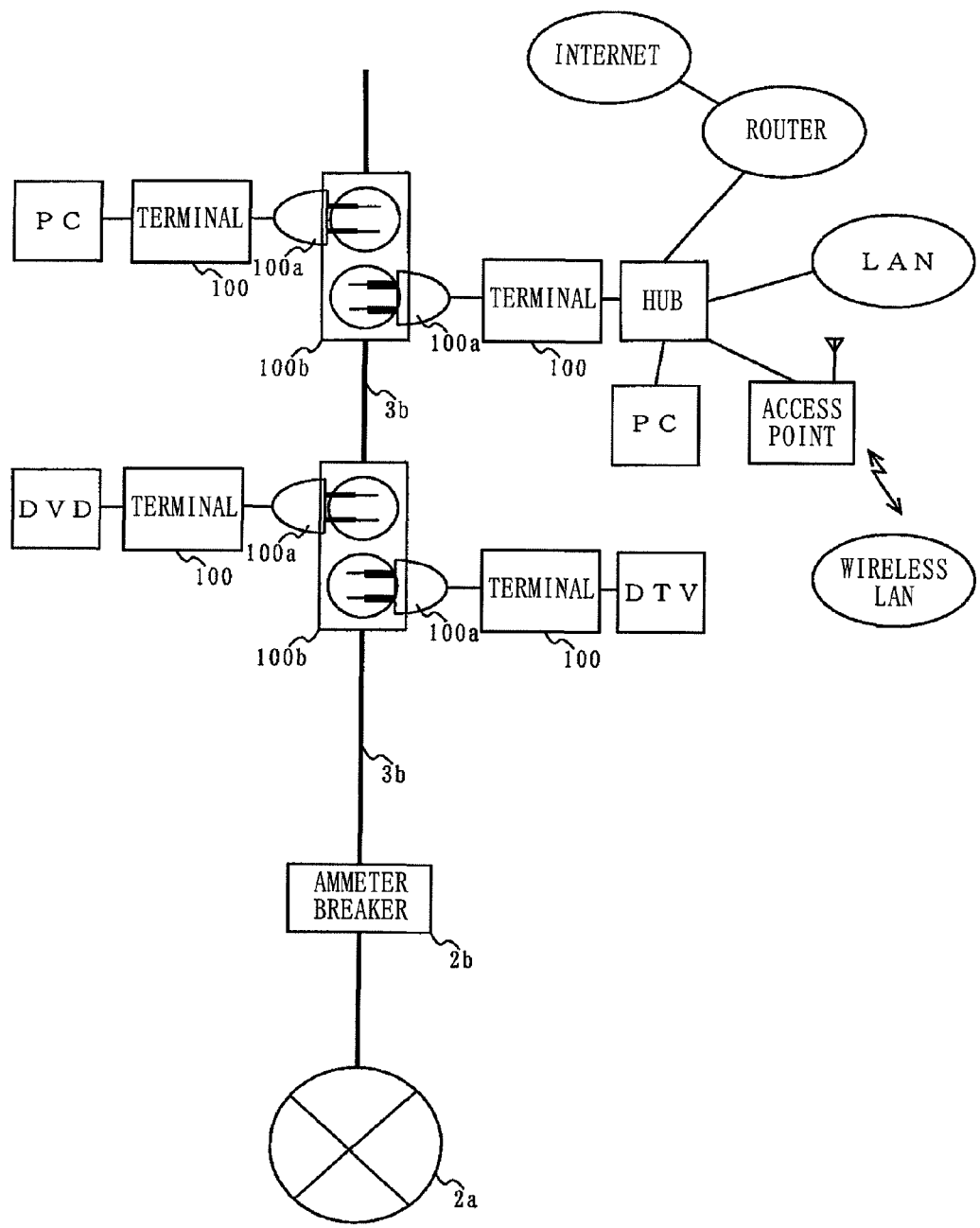
FIG. 25 shows a structure of an electric light wire communication system using a terminal according to the present invention.

FIG. 25 is a schematic view showing a structure of an entire system when the present invention is applied to electric light wire communication. The system shown in FIG. 25 uses an electric light wire 3b as a communication medium. Each terminal 100 includes an outlet 100a. The outlet 100a is connected to a power supply section (not shown) and the transmission/reception section 201 of the terminal 100.

The terminal 100 receives the power and also exchanges data via the outlet 100a. The electric light wire 3b is connected to a commercial power source 2a outside the house via an ammeter breaker 2b. The terminal 100 is connected to a PC, a DVD, a digital TV (DTV), a hub and the like.

The hub is connected to an access point, a PC, a LAN, a router and the like. The access point is connected to a wireless LAN. The router is connected to the Internet. The functions of the terminal 100 and the terminal 1000 may be built in a host such as each electric/electronic household appliance or the like.

Hereinafter, with reference to FIG. 26 and FIG. 27, the processing of the terminal T100 according to this embodiment will be described.

Figure 26:
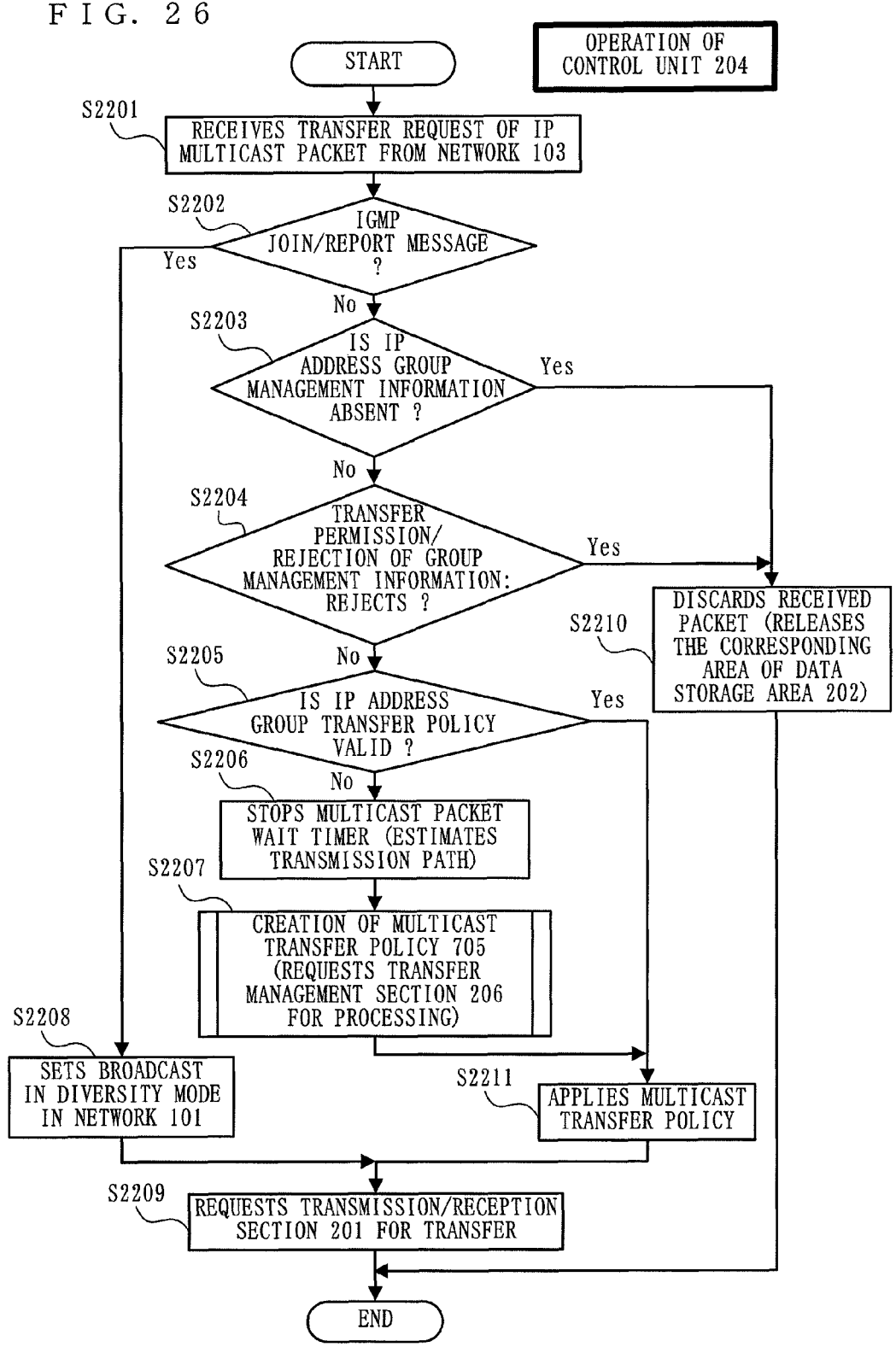
FIG. 26 shows processing of a control unit 204 of transferring an IP multicast packet received from the network 103 in a fourth embodiment.

FIG. 26 is a flowchart illustrating the details of the processing of the terminal T100 of transferring a multicast packet received from the network 103.

When the terminal T100 receives a request from the network 103 to transfer the packet to the network 101, the external interface section 203 refers to the header information of the received packet. When the received packet is a multicast packet, the control unit 204 performs the following processing in accordance with the flowchart shown in FIG. 26.

In step S2201, the control unit 204 receives a request from the network 103 to transfer an IP multicast packet.

In step S2202, when the multicast packet received from the network 103 is an IGMP (or MLD) protocol JOIN or REPORT message, the control unit 204 advances to step S2208. Otherwise, the control unit 204 advances to step S2203.

In step S2203, when the group management information 701 of the received multicast packet is existent, the control unit 204 advances to step S2204. Otherwise, the control unit 204 advances to step S2210.

In step S2204, when the transfer permission/rejection flag 703 in the group management information 701 of the received multicast packet is "reject", the control unit 204 advances to step S2210. Otherwise, the control unit 204 advances to step S2205.

In step S2205, when the multicast address group transfer policy 705 is valid, the control unit 204 advances to step S2211. Otherwise, the control unit 204 advances to step S2206.

In step S2206, the control unit 204 accesses the timer section 205 and stops a multicast packet timer. The multicast packet timer uniquely corresponds to the group management information 701 by recording a timer identifier thereof in the group management information 701. When the timer corresponding to the group management information 701 is not operated, the control unit 204 advances to step S2207 without performing the processing in step S2206. The control unit 204 may update the transmission information 423 by performing transmission path estimation on the link information described in all the transmission information 423 registered.

In step S2207, the control unit 204 sets the multicast address group transfer policy 705 again. The processing of the control unit 204 in step S2202 of setting the multicast address group transfer policy 705 is substantially the same as that of FIG. 1A through FIG. 10E. When finishing the processing in step S2207, the control unit 204 advances to step S2211.

In step S2208, the control unit 204 makes a setting such that the received IGMP (MLD) message is transmitted by broadcast of the diversity mode which is defined in the network 101. The terminal T100 transfers the IGMP REPORT message and the IGMP JOIN message by broadcast of the diversity mode from the network 103 to the network 101.

In step S2209, the control unit 204 requests the transmission/reception section 201 for a packet transfer.

In step S2210, the control unit 204 discards the received multicast packet.

In step S2211, the control unit 204 applies the multicast address group transfer policy 705 which is set in the group management information 701, and advances to step S2209.

In step S2209, the control unit 204 requests the transmission/reception section 201 to transfer the received multicast packet.

When the 204 receives a request to transfer a packet to the network 103, the external interface section 203 refers to the header information of the packet to determine whether the packet is a multicast packet or not.

Figure 27:
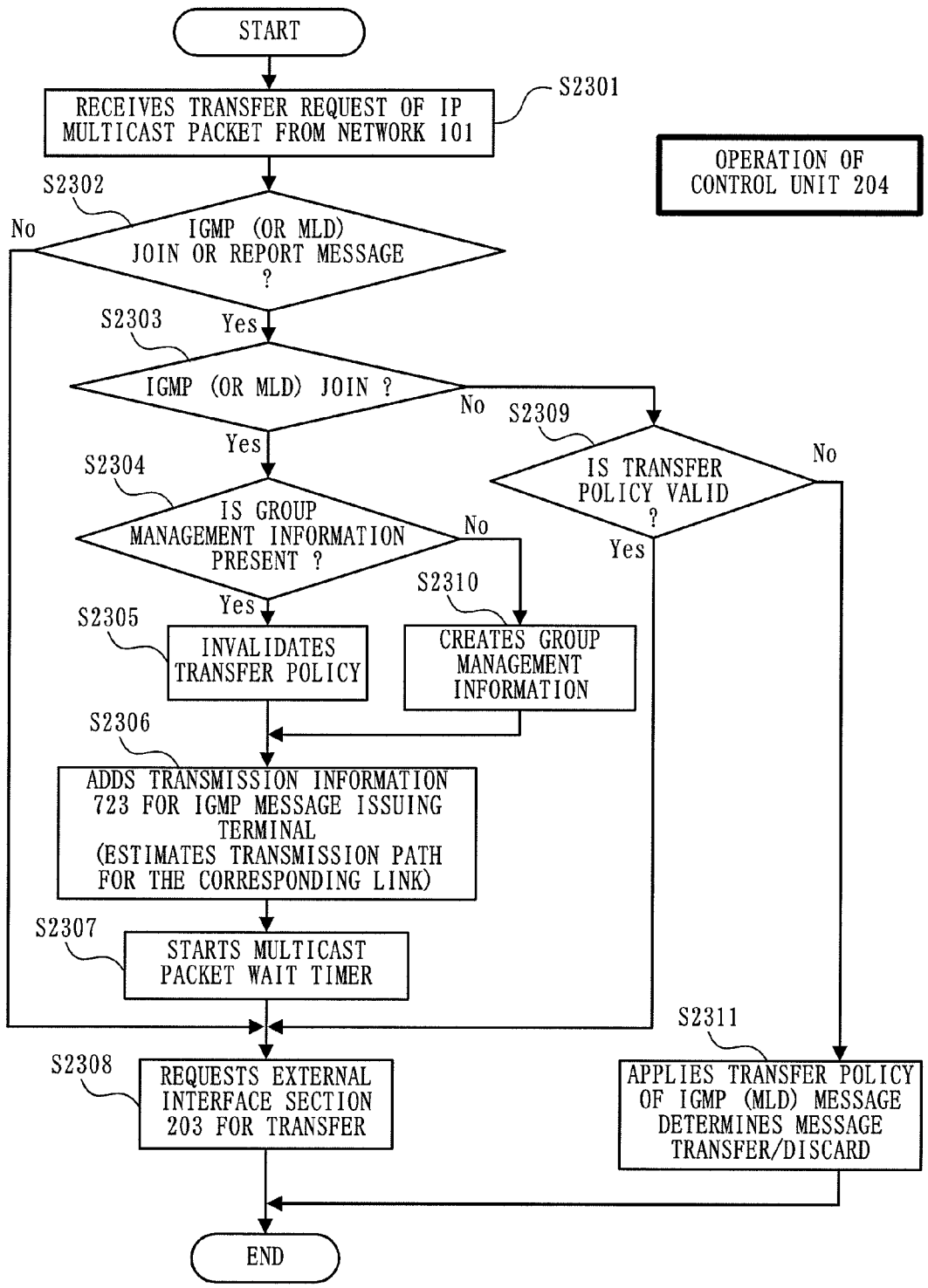
FIG. 27 shows processing of the control unit 204 of transferring an IP multicast packet received from the network 101 in the fourth embodiment.

FIG. 27 shows the processing of the terminal T100 of transferring a multicast packet received from the network 101.

In step S2302, when the received packet is an IGMP (MLD) JOIN or REPORT message, the control unit 204 advances to step S2303. Otherwise, the control unit 204 advances to step S2308.

In step S2303, when the received packet is an IGMP (MLD) JOIN message, the control unit 204 advances to step S2304. Otherwise, the control unit 204 advances to step S2308.

In step S2304, the control unit 204 determines whether the group management information 701 corresponding to the multicast address group of the received multicast packet is existent or not. When the group management information 701 is existent, the control unit 204 advances to step S2305; whereas when the group management information 701 is not existent, the control unit 204 advances to step S2310.

In step S2305, the control unit 204 sets the transfer policy setting 721 of the group management information 701 corresponding to the multicast address group of the received multicast packet to invalid.

In step S2306, the control unit 204 adds a link, addressed to the terminal T100 which issued the IGMP message, to the transmission information 423 of the group management information 701 and thus records this link in the link information. At this point, the control unit 204 performs transmission path estimation on this link and thus updates the transmission information 423.

In step S2307, the control unit 204 accesses the timer section 205 and starts a multicast packet wait timer. When the set time has passed, the control unit 204 deletes this group management information 701. By this function, the control unit 204 can delete unnecessary group management information 701 and therefore can effectively use the resource of hardware or software.

In step S2308, the control unit 204 requests the external interface section 203 to transfer the received multicast packet.

In step S2309, when the transfer policy setting 721 of the group management information 701 of the received multicast packet is valid, the control unit 204 advances to step S2308; whereas when the transfer policy setting 421 is invalid, the control unit 204 advances to step S2311.

In step S2310, the control unit 204 creates the group management information 701 corresponding to the multicast address group of the received multicast packet.

In step S2311, the control unit 204 applies the multicast address group transfer policy 705 of the IGMP (MLD) message. The processing performed by the control unit 204 in step S2311 is the same as that in step S507 in FIG. 9.

As an initial state of the group management information 701, the control unit 204 sets the transfer permission/rejection flag 703 to "permit", the transfer policy setting 721 to "no", and the number 722 of the temporary maps to "0".

Hereinafter, the processing of the terminal according to this embodiment will be specifically described. It is assumed that the terminal according to this embodiment is used as each of the terminals (A) through (F) shown in FIG. 1. In more detail, the processing of the terminals (A) and (D) when the host 116 requests for the data distributed by the host 111 will be described with reference to FIG. 26 and FIG. 27.

<1. Processing of the Terminal (D)>

First, the host 116 requests for an IP multicast packet of a multicast group P. The host 116 issues an IGMP JOIN message MP, addressed to a multicast group address PA, to the network 103. Upon receipt of the IGMP JOIN message MP issued by the host 116, the control unit 204 of the terminal (D) starts the processing shown in FIG. 26.

In step S2202, the control unit 204 of the terminal (D) determines that the received multicast packet is the IGMP JOIN message MP, and advances to the processing in step S2208. The control unit 204 transfers the received IGMP JOIN message MP by broadcast of the diversity mode to the network 101.

<2. Processing of the Terminal (A)>

The IGMP JOIN message MP transferred by the terminal (D) reaches the terminal (A). Upon receipt of the IGMP JOIN message MP, the control unit 204 of the terminal (A) starts the processing shown in FIG. 27.

In step S2302, the control unit 204 of the terminal (A) determines that the received multicast packet is an IGMP JOIN message and advances to step S2303.

In step S2303, the control unit 204 determines that received multicast packet is an IGMP JOIN message and advances to step S2304.

In step S2304, the control unit 204 determines that the group management information 701 of the multicast address group PA is not existent and advances to step S2310.

In step S2310, the control unit 204 creates the group management information 701 of the multicast address group PA. After creating the group management information 701 of the multicast address group PA, the control unit 204 advances to step S2306.

In step S2306, the control unit 204 sets link information on a link connecting the terminals (A) and (D). The control unit 204 of the terminal (A) performs transmission path estimation on the link connecting the terminals (A) and (D), and also sets "1" for the number 722 of the registered temporary maps and thus updates the transmission information 423.

In step S2307, the control unit 204 starts a multicast packet wait timer corresponding to the group management information 701 of the multicast address group PA and transfers the IGMP JOIN message MP to the network 103. The IGMP JOIN message MP transferred by the control unit 204 is received by the host 111.

<3. Processing of the Terminal (A)>

The host 111 receives the IGMP JOIN message MP of the multicast address group PA which was transferred by the terminal (A), and issues a multicast packet of the multicast address group PA to the network 103. When the terminal (A) receives the multicast packet issued by the host 111, the control unit 204 of the terminal (A) starts the processing shown in FIG. 26.

In step S2202, the control unit 204 determines that the received multicast packet is not an IGMP message and advances to step S2203.

In step S2203, the control unit 204 determines that the group management information 701 of the multicast address group PA has been created and advances to step S2204.

In step S2204, the control unit 204 determines that the transfer permission/rejection flag 703 is "permit" and advances to the processing in step S2205.

In step S2205, the control unit 204 determines that the transfer policy setting 721 of the multicast address group PA is "invalid" and advances to step S2206.

In step S2206, the control unit 204 stops the multicast packet wait timer of the group management information 701. The control unit 204 of the terminal (A) has performed the transmission path estimation on the link connecting the terminals (A) and (D) in step S2306 shown in FIG. 27, and thus does not perform transmission path estimation in step S2206.

In step S2207, the control unit 204 sets the multicast address group transfer policy 705 again. The processing performed by the control unit 204 in step S2207 is the same as that in step S503 in FIG. 9 and will not be described here.

In step S2211, the control unit 204 applies the set multicast address group transfer policy 705 to transfer the multicast packet to the network 101.

The control unit 204 transfers a multicast packet PA which is issued after the multicast packet PD to the network 101 in accordance with the processing shown in FIG. 26 as in the case of transferring the multicast packet PD.

<4. Processing of the Terminal (D)>

The processing of the control unit 204 of transferring the multicast packet PA is different from the processing of the control unit 204 of transferring the multicast packet PD in the following point. In the former case, in step S2205, the transfer policy setting 721 indicates "valid". Based on this, the control unit 204 applies the multicast address group transfer policy 705 of the multicast address group PA, which has been set, as it is and transfers the multicast packet PA to the network 101.

Upon receipt of the multicast packet of the multicast address group PA transferred by the terminal (A), the control unit 204 of the terminal (D) performs the processing shown in FIG. 27.

In step S2302, the control unit 204 determines that the received multicast packet is not an IGMP message and advances to step S2308.

In step S2308, the control unit 204 transfers the received multicast packet to the network 103. The multicast packet transferred by the terminal (D) reaches the host 116.

<5. Processing of the Terminal (B)>

The IGMP JOIN message MP transferred by the control unit 204 in step S2202 is transferred to the network 101 by broadcast of the diversity mode. Accordingly, the IGMP JOIN message MP issued by the host 116 also reaches the terminals other than the terminal (A).

The processing of a terminal T100 which is not connected to the host for receiving the IGMP JOIN message MP when the terminal T100 receives the IGMP JOIN message MP will be described. As an example, the processing of the terminal (B) will be described.

Upon receipt of the IGMP JOIN message MP, the control unit 204 starts the processing shown in FIG. 27.

The control unit 204 performs the processing in steps S2301 through S2307 shown in FIG. 27 as in the case where the terminal (A) receives the IGMP JOIN message MP.

The control unit 204 performs the processing in steps S2301 through S2307 to create the group management information 701 of the multicast address group PA and starts a multicast packet wait timer.

After starting the multicast packet wait timer of the group management information 701, the control unit 204 advances to step S2308.

In step S2308, the control unit 204 transfers the received IGMP JOIN message MP to the network 103.

The terminal (B) is connected to the host 112. However, the host 112 is not a server for distributing a multicast packet of the multicast address group PA, and so does not issue a multicast packet of the multicast address group PA.

Therefore, the time set in the multicast packet wait timer corresponding to the group management information 701 of the multicast address group PA, which was started by the terminal (B) in step S2307, passes. When the set time has passed, the control unit 204 of the terminal (B) discards the group management information 701 of the multicast address group PA.

As described above, in the case where a host has a network application for issuing a multicast packet in response to an IGMP JOIN message, a terminal T100 connected to the network 101 can make an effective use of the network 101, by the control unit 204 of the terminal T100 performing the processing shown in FIG. 26 and FIG. 27.

The present invention is not limited to electric light wire communication. Other than the electric light wire, the present invention is applicable to various media such as telephone lines, TV antenna lines (coaxial cables), wireless media, audio signal lines within various facilities, avionics lines, railway E1 lines, non-dedicated lines, dedicated lines, communication media and the like.

The above-described embodiments may each be realized by causing a CPU to execute a program which is stored in a storage device (ROM, RAM, hard disc, etc.) and is capable of allowing a CPU to execute any of the above-described processing procedures. In this case, the program may be executed as being stored in the storage device via a recording medium, or may be executed directly from the recording medium. Here, the term "recording medium" refers to an assembly of semiconductor elements such as a ROM, a RAM, a flash memory or the like; a magnetic disc memory such as a flexible disc, a hard disc or the like; an optical disc such as a CD-ROM disc, a DVD disc, a BD (Blu-Ray (registered trademark) disc) or the like; a memory card; or the like.

The functional blocks shown in FIG. 2, FIG. 20 and FIG. 23 may be realized by an LSI, which is an integrated circuit. Such a functional block may be realized as one chip, which includes a part of, or the entirety of, the functional block. The "LSI" may be referred to as an IC, a system LSI, a super LSI or an ultra LSI depending on the level of integration. The integrated circuit is not limited to an LSI and may be a dedicated circuit or a general-purpose processor. Alternatively, an FPGA (Field Programmable Gate Array) in which lines can be connected after the LSI is produced, or a reconfigurable processor in which the circuit cell connection or setting inside the LSI can be reconfigured may be used. When an integrated circuit technology replacing LSI is generated by the development of the semiconductor technologies or other technologies derived therefrom, the functional blocks may be integrated using any of such technologies. A biological technology is possibly applied.

The invention disclosed by the present application is applicable to, for example, networks in general houses and apartment buildings; networks in business facilities including business offices, plants and commercial facilities; networks such as avionics systems which are constructed in transportation facilities including automobiles, aircraft, railway trains and watercraft; and the like. In a logical ad hoc network constructed for the sake of convenience, efficient multiple access transmission is made possible by the technology of the present invention.

In the above-described embodiments, the group management protocol mounted on the terminal is an IGMP protocol or an MLD protocol. The group management protocol mounted on a terminal is not limited to these, and any other group management protocol capable of managing a group is usable, needless to say.

While the invention has been described in detail, the foregoing description is in all aspects illustrative and not restrictive. It is understood that numerous other modifications and variations can be devised without departing from the scope of the invention.

INDUSTRIAL APPLICABILITY

The present invention is useful, for example, as a terminal realizing a fast and high quality packet transmission in a network using IP multicast.

The invention claimed is:
1. A terminal for communicating with one or more relay devices of a plurality of relay devices via one or more transmission paths of a plurality of transmission paths of at least one communication medium, the terminal comprising:
 a transmission/reception section for receiving a packet;
 a control unit for (i) evaluating characteristics of a each transmission path, of the plurality of transmission paths, located between the terminal and the one or more relay devices, (ii) setting, based on the evaluated characteristics of each transmission path located between the terminal and the one or more relay devices, a respective transmission parameter indicating at least one of a transmittable information amount per a predetermined time length and an error correction strength for each transmission path located between the terminal and the one or more relay devices, and (iii) replicating the packet received by the transmission/reception section by a number equal to a number of one or more groups into which each transmission path located between the terminal and the one or more relay devices is classified, to obtain a plurality of replicated packets; and
 a transfer management section for classifying each transmission path located between the terminal and the one or more relay devices into the one or more groups based on a similarity of the respective transmission parameter of each transmission path located between the terminal and the one or more relay devices, so as to obtain the number of the one or more groups into which each transmission path located between the terminal and the one or more relay devices is classified, and such that a similar transmission parameter is designated for each of the one or more groups, each transmission path located between the terminal and the one or more relay devices being for transmitting the plurality of replicated packets as a multicast packet,
 wherein the transmission/reception section sends each of the plurality of replicated packets to a respective group of the one or more groups into which each transmission path located between the terminal and the one or more relay devices is classified, as a unit, based on the similar transmission parameter designated for each of the one or more groups.

2. The terminal according to claim 1, further comprising a transmission time calculation section for calculating a transmission time required for transmitting data to the one or more relay devices based on the similar transmission parameter designated for each of the one or more groups,
 wherein the transfer management section classifies each transmission path located between the terminal and the one or more relay devices into the one or more groups again, based on the calculated transmission time.

3. The terminal according to claim 1,
 wherein the control unit creates a unicast packet, when a number of the transmission paths, of the plurality of transmission paths, classified into the one or more groups is 1, and
 wherein the control unit creates the multicast packet, when the number of the transmission paths, of the plurality of transmission paths, classified into the one or more groups is 2 or greater.

4. The terminal according to claim 3, further comprising a timer section for, when a detection section detects a message included in a packet received from a certain transmission path of the plurality of transmission paths, counting time on the certain transmission path,
 wherein, when the timer counts up to a predetermined time, the transfer management section releases the certain transmission path from management.

5. The terminal according to claim 3, wherein the transmission/reception section determines an order of transmission of generated packets based on a transmission time calculated by a transmission time calculation section.

6. The terminal according to claim 1, wherein:
 the terminal is connected to a first network which is connected to a first communication terminal for transmitting a packet including a multicast address and the terminal is connected to a second network, via a relay device of the one or more relay devices, which is connected to a second communication terminal for receiving the packet transmitted from the first communication terminal; and
 the transfer management section creates group management information for the multicast address, the group management information including at least one unit of transmission information in which (i) a group of the one or more groups, (ii) a transmission path, of the plurality of transmission paths, classified into the group, (iii) the similar transmission parameter designated for each of the one or more groups, and (iv) information specifying the second communication terminal are associated with one another.

7. The terminal according to claim 6, further comprising a detection section for detecting a group managing message, which is included in the received packet transmitted from the first communication terminal based on a group managing protocol defined by layer 3 and is defined by the group managing protocol,
wherein, when the detection section detects (i) a join message representing a message for notification on joining a group, of the one or more groups, defined by the group managing protocol, or (ii) a report message representing a message for notification on belonging to a group, of the one or more groups, defined by the group managing protocol, the transfer management section adds, to the group management information, at least one of an identifier specifying the second communication terminal, which transmitted the received packet, and an identifier specifying the relay device, of the one or more relay devices, which transferred the received packet.

8. The terminal according to claim 7, wherein, when the detection section detects a leave message representing a message for notification on leaving a group, of the one or more groups, defined by the group managing protocol, the transfer management section deletes, from the group management information, at least one of the identifier specifying the second communication terminal, which transmitted the received packet, and the identifier specifying the relay device, of the one or more relay devices, which transferred the received packet.

9. The terminal according to claim 7, wherein:
when the group management information corresponding to the multicast address detected by the detection section has already been created, the control unit replicates unicast packets by a number equal to a number of the one or more groups included in the group management information; and
the transmission/reception section sends each of the replicated unicast packets to the second network.

10. The terminal according to claim 9, further comprising a band management section for, when a monitoring section detects a packet including a predetermined multicast address for a first time, assigning a part of a resource of a transmission path, of the plurality of transmission paths, to the multicast address.

11. The terminal according to claim 10, wherein the band management section adjusts the assignment of the part of the resource based on at least one of a number of received packets, a number of transmitted multicast packets, and a transmission data size within a predetermined time length detected by the monitoring section.

12. The terminal according to claim 10, wherein, when the monitoring section determines that the multicast packet has not been sent to a transmission path, of the plurality of transmission paths, the band management section releases a part of the resource assigned to the multicast address.

13. The terminal according to claim 10, wherein, when a part of a resource of a certain transmission path, of the plurality of transmission paths, is assigned to a certain multicast address, and when the detection section detects the join message or the report message including a new multicast address different from the certain multicast address from the packet received from the second network, the band management section releases a part of a resource already assigned and saves again a part of the resource of the transmission path for the new multicast address.

14. The terminal according to claim 7, wherein, when the detection section receives a packet including a message different from a non-predetermined message from the second network, the transfer management section discards the received packet.

15. The terminal according to claim 7, wherein, when the detection section receives a packet including a message different from a predetermined message from the second network, the transfer management section revises the received packet.

16. The terminal according to claim 1, further comprising an UPnP message detection section for detecting a packet including an UPnP message representing a message conformed to an UPnP protocol,
wherein, when the UPnP message detection section detects that the received packet includes the UPnP message, the transmission/reception section transfers the received packet each relay device of the one or more relay devices connected to the second network.

17. The terminal according to claim 1, wherein, when a multicast address included in a packet received from a first communication device does not match any multicast address of predetermined at least one multicast address, the transfer management section discards the packet received from the first communication device.

18. The terminal according to claim 1, further comprising a monitoring section for monitoring a number of received multicast packets, a number of transmitted multicast packets, and a transmission data size.

19. The terminal according to claim 1, wherein:
the terminal communicates with at least one relay device of the one or more relay devices using a multiple carrier transmission format;
each transmission path located between the terminal and the one or more relay devices is formed of at least one sub carrier of the multiple carrier transmission format;
the transfer management section classifies at least two sub carriers into at least one sub carrier in advance for each transmission path located between the terminal and the one or more relay devices;
the control unit evaluates a characteristic of each of the sub carriers in each transmission path located between the terminal and the one or more relay devices, and sets the respective transmission parameter of each of the at least one sub carrier included in each transmission path located between the terminal and the one or more relay devices as a respective sub carrier group transmission parameter; and
the transfer management section classifies each transmission path located between the terminal and the one or more relay devices into the one or more groups based on a similarity of the respective the sub carrier group transmission parameter of each of the at least one sub carrier included in each transmission path located between the terminal and the one or more relay devices.

20. A non-transitory computer-readable recording medium having a program recorded thereon, the program for communicating with one or more relay devices of a plurality of relay devices via one or more transmission paths of a plurality of transmission paths of at least one communication medium, the program causing a computer to execute:
a transmission/reception function for receiving a packet;
a control function for (i) evaluating characteristics of each transmission path, of the plurality of transmission paths, located between the terminal and the one or more relay devices, (ii) setting, based on the evaluated characteristics of each transmission path located between the terminal and the one or more relay devices, a respective transmission parameter indicating at least one of a transmittable information amount per a predetermined time length and an error correction strength for each transmission path located between the terminal and the one or more relay devices, and (iii) replicating the packet received by the transmission/reception function by a number equal to a number of one or more groups into which each transmission path located between the terminal and the one or more relay devices is classified, to obtain a plurality of replicated packets; and a transfer management function for classifying each transmission path located between the terminal and the one or more relay devices into the one or more groups based on a similarity of the respective transmission parameter of each transmission path located between the terminal and the one or more relay devices, so as to obtain the number of the one or more groups into which each transmission path located between the terminal and the one or more relay devices is classified, and such that a similar transmission parameter is designated for each of the one or more groups, each transmission path located between the terminal and the one or more relay devices being for sending the plurality of replicated packets when a multicast packet is received, wherein the transmission/reception function sends each of the plurality of replicated packets to a respective group of the one or more groups into which each transmission path located between the terminal and the one or more relay devices is classified, as a unit, based on the similar transmission parameter designated for each of the one or more groups.

21. An integrated circuit for communicating with one or more relay devices of a plurality of relay devices via one or more transmission paths of a plurality of transmission paths of at least one communication medium, the integrated circuit comprising an integration of:

a transmission/reception function for receiving a packet;

a control function for (i) evaluating characteristics of a each transmission path, of the plurality of transmission paths, located between the terminal and the one or more relay devices, (ii) setting, based on the evaluated characteristics of each transmission path located between the terminal and the one or more relay devices, a respective transmission parameter indicating at least one of a transmittable information amount per a predetermined time length and an error correction strength for each transmission path located between the terminal and the one or more relay devices, and (iii) replicating the packet received by the transmission/reception function by a number equal to a number of one or more groups into which each transmission path located between the terminal and the one or more relay devices is classified, to obtain a plurality of replicated packets; and a transfer management function for classifying each transmission path located between the terminal and the one or more relay devices into the one or more groups based on a similarity of the respective transmission parameter of each transmission path located between the terminal and the one or more relay devices, so as to obtain the number of the one or more groups into which each transmission path located between the terminal and the one or more relay devices is classified, and such that a similar transmission parameter is designated for each of the one or more groups, each transmission path located between the terminal and the one or more relay devices being for sending the plurality of replicated packets when a multicast packet is received, wherein the transmission/reception function sends each of the plurality of replicated packets to a respective group of the one or more groups into which each transmission path located between the terminal and the one or more relay devices is classified, as a unit, based on the similar transmission parameter designated for each of the one or more groups.

* * * * *